US005499705A

United States Patent [19]
Ide

[11] Patent Number: 5,499,705
[45] Date of Patent: Mar. 19, 1996

[54] BEAM MOUNTED FRICTION PADS FOR USE IN FRICTION BRAKES AND CLUTCHES

[76] Inventor: Russell D. Ide, P.O. Box 744, 641 Arnold Rd., Coventry, R.I. 02816

[21] Appl. No.: 346,299

[22] Filed: Nov. 23, 1994

Related U.S. Application Data

[62] Division of Ser. No. 40,376, Mar. 30, 1993, Pat. No. 5,377,802, which is a division of Ser. No. 668,216, Mar. 12, 1991, Pat. No. 5,203,438.

[51] Int. Cl.⁶ .............................. F16D 13/14; F16D 51/10
[52] U.S. Cl. .................... 192/107 T; 188/250 B; 188/259; 192/109 B
[58] Field of Search ................. 192/107 C, 107 T, 192/76, 85 AT, 109 B, 52; 188/259, 250 B

[56] References Cited

U.S. PATENT DOCUMENTS

| | | | |
|---|---|---|---|
| 1,789,133 | 1/1931 | Bluhm | 188/259 X |
| 2,057,386 | 10/1936 | Linder | 192/76 |
| 2,493,744 | 1/1950 | Berger | 192/76 |
| 2,616,528 | 11/1952 | Swanson | 192/107 T X |
| 2,888,121 | 5/1959 | Brueder | 192/107 T X |
| 2,955,692 | 10/1960 | Thomas. | |
| 3,064,782 | 11/1962 | Du Bois | 192/107 R |
| 3,107,955 | 2/1961 | Trumpler. | |
| 3,412,835 | 11/1968 | Goldberg | 192/107 T X |
| 3,499,609 | 3/1970 | Policansky | 192/76 X |
| 3,712,438 | 1/1973 | Roddy et al. | 192/76 X |
| 4,151,901 | 5/1979 | Parfitt. | |
| 4,202,432 | 5/1980 | Komori | 192/107 M |
| 4,334,602 | 6/1982 | Armour et al.. | |
| 4,375,254 | 3/1983 | Lech, Jr.. | |
| 4,377,225 | 3/1983 | Lech, Jr. et al.. | |
| 4,471,861 | 9/1984 | McIntosh. | |
| 4,496,251 | 1/1985 | Ide. | |
| 4,529,079 | 7/1985 | Albertson. | |
| 4,561,529 | 12/1985 | McIntosh. | |
| 4,615,427 | 10/1986 | Majima. | |
| 4,676,668 | 6/1987 | Ide. | |
| 4,729,459 | 3/1988 | Inagaki et al.. | |
| 4,741,424 | 5/1988 | Kitano et al.. | |
| 4,802,562 | 2/1989 | Kuroyanagi et al.. | |
| 4,809,823 | 3/1989 | Fargier. | |
| 4,850,466 | 7/1989 | Rogakos et al. | 192/76 X |
| 4,903,814 | 2/1990 | Tomotake et al.. | |
| 5,203,438 | 4/1993 | Ide. | |
| 5,377,802 | 1/1995 | Ide. | |

Primary Examiner—Rodney H. Bonck
Attorney, Agent, or Firm—Michael D. Bednarek; Marks & Murase

[57] ABSTRACT

A friction pad for use in a friction element used in a friction engagement device such as a brake or clutch, The friction element includes a carrier and a plurality of friction pads circumferentially spaced about the carrier, The pads may have a modular construction whereby pad portions are releasably secured to support portions. The pads may also be releasably secured to the carrier. Various friction pad constructions are contemplated including constructions in which the secondary support portion includes a membrane and the primary support portion includes a cylindrical member extending between the membrane and the friction pads. A continuous friction pad ring may be substituted for the discrete friction pads, The carrier may be provided with locator pins in the pad receiving bores to orient the pads properly. The carrier may have cuts and grooves formed therein to provide a flexible or even beam mounted support for the friction pads. The friction element may also have a multimode configuration and may include smart structures.

15 Claims, 34 Drawing Sheets

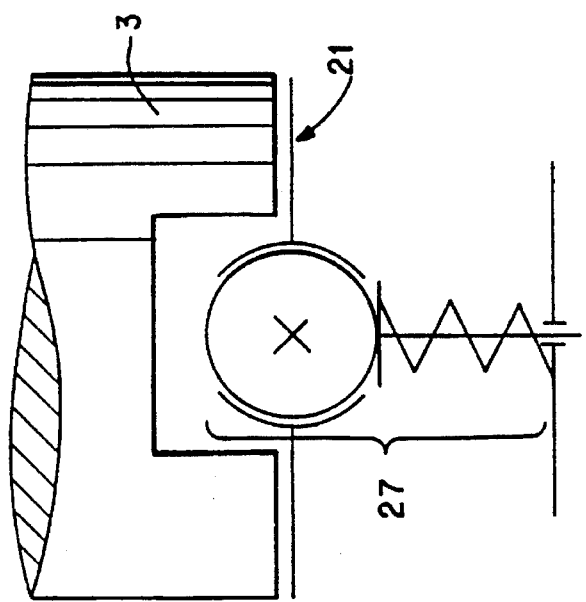
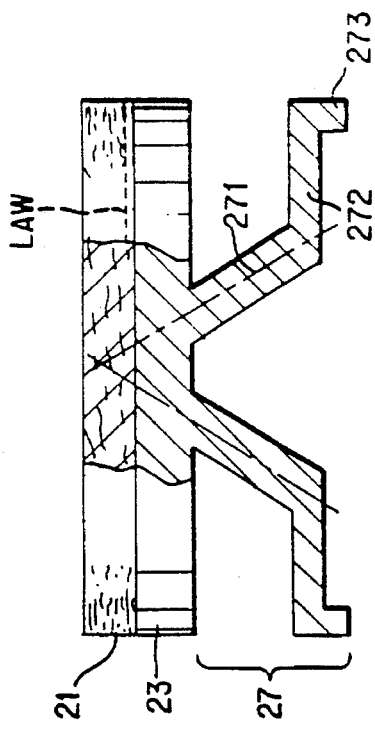
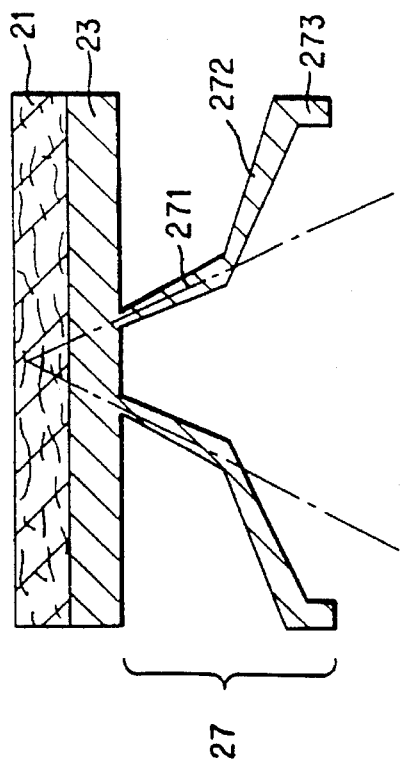
FIG. 2
FIG. 2A
FIG. 2B

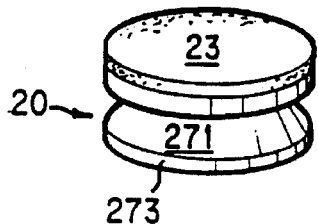
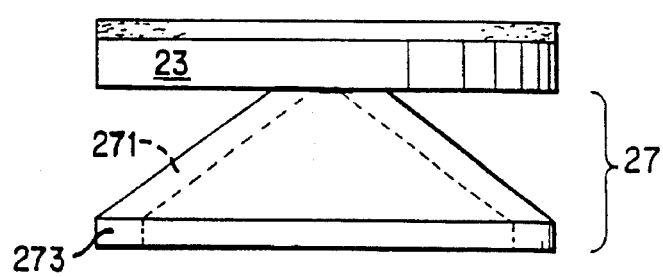
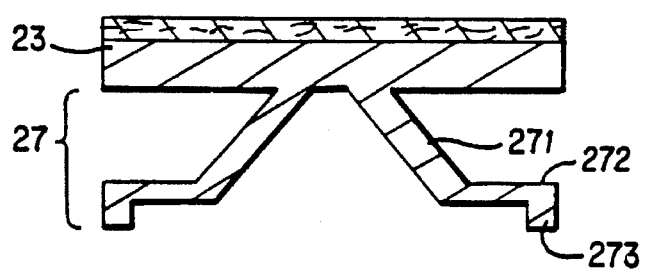
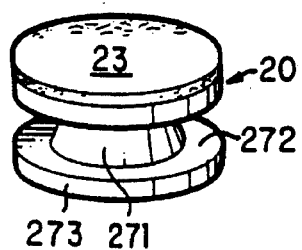
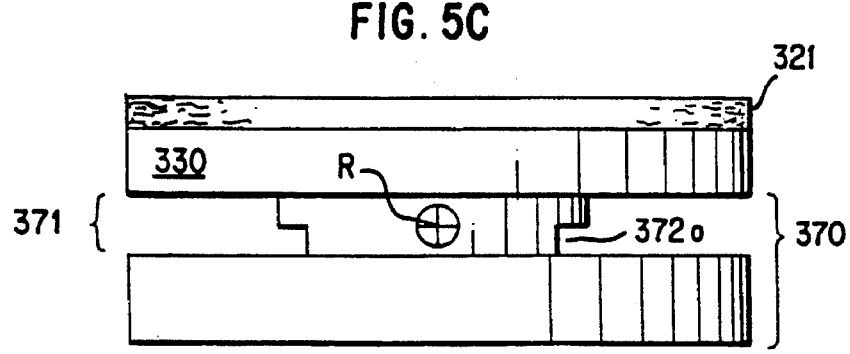

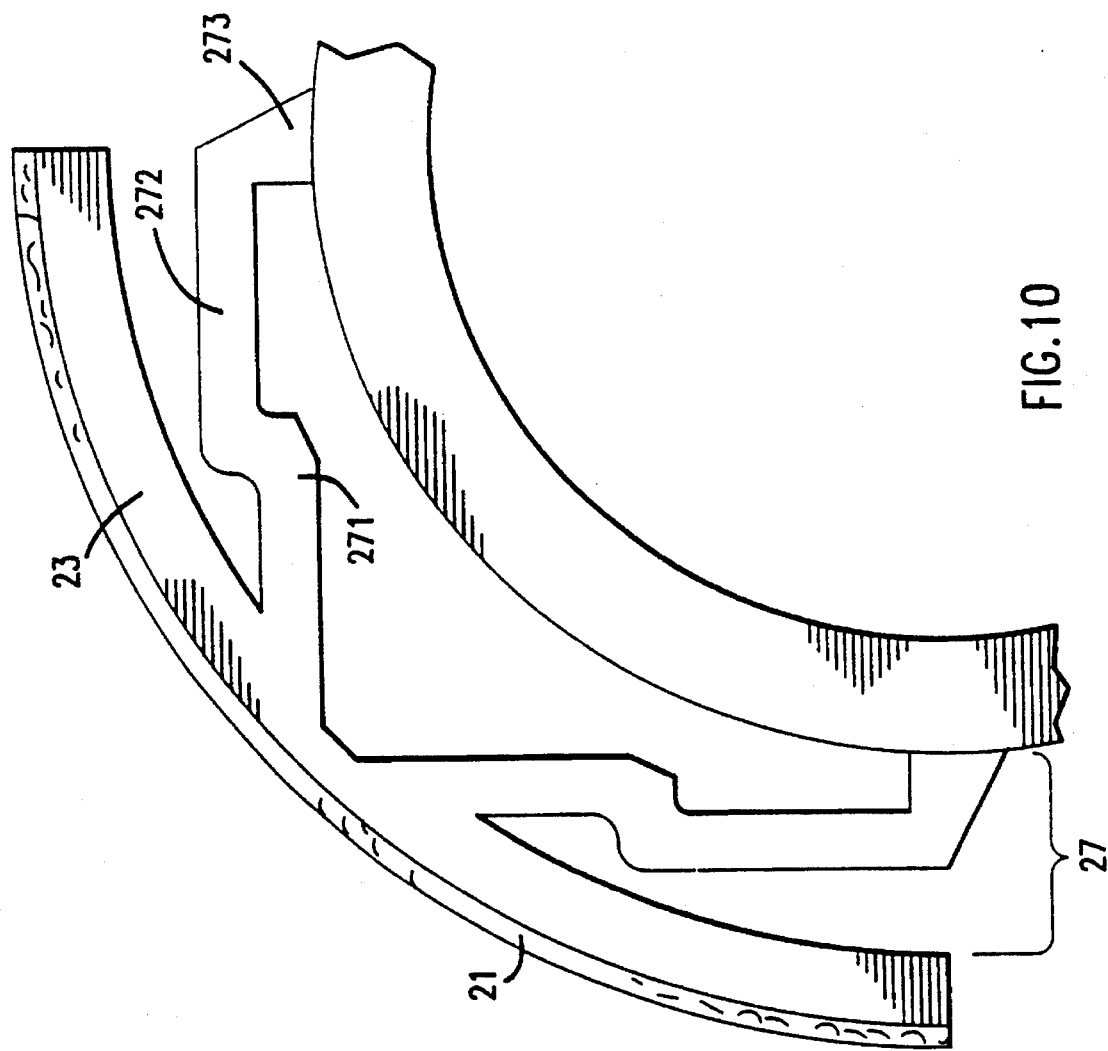

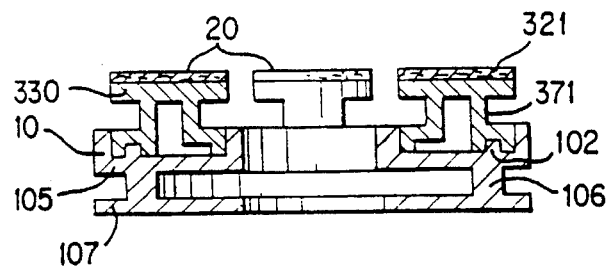
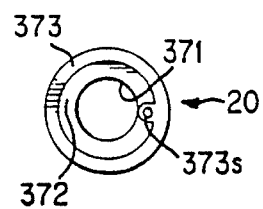
FIG. 13A  FIG. 13B
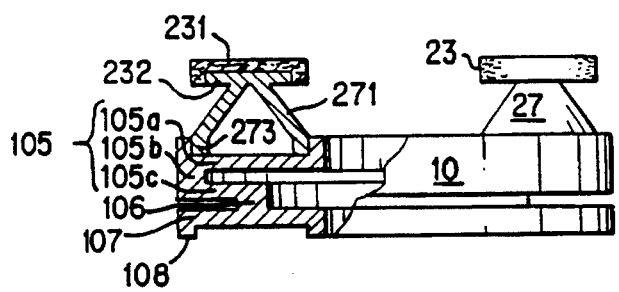
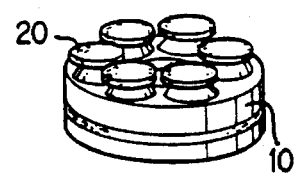
FIG. 14A  FIG. 14B
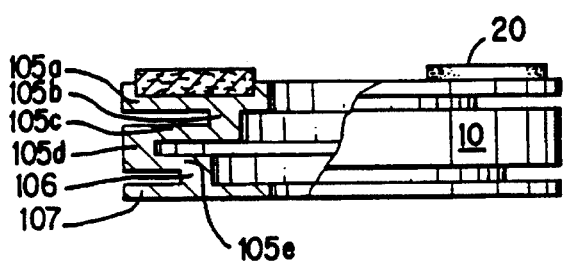
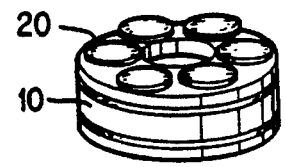
FIG. 15A  FIG. 15B

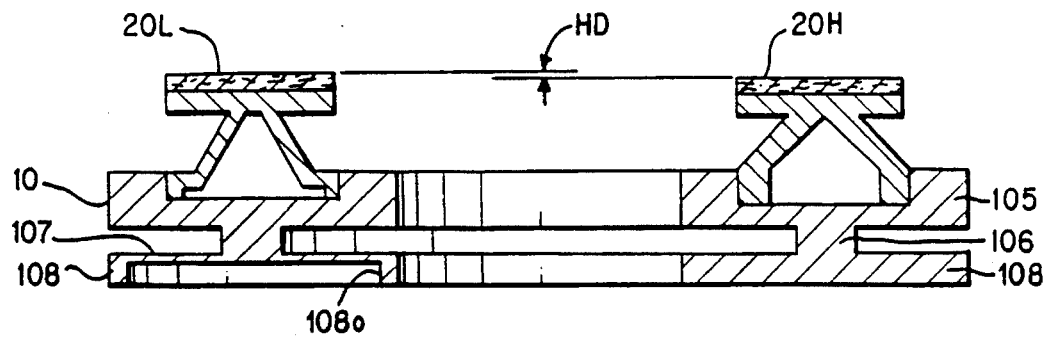
FIG. 17A
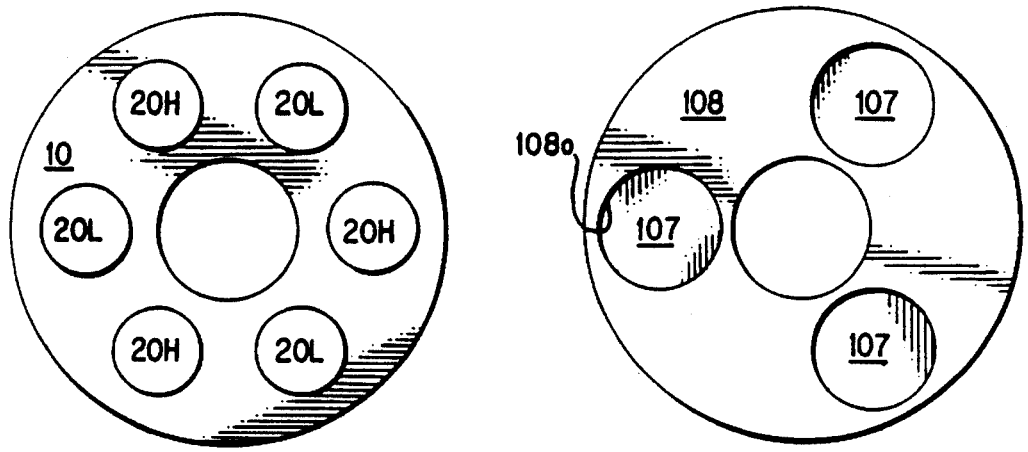
FIG. 17B
FIG. 17C

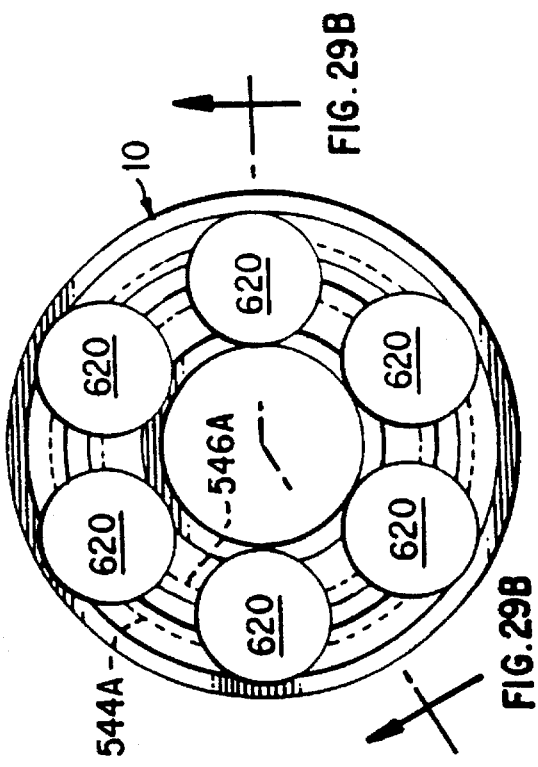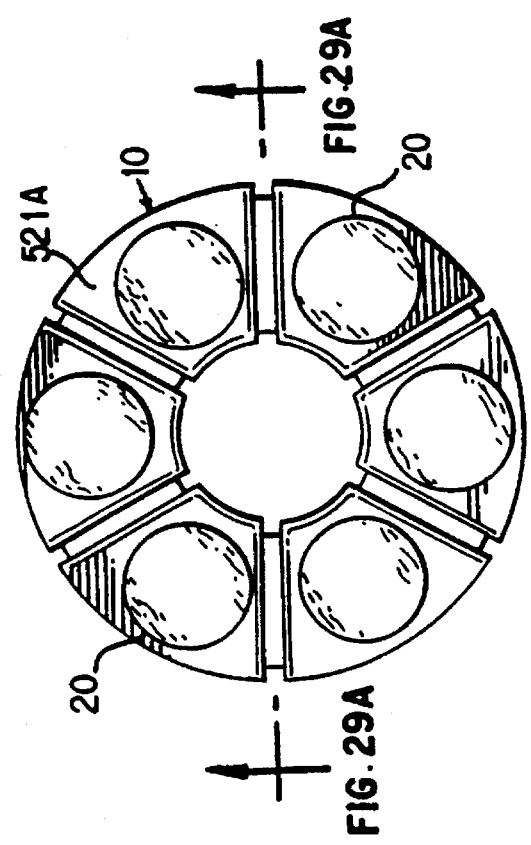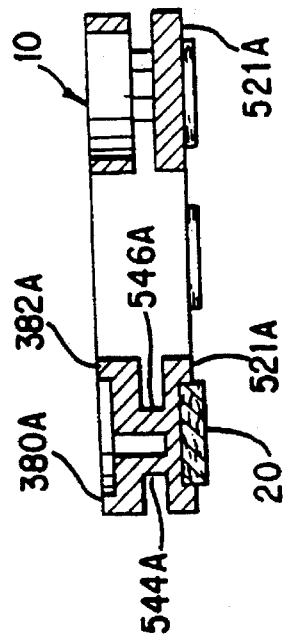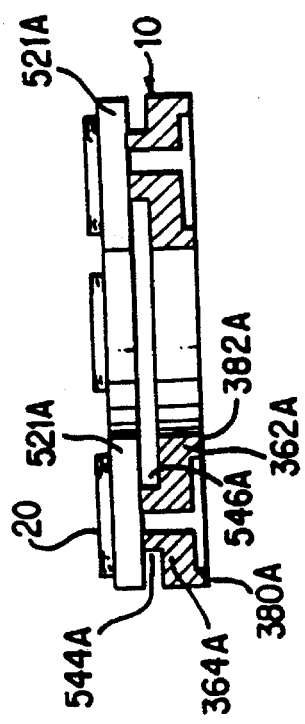

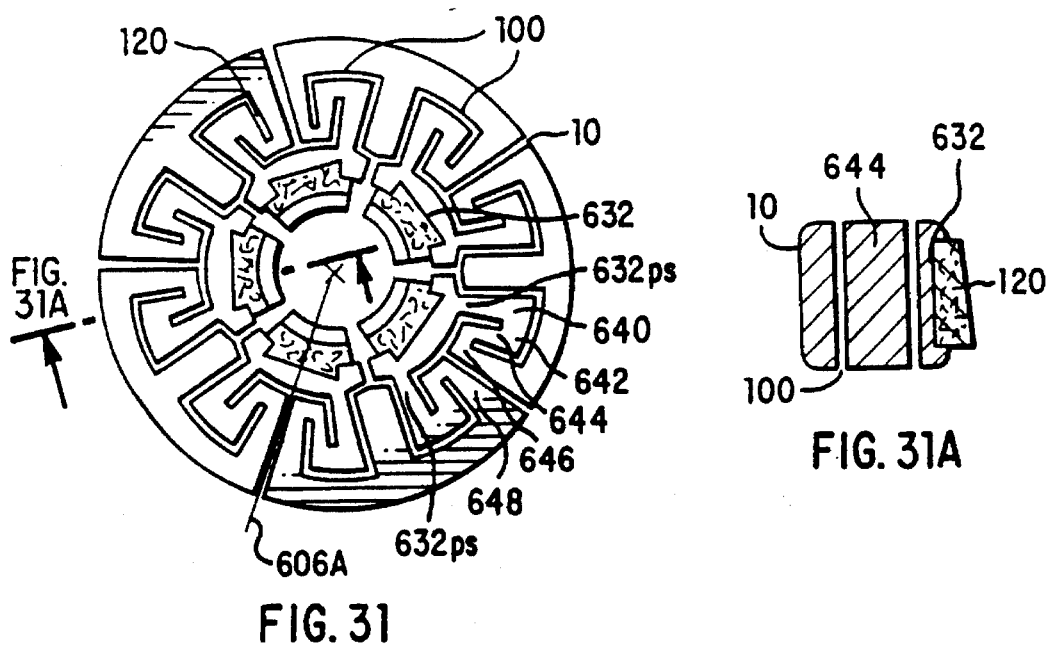
FIG. 31
FIG. 31A
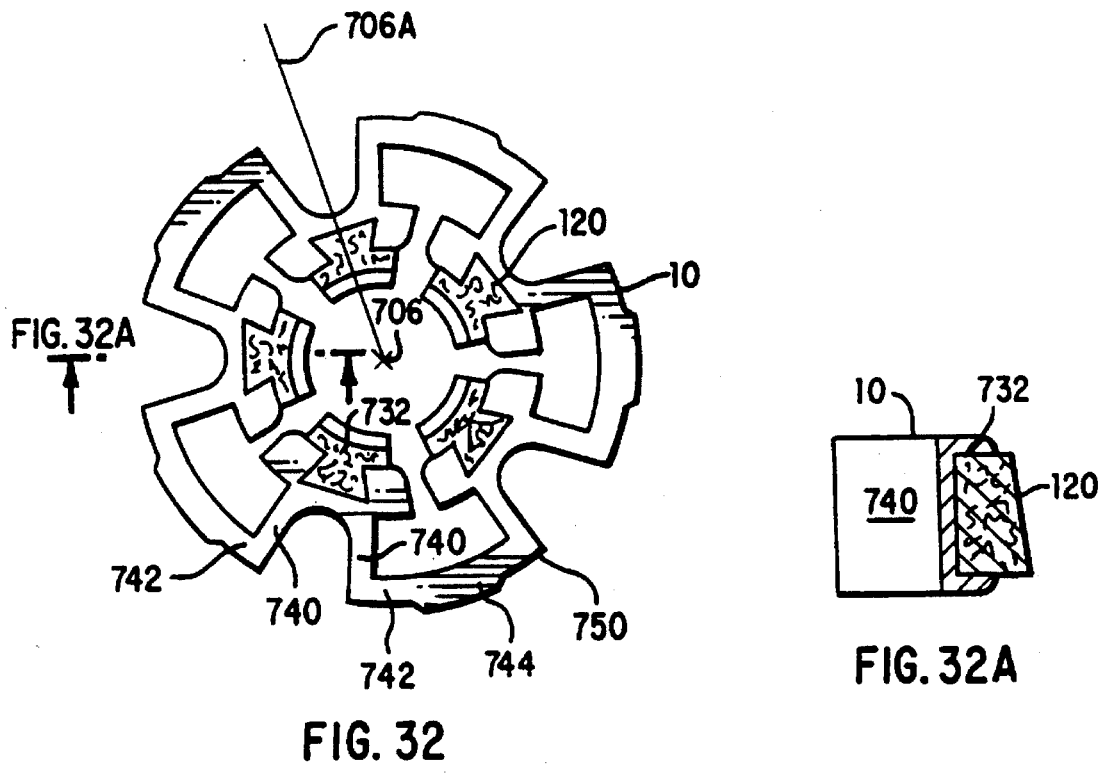
FIG. 32
FIG. 32A

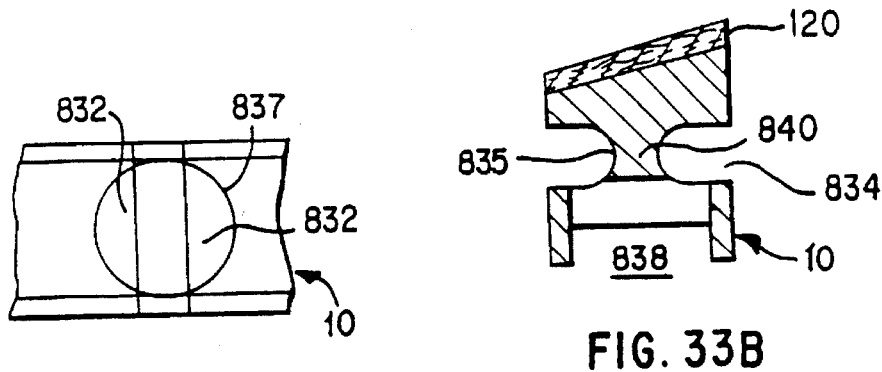
FIG. 33A
FIG. 33B
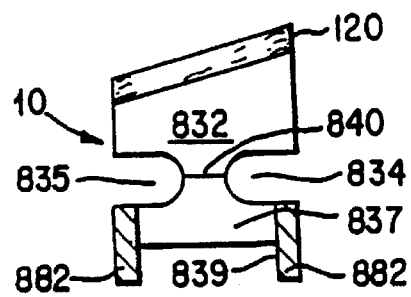
FIG. 33C
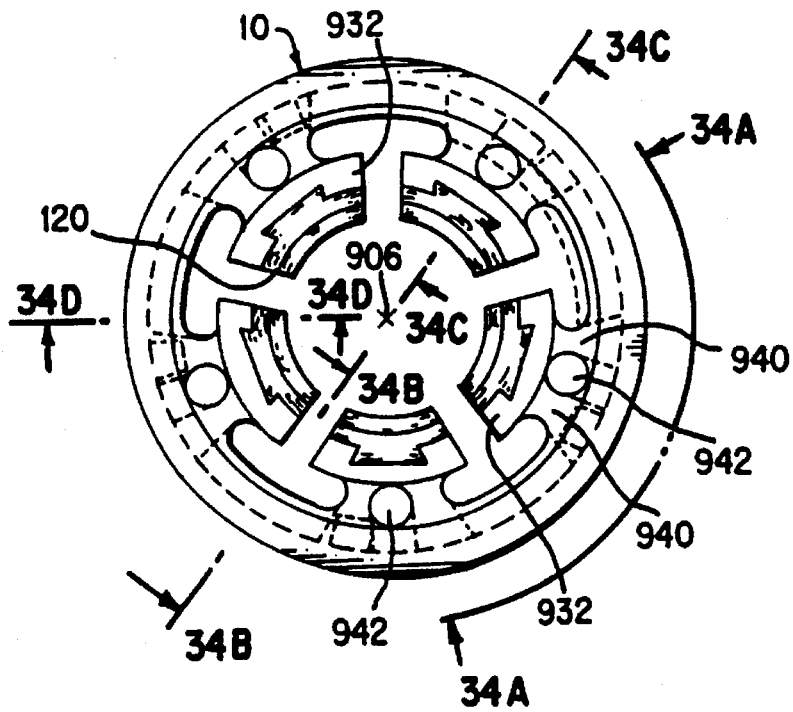
FIG. 34

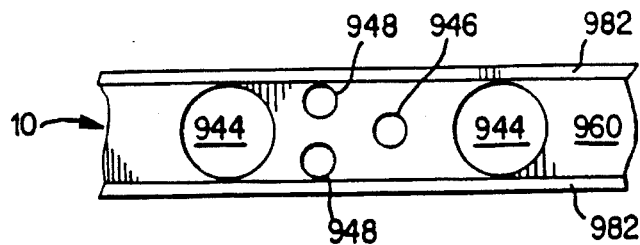
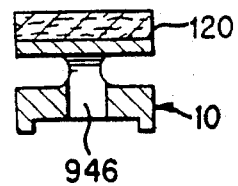
FIG. 34A  FIG. 34B
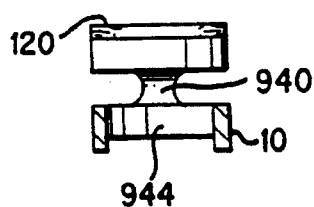
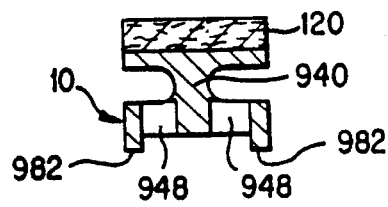
FIG. 34C  FIG. 34D
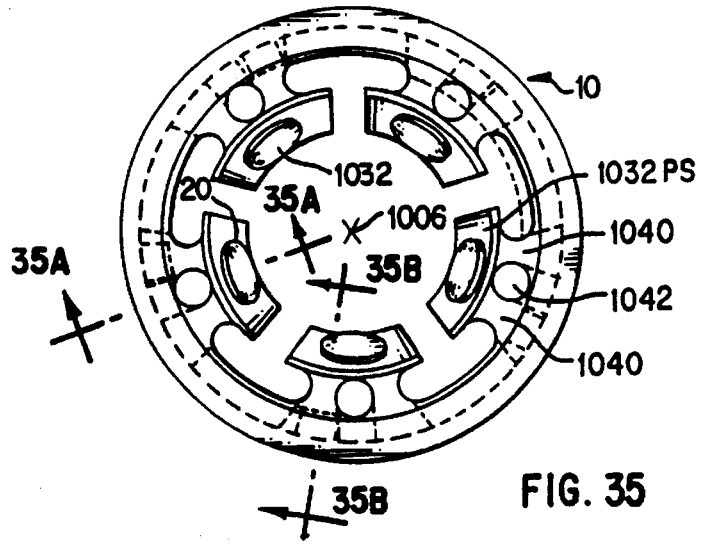
FIG. 35
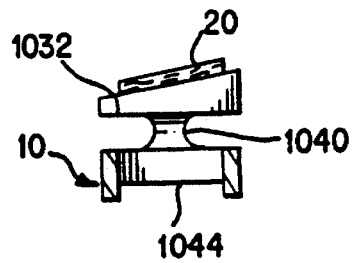
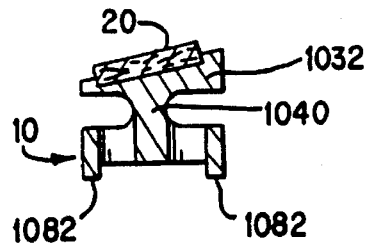
FIG. 35A  FIG. 35B

BEAM MOUNTED FRICTION PADS FOR USE IN FRICTION BRAKES AND CLUTCHES

This application is a division of application Ser. No. 08/040,376 filed Mar. 30, 1993, now U.S. Pat. No. 5,377,802, which is a division of application Ser. No. 07/668,216, filed Mar. 12, 1991 and now U.S. Pat. No. 5,203,438.

FIELD OF THE INVENTION

The present invention relates to brakes and clutches which operate through frictional engagement of two surfaces. These devices may be termed "friction engagement devices". More specifically, the present invention is directed to brakes and clutches which fall into a class of devices. The present invention relates to a beam mounted support for the friction pads or shoes of known brake and clutch constructions. The present invention further relates to beam mounted pads and shoes which have a modular construction.

BACKGROUND OF THE INVENTION

The use of brakes and clutches in a wide variety of machines is well known. Among other things, brakes and clutches are both widely used in motor vehicles and railway vehicles. As detailed below, the operation of clutches and brakes is conceptually quite similar. One common feature is the use of friction to effect a connection in many clutches and most brakes. Both clutches and brakes operate on the principle of pressing relatively rotating surfaces into contact with one another. Typically, the relatively rotating surfaces have, or are caused to have, a high coefficient of friction.

Generally, the term "clutch" refers to a releasable coupling connecting the adjacent ends of two coaxial shafts for rotation together. A clutch is said to be "engaged" or "in" when the shafts are coupled and "disengaged" or "out" when they are released. Mechanical clutches fall into two main categories: positive engagement and progressive engagement. Positive engagement clutches are those which are either positively disengaged, so that no torque can be transmitted from the driving shaft to the driven shaft, or positively engaged by some mechanical devices such as splines, keys, or dogs. Progressive engagement clutches are clutches which are gradually engaged, so that the speed of the driving shaft falls and the speed of the driven shaft rises until both are rotating at equal speeds. The present invention is particularly related to friction type progressive engagement clutches.

In motor vehicles and other common applications, progressive engagement clutches generally operate on the principle of a flat friction surface being pressed against a relatively flat rotating surface. The simplest form of friction type clutch includes two opposed disks. In motor vehicles, one of the two disks is typically the engine flywheel. The other, generally less massive, is termed the presser or pressure plate. Other known forms of friction clutches include cone clutches and dry plate clutches. Presently, friction clutches are almost all of the dry plate type lined with a composite material having a high coefficient of friction. Most cars and commercial vehicles have single dry plate clutches. Some larger vehicles have double or triple-plate clutches.

As mentioned above, brakes, like clutches and other frictional engagement devices, operate on the principle of a friction surface contacting a relatively rotating surface. In brakes, the frictional contact is used to convert the kinetic energy of a moving vehicle into heat.

There are many known configurations of brakes. Most automobile brakes are friction brakes which generally fall into two categories: drum brakes and disk brakes. The typical drum brake is an expanding brake in which the brake shoes are brought into contact with the inside of the brake drum by means of an expanding mechanism. Disk brakes, on the other hand, normally use flat disks as the friction surfaces. There are, of course, many versions of these two general brake forms. A number of these versions employ pivoting friction shoes in which the brake pad is mounted on a support which is pivoted on an axis. An example of a pivoting shoe drum brake construction is the Rolls-Royce four shoe brake. An example of a pivoted shoe disk brake is the Girling swinging caliper brake. Additionally, pivoting shoe friction brakes are often used in railway vehicles.

As can be appreciated from the foregoing discussion, brakes and clutches operate on essentially the same principles. In fact, the earliest disk brakes were modeled on a multi-plate clutch. Today, of course, disk brakes typically have only a single disk and almost always have several sector-shaped friction pads of relatively small area. Thus, brakes and clutches differ from one another in that a clutch couples two shafts for rotation together whereas a brake couples a rotating shaft to a stationary member to stop rotation of the shaft. On the other hand, both brakes and clutches operate on the principle of a friction surface contacting a relatively rotating surface and that both generally use a friction pad or lining mounted on a support of some kind.

Most disk brake constructions, and some drum brake constructions, employ a brake pad support having a fixed orientation with respect to the surface the brake pad engages. The support is simply moved toward or away from an opposed surface to engage or disengage the brake; the orientation of the pad relative to the corresponding surface cannot be changed. This is typically the case with clutches as well.

In drum brakes, the pad, generally constructed of a friction material, is secured to a metal shoe. Typically, the linings are bonded to the shoes; it is also possible to secure the linings by riveting.

A complete disk brake assembly generally includes the disc, the caliper and the friction pads. The pads generally comprise a friction material pad supported by a steel back plate or shoe which is supported by, and moveable with respect to, a caliper. Early pads were made as individual pieces, which were usually bonded to the back plate. In some cases, spigots or rivets were used as a backup in case of bond failure. Presently, the friction material is typically integrally molded to a back plate provided with a number of openings which are filled by the friction material.

A relatively high performance friction material is typically used in both brakes and clutches. Two types of friction material are used in friction linings for brakes and clutches: woven and molded. Woven friction lining material is made by spinning fibers into a yarn, sometimes on a brass wire core. The fibers may be either natural or synthetic or a combination. For instance, asbestos (generally the white variety) and more recently, other fibers such as glass fiber, mineral woods, steel wool, and carbon fibers have all been used either singly or in combination. The yarn is woven into a cloth and then impregnated with a bonding agent. Molded type friction lining materials are typically made by mixing fibers and a resin or other bonding agent into a dough-like mixture and then molding the mixture under increased pressure and temperature conditions.

The friction material used in brakes and clutches tends to wear over prolonged use. This wear can be greatly accelerated by heat build-up. Accordingly, to reduce wear, or at least minimize its effect, in both brakes and clutches, it is desirable to obtain equal loading among the plurality of pads used and to obtain uniform temperature distribution across the entire surface of each pad. Temperature distribution depends, to some extent, on pressure distribution. However, perfect pressure distribution does not always lead to perfect temperature distribution. In particular, it has been found that even when equal pressure distribution can be achieved, "hot spots" develop on the engaged surfacer. These "hot spots" lead to quick wear.

The goals of equal loading and uniform pressure distribution are not always compatible. For example, one approach to equalization of the load among the pads is to pivotally mount the pad shoes so that, by pivoting, the shoes can equalize load. Although this solution is generally satisfactory for the purpose of load equalization, it causes uneven wear of the friction pad. In particular, since the pivot point of the shoe is spaced from the line of action of the friction force, a moment is generated by the frictional action of the pad on the surface it is pressed against. This moment causes pivoting or tipping such that, in the case of a brake, one end of the brake shoe friction pad, i.e., the "toe", moves into braking cooperation in advance of the remainder of the shoe when the brake equipment is in use. In this case, the toe portion of the shoe is worn away before the remainder of the friction pad. It can be easily appreciated that such uneven wear is disadvantageous because it makes it necessary to discard brake shoes which are worn only at one end. Also, the brake is less effective since the effective braking surface area is reduced.

For these reasons, in the design of pivoting shoe type brakes and clutches, a significant consideration is to locate the pivot pin as close to the center of pressure of the shoe face as possible to eliminate shoe tipping and uneven wear. For example, in U.S. Pat. No. 4,151,901, a circular vane and pin arrangement allows the brake pad to move about the center of mass to minimize shoe pivoting action. Unfortunately, this design includes rubber bushings which deteriorate with age and are subject to contamination. Further, the design is somewhat complex to manufacture. Also, the arrangement can only pivot about a single axis so that it can only provide alignment in two directions.

The present inventor has determined that the deficiencies of prior art pivoting shoe-type constructions generally result from the inability to locate the pivot point on the line of action of the frictional force, which would eliminate the moment generated by the friction force. Further, since the pad support shoe can only pivot about a single predetermined axis, the pad surface is usually not perfectly aligned with the rotating surface. Of course, as a practical matter, it is not possible to locate a pivot pin precisely at the friction surface, nor is it possible to pivot about more than one axis when a pivot pin is used.

In other known constructions, the pad is supported on a linearly moving piston type member. Unless the cylinder in which the piston moves is (and remains) precisely aligned with the surface contacted by the pad, this arrangement invariably results in uneven pressure distribution and/or wear.

Additionally, in high performance clutch and brake applications, it is important to obtain even temperature and substantially even pressure distribution across the entire face of the friction pad. Generally, because of manufacturing tolerances, it is difficult to achieve uniform pressure distribution. This can lead to excessive heat build-up and uneven wear. Consequently, the friction pads must be over designed to achieve an adequate factor of safety. Alternatively, the pads are simply designed for, and allowed to, wear unevenly. It should also be appreciated that uneven pressure distribution decreases the braking or clutching ability by reducing the braking or clutching surface area, thus requiring more power. To some extent, uneven pressure distribution results from the use of rigid pad supports in conjunction with load equalization and actuation devices, such as the calipers in disk brakes and the pivot/expander construction employed in drum brakes. Thus, the goals of equal loading and even pressure distribution are incompatible in these known constructions.

There are, of course, numerous designs for the calipers of disc brake assemblies. An important factor in the design of these calipers is the disc brake pad assembly retention. In some instances, the brake pads are retained in the caliper on a pivot pin or the like. This presents pressure distribution problems, as discussed above, because the pads can only pivot about a single axis, i.e., the axis of the pivot pin.

An important factor in the design of the caliper and the means for connecting the disc brake pads to the caliper is the prevention of squeal. The problem of squeal has been particularly troublesome in disc brakes and it is attributed not only to the brake lining material but to the caliper design itself. It has been found that offsetting the center of pressure on the friction pad by grinding a shallow step on the face of the piston results in a lessening of squeal. Another way of achieving a similar effect is to insert a specially shaped steel plate between the pad back plate and the piston face. In any case, it should be noted that there are applications in which the ability to adjust the center of pressure of the friction pad provides beneficial results such as reduction or elimination of squeal.

As noted above, this application relates to beam mounted support for the friction pads of brakes and clutches. It is believed that the concept of a beam mounted support has not, to date, been applied to brake and clutch pads. It is also believed that the most advanced work in the field of deflecting beam supports is that of the present inventor. For instance, the present inventor's European Patent Application (Publication No. 0343620) describes bearings having beam mounted bearing pads and methods of making the same. In this case, the bearings are supported by deflecting beam support structures to assist in the formation of a hydrodynamic wedge between a bearing pad and a rotating shaft.

Other patents have disclosed flexible support structures for Supporting hydrodynamic bearing pads. For instance, U.S. Pat. No. 3,107,955 to Trumplet discloses a bearing having beam mounted bearing pads that displace with a pivoting or swing-type motion about a center located in front of the pad surface. The beam support is based only on a two dimensional model of pad deflection.

U.S. Pat. No. 4,496,251 to Ide, the present inventor, discloses a bearing pad mounted on web-like ligaments to deflect so that a wedge shaped film of lubricant is formed between the relatively moving parts.

U.S. Pat. No. 4,676,688, also to Ide, discloses a bearing construction which includes a plurality of discrete bearing pads supported in a carrier member. Each bearing pad includes a pad portion and a beam like support structure for supporting the pads as desired.

As mentioned above, the support structures described in these patents have not heretofore been applied to brakes and clutches.

Thus, there remains a need for an improved support for friction pads. More specifically, there is a need for a support which yields temperature and even pressure distribution and in some cases a need for an improved pivoting support.

SUMMARY OF THE INVENTION

The present invention relates to the application of deflection pad technology to friction engagement devices, especially to brakes and clutches. Deflection pad technology was developed by the present inventor and initially applied to thrust and radial bearings. The application of deflection pad technology in bearings is described in the aforementioned published applications and patents. The technology is made possible in a practical way by two recent technical innovations. First is the use of computers to simulate actual operating conditions in dynamic systems. This makes it possible to predict with great accuracy the deflection of a network of inter-related structural members or "beams" under actual load conditions. The second technical innovation which has made deflection pad technology a practical reality is improved manufacturing techniques which have made it possible to produce complex shapes in large volumes. The essence of deflection pad technology involves treating a system to be loaded as a piece of putty and then selectively removing pieces of the "putty" to increase or decrease the support of the surface to be loaded, such that the surface to be loaded deflects or deforms in a desired manner under expected load. In this way, relatively simple structural features such as beams and membranes can be precisely arranged so as to provide optimum performance.

As mentioned above, deflection pad technology has been applied by the present inventor to the bearing field to design hydrodynamic bearings which deflect to form a hydrodynamic wedge under load. It is now believed that similar techniques can be used to design brake and clutch pads which are supported so as to achieve even wear by optimizing temperature distribution, pressure distribution and/or pivoting about a desired axis in operation. Thus, the present invention relates to the adaptation of deflection pad technology to the field of brake and clutch pads.

The present invention relates to improvements in brakes and clutches of the type which include one or more discrete friction pads mounted so as to oppose a surface which can move relative to the friction pad. Generally, the present invention relates to improvements in the design and construction of the member which supports the friction pads.

Specifically, the present invention relates to beam mounted friction pads for use in brakes and clutches. The friction pads comprise a lining of friction material and a support structure for supporting the lining. The support structure includes a lining support face and flexible network of beams and membranes for flexibly supporting the lining support face, and hence the lining, in a predetermined manner. Among other things, the lining can be supported to achieve even temperature or pressure distribution across the lining surface, to alter the center of pressure (for example, to reduce squeal) and/or to pivot about a desired point in the manner of a ball and socket joint. The beam mounted support can be designed to allow the linings to move with six degrees of freedom and can be designed to function as a spring, a damper, a single axis pivot or a ball and socket joint.

By using deflection pad supports to orient the friction pads used in friction engagement devices, several advantageous results can be achieved. First, it is possible to tune the support structure to locate the center of pressure at any point desired; obtain even wear by optimizing temperature and pressure distribution; eliminate overturning loads by eliminating or reducing the moment caused by the friction force; reduce heat build-up by eliminating or reducing the moment caused by the friction force; reduce heat build-up by causing hydrodynamic air lubrication of the engaged surfaces; and reduce squeal. Secondly, the friction pads can be manufactured in higher volumes and at low cost because of the design simplicity and absence of any moving parts.

Conceptually, the friction pads and shoes of the present invention are designed by treating the pads and shoes as a solid piece of material and then selectively removing or adding material to the solid to cause it to deflect in a desired way under design loads. Additionally, as detailed hereinafter, "smart" materials may be used to influence or control the deflection characteristics of the support structure. It can be readily appreciated that myriad designs are possible. Thus, it should be kept in mind that the structural features disclosed herein are generally applicable to any other friction pad if structural conditions make this possible.

A preferred beam mounted friction pad for use in a friction engagement device according to the present invention includes a layer of high friction material having a friction surface; a generally planar friction material support surface having first and second sides, the support surface supporting the friction material on the first side thereof; a flexible support structure extending from the second side of the support surface for supporting the high friction material; and the friction material support surface for pivoting about a predetermined point so as to orient the pad under load. The point is selected to optimize distribution of load and uniform temperature distribution so as to cause uniform wear and uniform temperature distribution across the surfaces.

The friction pad may be constructed so as to provide a spring-like support in a direction transverse to the plane of the friction material support surface. The friction material support surface may be integral with the support structure. Alternatively, the friction material support surface may be releasably secured to the support structure. The support structure can support the friction material support surface for movement with six degrees of freedom. The friction pad may be mounted in a carrier or piston of a disc brake construction, or be part of a presser plate clutch arrangement. Preferably, the support structure includes a primary support portion connected to, and supporting, the friction material support surface; a secondary support portion supporting the primary support portion; and a tertiary support portion supporting the secondary support portion. The support structure can include a plurality of ligaments angled toward a point proximate the surface of the layer of high friction material.

The beam mounted pads of the present invention include a pad support surface and a support structure for supporting the pad support surface (and hence the pad) for movement with up to six degrees of freedom. Such pads can be used in a pivoting disc brake assembly comprising a rotatable disc and a pair of non-rotatable pressure plates one on each side of the disc. Each plate supports a piece or pad of friction material. The plates are provided with a support structure on the side opposite the disc. For example, the support structure can be in the form of a stool-like connecting portion having at least three ligaments which are angularly arranged each to the other toward an apex adjacent the disc; the ligaments connect to a friction pad assembly and means to move the pressure plates toward one another and into engagement with the disc. The plates of the disc brake are thus supported for movement of the plate so as to equalize load across the friction material. The ligaments of the disc brake can be formed with a dog leg portion at the extremity adjacent the means to move the pressure plates so as to allow the plates to move with six degrees of freedom, if desired.

The brakes and clutches of the present invention typically include a carrier or base member which supports the support structure. The carrier and support structure may be integral or the carrier may include a bore or other opening formed therein for releasably retaining separate support structures. If the pads are to be supported for movement with six degrees of freedom, the support structure should include a primary support structure, a secondary support structure and tertiary support structure; all of these are not needed if less than six degrees of freedom are required. In accordance with one aspect of the present invention, the friction pad portion may be releasably secured to the primary support structure of the support portion and the tertiary support structure of the support portion may be releasably secured to the carrier. Also, the carrier may be configured to provide a spring or other flexible support for the friction pads mounted thereon, which pads may or may not have separate support portions. For instance, the carrier may be formed with cuts and/or grooves to provide a thin beam or membrane support for each pad. The beam or membrane could be fluid dampened if desired. In this way, the carrier is provided with a spring characteristic. The support portion of each of the brake and/or clutch pads is adapted to function as a pivot support permitting the pad to pivot about any predetermined point to equalize frictional presence across the pad. The support structure can also be designed to have a spring characteristic. The support portion may have various forms including a hollow frustum, a plurality of legs formed out of a frustum, legs formed out of a cylindrical portion and legs formed out of a hollow cylindrical portion.

As indicated above, the various pads and support portions may be releasably secured to one another. Brake and clutch pads utilizing such a construction may also have a modular construction which may include modular friction pads and support structures having threads or similar type connectors for releasably securing the pads to a support structure provided with a complementary connecting means. At its other end, the support structure can include threads or similar connectors for releasably securing the support structure to a complementary connector provided in the carrier to assist in assembly and disassembly of the pad or shoe assembly. Because of the modular construction of the individual pads, increased standardization can be achieved; standard parts can be used to vary the performance characteristics of any particular brake or clutch pad by, for example, using different combinations of standard pad support portions and pad portions. Also, the standard parts can have shapes which are much easier to manufacture. The use of standardized parts also makes it easier to vary performance to meet customer demands. Further, the modular construction reduces the cost of the pads since expensive high performance materials need only be used where necessary, rather than throughout the pad.

In accordance with other aspects of the present invention, the support portion may include a modified support structure in which the primary support portion is mounted on a continuous membrane which can be nonsymmetrically perforated to provide preloading or biasing in a predetermined direction. The primary support portion itself may be simplified to comprise a single relatively rigid beam or a tube-like member which is undercut and/or overcut so that, under loading, it pivots in a predetermined direction. Additionally, the perforations or openings formed in the membrane to bias the friction pad in a predetermined direction can also function as locator openings for receiving a locating pin mounted in the carrier so as to precisely position the friction pad with respect to the carrier.

In accordance with another embodiment, the primary support portion of the support structure can be frusto-conical. Such a construction is easier to manufacture and more durable than pads with a ligament type construction. The frustum type primary support portion makes the pad support more rigid. Thus, this construction is well suited to heavy load applications.

The present invention also relates to a dovetail modular construction in which the carrier is formed with dovetail grooves and the support structure has complementary dovetail portions, such that the support structure and pads can be releasably locked into the carrier. The pads include a pad portion and a support portion having a dovetail portion. The pad support portion and/or the carrier provides flexible support for the pad portion.

The present invention also relates to actively or dynamically controllable friction pad constructions. Specifically, the invention relates to the use of so called "intelligent" or "smart" materials for actively or dynamically controlling the characteristics of the pad support and/or actuation of the brake. A smart pad structure combines three types of components, each having a specific function. The first component is a structural component which is the core of the friction pad. The structural component is formed of a structural material such as steel, bronze, aluminum, ceramics, plastics or light weight composites. This component forms the framework or skeleton of the pad support. The second component is the sensor component. This component is formed of a material tailor-made to sense and monitor changes and conditions such as temperature, pressure, etc., which are indicative of even pressure distribution. Materials capable of performing these functions include piezoelectric materials, such as quartz, certain polymers and TERFENOL. The third component of the so-called smart pad structure is an actuator component. The actuator component expands, contracts or changes its rigidity to optimize a pressure distribution. Materials capable of doing this include piezoelectric materials; electrorheological (ER) fluids, which change the viscosity in the presence of electric fluids (such that they can rapidly change from free flowing liquids into pseudo-solids depending on the strength of the electric field, thereby offering a selective rigidity); and magnetostrictive rare earth alloys, such as TERFENOL, that produce large dimensional changes when exposed to a magnetic field.

As noted above, smart materials which can be used include piezoelectric materials and electrotheological (ER) fluids. Also suitable are electroceramic materials which are capable of sensing environmental changes (such as pressure chemical changes), and move or undergo some other physical change in response to the sensed changes. For instance, lead zirconium-titante-based devices have been developed which are compliant like rubber in response to pressure. In this way, an intrinsically hard ceramic device can be made to absorb rather than reflect vibration. Such materials can be used as an alternative to hydraulic actuators for actuating the brake, or they may be used to assist the braking action.

Another useful type of material is the so called shape-memory metals, i.e. alloys that change from one shape to a former shape when heated past a point called a transition temperature. Such shape-memory metals can be used in composite materials such that, as the temperature changes and the imprisoned alloys try to resume their earlier shape, the surrounding composite resists the internal movements. In turn, this resistance changes mechanical properties of the composite, such as its stiffness and the frequencies at which it can vibrate. The most well known shape-memory metal is a nickel-titanium alloy known as nitinol. This metal could be used to compensate for heat effects. For example, the friction material support surface (i.e. the surface which underlays the friction lining) could include sections of shape-memory elements. These elements could be constrained and designed such that under normal conditions they are in an expanded state, but when heated beyond the normal range, they shrink to relieve pressure of the portion of the friction lining they support.

The structural component of the dynamically or actively controlled pads of the present invention is similar to the other pads disclosed herein. However, the sensor and actuator components are provided so as to allow active control of the deflection characteristics, and/or shape of the friction pads, support structure and/or carrier structure. In one example, the sensor and actuator component are used in a feedback system, wherein the physical conditions sensed by the sensor are used to control the actuator. The sensor and actuator components can both be constructed of smart materials such as a piezoelectric material. The first piezoelectric material senses pressure and produces a signal which is fed into a feedback amplifier. The feedback amplifier processes the pulse or signal and sends a voltage to the actuator, causing it to expand or contract. As the actuator expands or contracts, it alters the sensed condition until an equilibrium condition is achieved.

As noted above, such smart materials can also be used to move the friction pads from a braking position to a non-braking position in an electrically controlled brake system. Similarly, smart materials can be used such that in a failure situation, the pads move to an engaged position to provide a fail-safe emergency brake.

The carrier, support structures and pads of the present invention can be formed of any suitable material. The primary consideration is that the support structure must elastically deflect or deform to enable proper pressure distribution and hence temperature distribution.

Thus, a disc brake, according to the present invention, can include a rotatable disc and a pair of angularly moveable non-rotatable pressure plates axially aligned, one on each side of the disc. Each plate is provided on the side thereof adjacent the disc with a seating in the form of a support structure, which will provide proper angular movement so as to optimize pressure distribution and heat build-up across the pad.

BRIEF DESCRIPTION OF THE DRAWINGS

FIG. 2 is a schematic representation of an idealized pressure distributing support system.

FIG. 2A is a side cross section of a preferred embodiment of the present invention constructed along the lines of the system of FIG. 2.

FIG. 2B is a side cross section of another embodiment of the present invention constructed along the lines of FIG. 2.

FIG. 3C is a perspective view of a frusto-conical or frustum shaped friction pad according to the present invention.

FIG. 3D is a side view of the frusto-conical friction pad of FIG. 3C with the hidden cross-sectional lines indicated in phantom.

FIG. 3E is a perspective view of another frusto-conical friction pad according to the present invention.

FIG. 3F is a cross-section of the frusto-conical friction pad of FIG. 3E.

FIG. 5C is a side view of the friction pad of FIGS. 5A and 5B along the lines indicated in FIG. 5B.

FIG. 10 is a side cross-section of a brake shoe type friction pad support according to the present invention for use in a brake system of the type shown in FIG. 1F.

FIG. 13A is a side cross-section of the friction pad support of a presser plate clutch construction which includes a beam-mounted carrier and a plurality of friction pad supports.

FIG. 13B is a bottom view of one of the friction pads of the clutch of FIG. 13A.

FIG. 14A is a side view with a cutaway portion of a friction pad support for use in a presser plate clutch construction, which includes a beam mounted carrier and a plurality of frusto-conical friction pad supports.

FIG. 14B is a perspective view of the support of FIG. 14A.

FIG. 15A is a side view, partially cut away, of a friction pad support of a presser plate clutch, which includes a beam mounted carrier supporting a plurality of friction pads.

FIG. 15B is a perspective view of the support of FIG. 15A.

FIG. 17A is a cross-section of a multi-mode friction pad support for use on a presser plate clutch according to the present invention.

FIG. 17B is a top view of the multi-mode support of FIG. 17A.

FIG. 17C is a bottom view of the multi-mode support of FIG. 17A.

FIG. 29A is a cross-section of another friction pad support construction having a beam mounted carrier according to the present invention.

FIG. 29B is a cross-section of the friction pad support of FIG. 29A.

FIG. 30A is a top view of the friction pad support of FIG. 29A.

FIG. 30B is a bottom view of the friction pad support of FIG. 29A.

FIG. 31 is a side view of another dovetail friction pad support for use in a cone clutch construction in accordance with the present invention.

FIG. 31A is a radial cross-section of a portion of the friction pad support illustrated in FIG. 31.

FIG. 32 is a side view of another friction pad support construction in accordance with the present invention.

FIG. 32A is a radial cross-section of the support of FIG. 32.

FIG. 33A is a detail view of a portion of the outer periphery of the friction pad support of FIG. 33.

FIG. 33B is a cross-section of the support of FIG. 33.

FIG. 33C is another cross section of the support of FIG. 33.

FIG. 34 is a side view of another dovetail friction pad support for use in a cone clutch construction according to the present invention.

FIG. 34A is a detail view of a portion of the outer periphery of the support of FIG. 34.

FIG. 34B is a cross-section of the support of FIG. 34.

FIG. 34C is another cross-section of the support of FIG. 34.

FIG. 34D is another cross-section of the support of FIG. 34.

FIG. 35 is a side view of a friction pad support for use in a cone clutch construction according to the present invention.

FIG. 35A is a cross-section of the support of FIG. 35.

FIG. 35B is another cross-section of the support of FIG. 35.

DETAILED DESCRIPTION OF THE DRAWINGS

Figure 1:
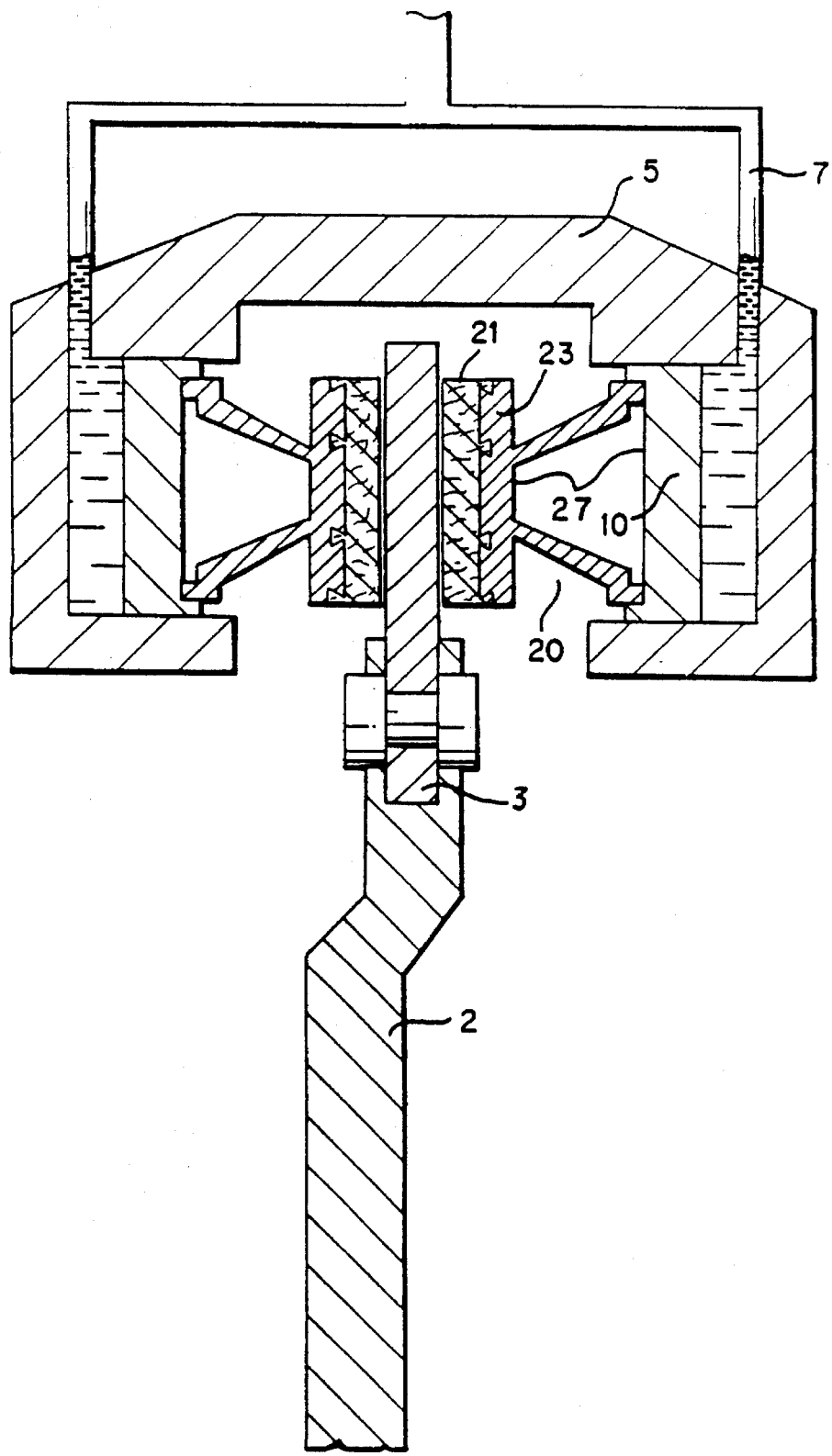
FIG. 1 is a partially schematic cross section of a piston type hydraulic disk brake assembly according to the present invention.
Figure 1A:
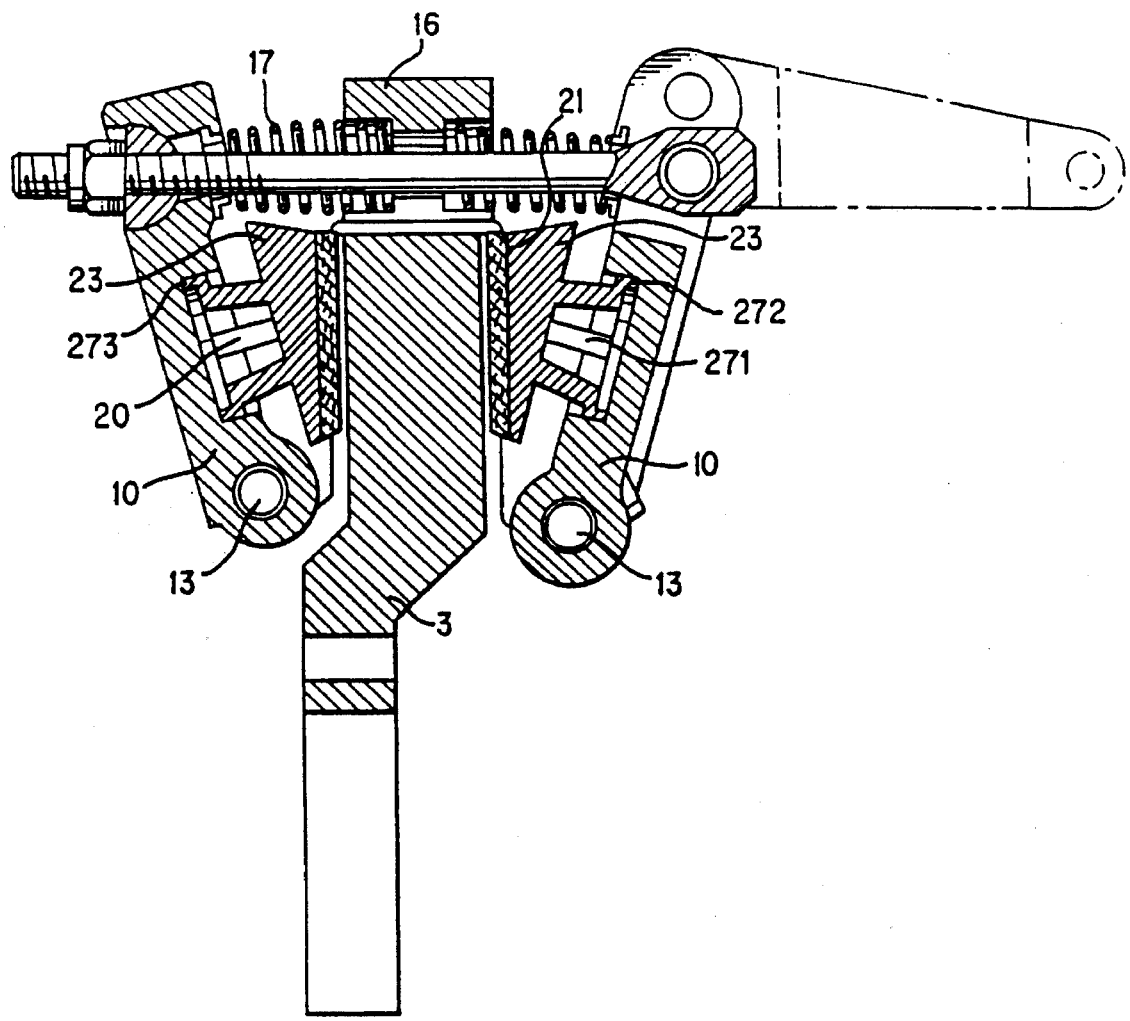
FIG. 1A is a sectional view taken substantially centrally through the caliper pads of another disc brake assembly.

The present invention relates, in large part, to friction pad supports for use in a variety of brake and clutch constructions. FIGS. 1–1F illustrate examples of brake and clutch constructions which are adapted to use the friction pad supports of the present invention.

FIG. 1 shows a first brake assembly according to the present invention. For simplicity, the illustrated brake is a simple fixed caliper double piston-type disc brake. The disc 3 is secured to the wheel hub 2, which rotates on bearings on the axle casing or stub axle depending on whether a rear or a front brake is concerned. A caliper member 5 is secured to a mounting in a fixed relationship to the disc 3. Two pistons 10 are carried in cylinders formed in the caliper 5. The pistons 10 bear on pads 20, which include friction pads 21 and pad support elements 23 and 27. The pad supports 23, 27 are secured, preferably releasably, in the pistons 10. If desired, either the pad support 23 or the support structure 27 can be dimensioned for sliding contact with a recess in the caliper 5 so as to limit movement of the support elements to movement toward and away from the disc 3 to give the system more stability. It should be appreciated, however, that when the support members are guided in this way, their ability to move is similarly limited. The calipers 5 of brakes, such as that shown in FIG. 1, usually have to be made in two parts to enable the cylinders to be machined, and also must have openings through which the friction pads can be removed for replacement as discussed below. As a result, their actual form is typically more complex than that shown in FIG. 1.

There are, of course, many known forms of piston type disc brake constructions. It should be understood that the friction pads of the present invention can be used in any of these constructions so long as the support structure is designed to support the friction pads as required.

In selecting an appropriate friction pad support from those disclosed and suggested herein, several characteristics of such piston-type desk brakes should be considered. For instance, it is known that to obtain the same torque as from a drum brake occupying the same volume, the forces applied to the pads of the disc brake must be much higher than those applied to the shoes of the drum brake. This is for two reasons: first, the radius of the line of action of the brake pad is necessarily less than the radius of an equivalent drum brake, and secondly, there is no servo action in the disc brake because the frictional forces do not help in the application of the brakes as they do in drum brakes. For this reason the axial forces on the disc must be balanced; this is clearly the case in the illustrated embodiment. There are other known ways of balancing axial forces.

Even when the axial braking forces are balanced as shown, there is an unbalanced tangential frictional force on the disc; this unbalanced force must be supported by the wheel bearings or balanced by a second caliper placed diametrically opposite the first caliper.

It is also necessary to provide automatic adjustment for wear in disc brakes. It is known that such adjustment can be achieved by placing a rubber ring near the pad end of the actuating cylinder so that when the piston moves outward, the ring distorts enough to allow the normal clearance to be taken up without any slip occurring between the ring and the piston. If the movement is more than this, slip occurs and when the fluid pressure is released, the piston retracts only by the amount of the distortion, and thus the normal clearance is restored. As mentioned above, the pad construction which will be detailed below is applicable to any piston-type disc brake construction.

The beam mounted pads of the present invention can also be used in applications which, heretofore, have required pivoted brake shoes. Such brake constructions are commonly used in railway vehicles and the like. However, pivoted shoe brakes can also be used in motor vehicles. An example of a brake construction in which the beam mounted friction pads of the present invention are used in place of pivoted shoes is shown in FIG. 1A, in which components with similar functions are given similar reference numericals.

The illustrated brake assembly includes a rotatable disc 3 and a pair of carrier plates 10, each of which are pivotally secured at one end on pins 13 to a non-rotatable caliper housing. (A bridging portion of the caliper housing is seen at 16.) An actuator rod 17 coupling the plates 10 extends through the bridging portion 16. A pair of friction pads 20 are provided with planar faces which engage the disc 3 and these pads are connected, preferably releasably, to the carrier plates 10. The pads 20 include stool-like support members 27, each of which include a primary support portion 271, comprising three legs or ligaments that are equally spaced in circumferential arrangement, and secondary 272 and tertiary 273 support portions defined by a dog leg portion on each ligament as indicated at 272 and 273.

The carrier plates 10 may be forced together to effect frictional engagement between the disc 3 and the friction pads 21 by any suitable mechanism, such as a mechanically operated lever mechanism, as illustrated in broken lines or a fluid pressure device. Also, as well known to those skilled in the art, the assembly may include a friction pad wear compensating device and a mechanism for retracting the carrier plates 10 after each brake application so that the friction pads 21 move a predetermined distance out of contact with the disc 3. Preferably, the friction pads 21 are of wedge section as seen, the thickest portion being adjacent the outer periphery of the disc 3. This is simply to allow planar contact between the friction pads 21 and the disc 3.

As explained in detail below, the pad support structure 27 provides alignment of the pad support surface 23, and consequently the friction pad 21, in at least three directions and is not prone to deterioration. Further, the beam mounted support ensures proper friction pad alignment by deflection of the support structure 27, rather than by mechanical movement of pins and vanes.

FIG. 1F illustrates a conventional Girling design shoe type brake modified to include a beam mounted friction pad support according to the present invention. The brake is actuated by an actuator such as a hydraulic piston and retracted by a spring as shown. The operation of this type of brake is well known. However, when modified to include a beam like support for the friction pad, the distribution of pressure across the pad, and hence the temperature build-up, can be more precisely controlled. A support of the type shown in FIG. 10, and discussed below, is ideal for a brake construction of this type.

The beam mounted friction pads of the present invention can also be employed in clutches since the goals of uniform pressure distribution and controlling temperature build-up are desirable in clutches as well.

Figure 1B:
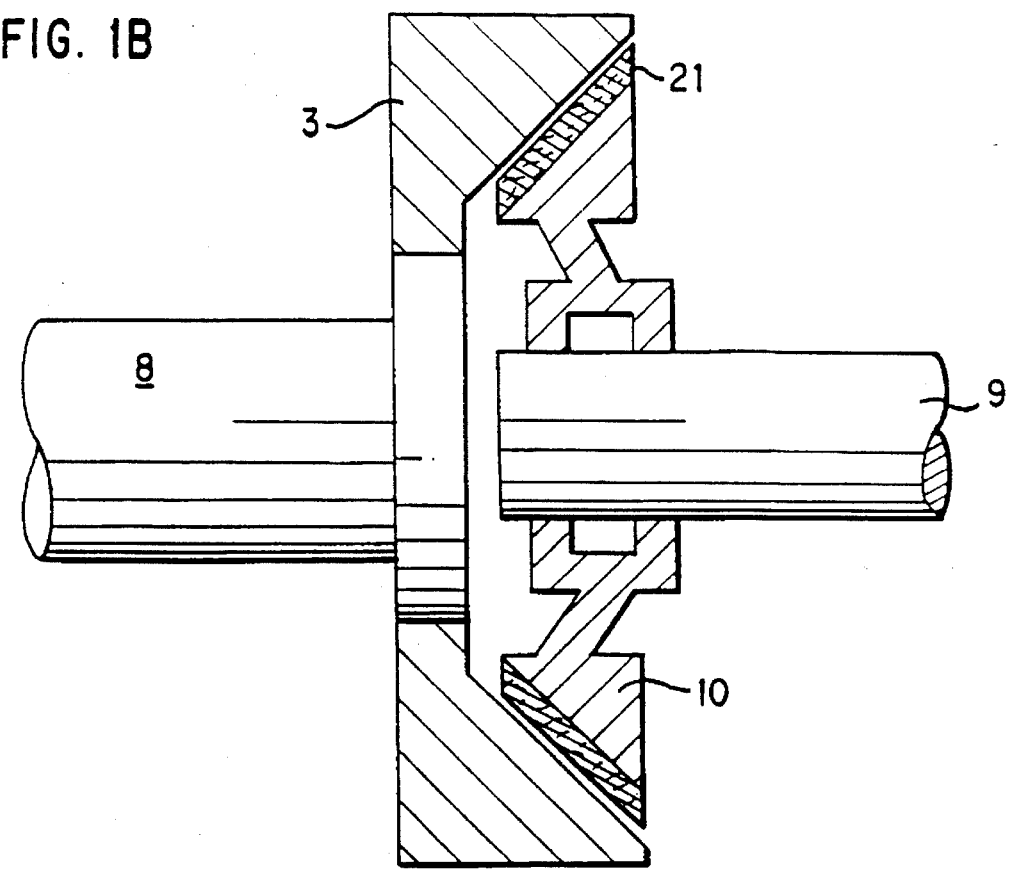
FIG. 1B is a partially schematic side section view of a cone clutch utilizing a beam mounted pad support according to the present invention.

An example of a cone clutch assembly employing beam mounted friction pads according to the present invention is illustrated in FIG. 1B. Since the present invention relates to the construction of the friction pads, rather than the details of the clutch assembly, per se, the use of the beam mounted friction pads of the present invention is illustrated with respect to a relatively simple cone clutch. From this drawing, it is possible to see that the friction pads of the present invention can be applied to a wide variety of clutch applications.

As shown in FIG. 1B, the cone clutch assembly includes a female cone surface ground inside the rim of a flywheel 3 secured to a first shaft 8, and a male clutch member including a carrier 10 secured to a second shaft 9. As is known, the male member 10 is biased by a spring or the like into engagement with the female member, so that the friction linings 21 of the friction pads 20 are brought into contact with the corresponding surface of the female member. The clutch can be disengaged by simply sliding the male member away from the female member against the bias of the spring. In the illustrated embodiment, the carrier 10 is provided with flexibility so as to allow even pressure distribution (and hence temperature build-up) across the clutch linings.

Figure 1C:
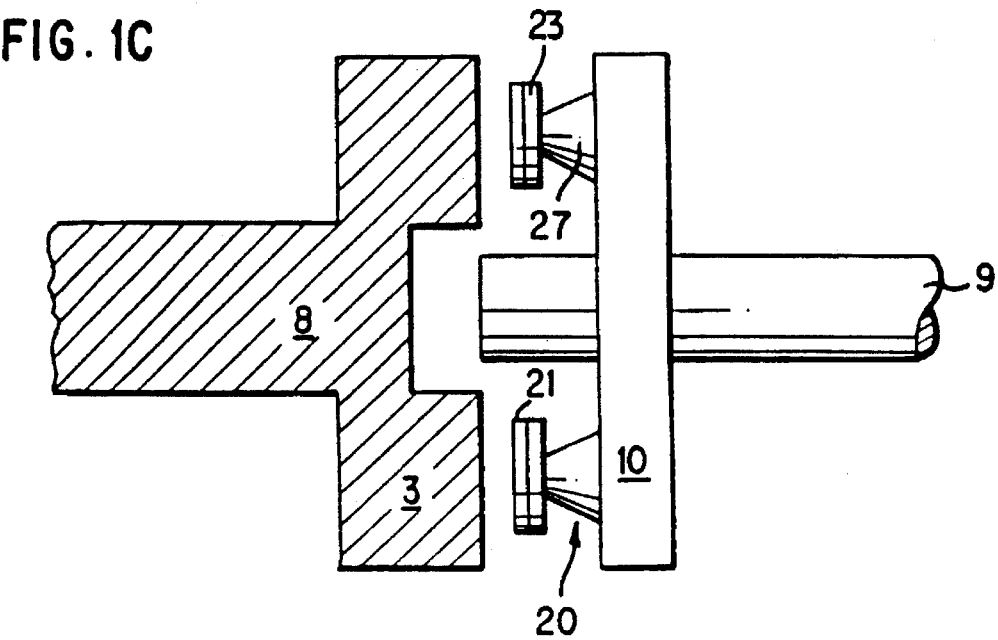
FIG. 1C is a partially schematic side cross-section of a presser plate clutch construction according to the present invention.

An example of a presser plate clutch assembly employing beam mounted friction pads according to the present invention is illustrated in FIG. 1C. Again, since the present invention primarily relates to the construction of the friction pads, rather than the details of the clutch assembly, per se, the use of beam mounted friction pads of the present invention is illustrated with respect to a relatively simple presser plate clutch assembly. From FIG. 1C, it is possible to see that the friction pads of the present invention can be applied to a wide variety of clutch applications.

As shown in FIG. 1C, the presser plate clutch assembly includes a first shaft 8 and a second shaft 9, a plate 3 connected to or formed integrally with the first shaft 8, and a carrier 10 formed integrally with or secured to the second shaft 9 for rotation therewith. The carrier 10 carries a plurality of friction pads 20 including a friction pad surface 21, a support surface 23 and a support structure 27. As is known, the plate 3 and the carrier 10 are typically spring biased either toward or away from each other, and actuation means are provided to move the plate 3 and carrier 10 against the bias of the spring to either engage or disengage a clutch. As is discussed below, the support structure allows movement of the pad support surface 23 and the friction pad 21 so as to equalize pressure on each of the friction pads 21.

In this example, to illustrate the basic principles applicable to all progressive engagement clutches, a simple clutch stripped of all complications, such as the actuation mechanism, is shown. The clutch includes a first plate 3 mounted to a first shaft and an opposed carrier 10 mounted to a second shaft. The shafts are carried in bearings and rotatable about a common axis. When the carrier 10 is moved, i.e., actuated, toward the plate 3, the friction pads 20 are brought into contact with the disc 3 so that torque is transmitted. Because of the beam mounted support of the friction pads 20, the frictional force is evenly applied among the various friction pads. Since there is even pressure distribution across the friction surfaces, heat build-up is achieved and maximum frictional effect is obtained.

As indicated earlier, the present invention relates to friction pads which can be used in brakes and/or clutches. The beam mounted pads can be applied to virtually any known brake or clutch construction in which even pressure and temperature distribution and/or proper pivoting ability are required. Likewise, the actively controlled support structures discussed below can be applied to various constructions.

Figure 1D:
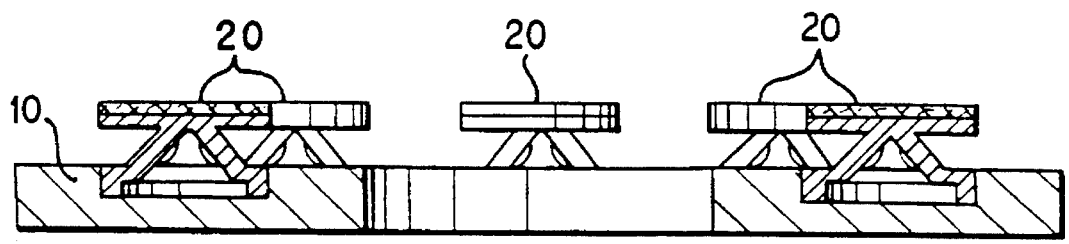
FIG. 1D is a sectional side view of a pad carrier construction of the type shown in FIG. 1C according to the present invention.
Figure 1E:
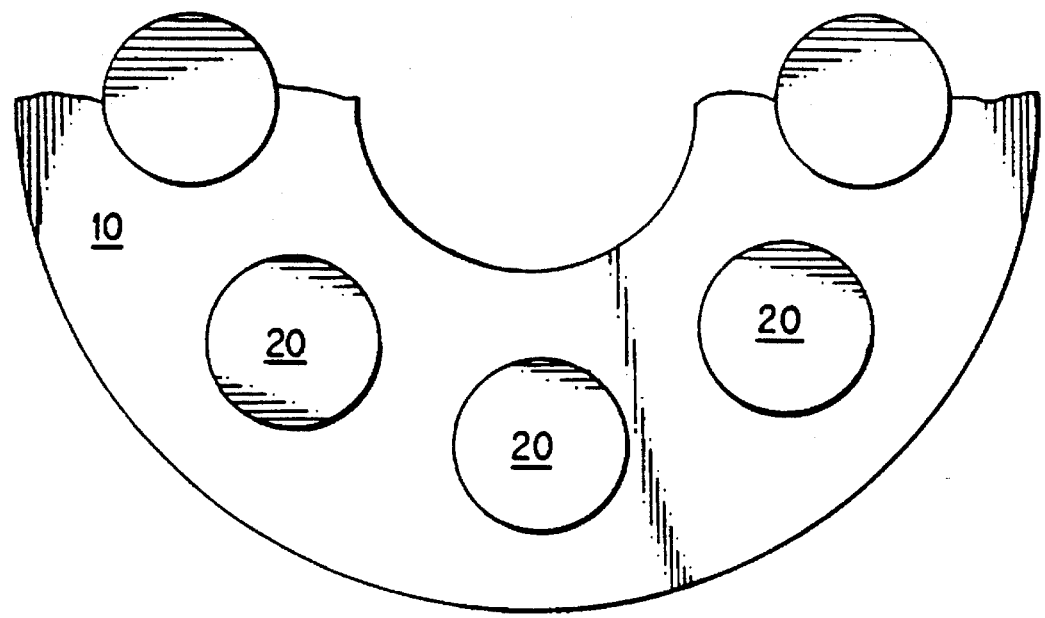
FIG. 1E is a top view of a portion of the pad carrier of FIG. 1D.
Figure 1F:
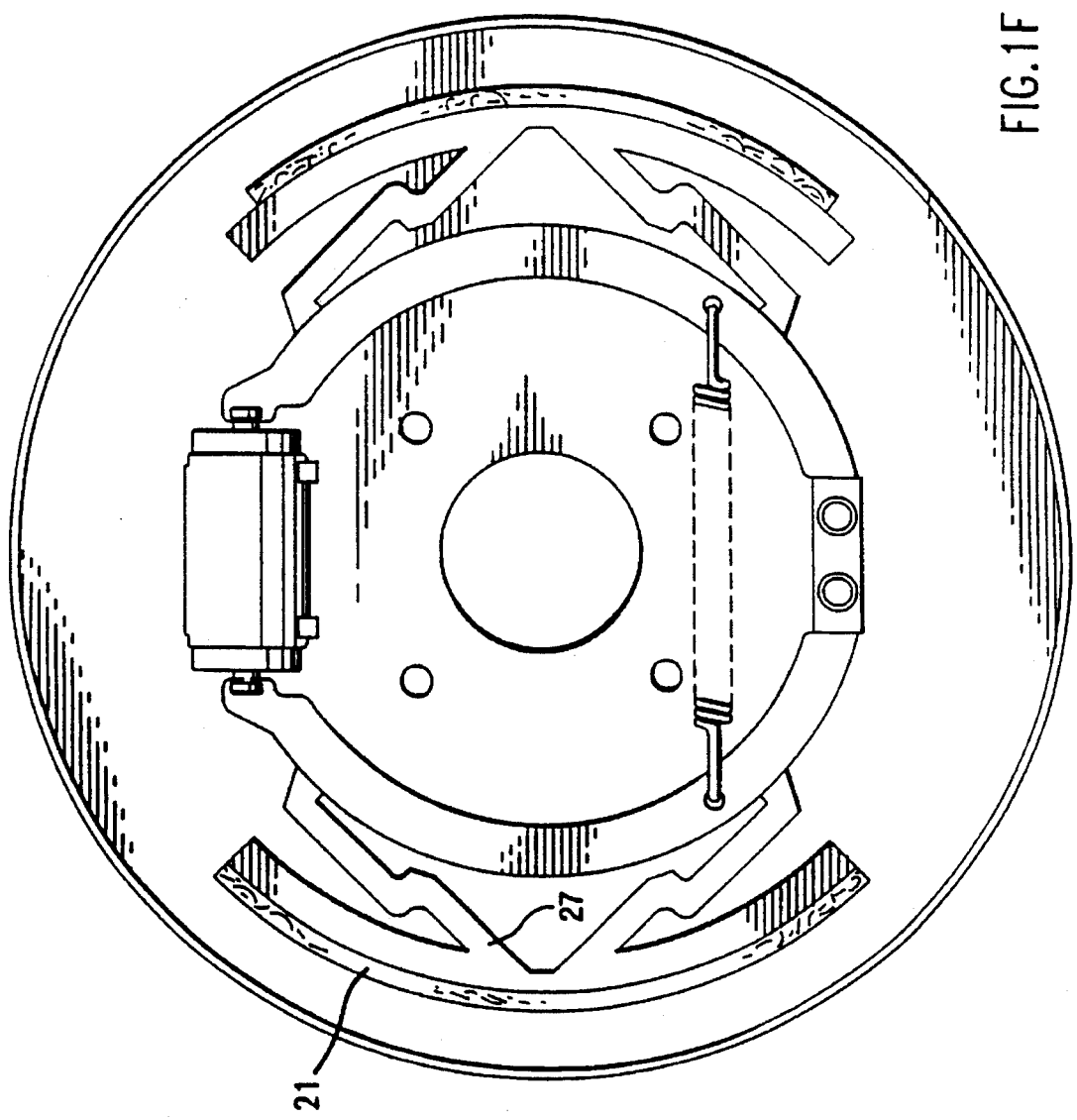
FIG. 1F shows a conventional Rear Wheel Brake assembly modified to include a friction pad support according to the present invention.

FIGS. 1D and 1E illustrate the carrier 10 and pads 20 of a presser plate clutch assembly employing beam mounted friction pads according to the present invention.

In FIG. 1D, the carrier member 10 can include a plurality of openings such as bores formed therein and a plurality of friction pad members 20 mounted in the openings. The friction pads may be circumferentially spaced as indicated in, for example, FIGS. 1E, 7–9, 16A, 17B and 18B. In FIG. 1D, a multi-ligament, dog leg type support structure is illustrated. However, where appropriate, any of the support structures disclosed herein can be used.

Throughout the following discussion, it should be kept in mind that any of the friction pad constructions disclosed herein are usable, or easily adaptable for use, in either clutch or brake assemblies in the manner disclosed generally in FIGS. 1A–1F. Thus, although in some instances specific examples show friction pads used in a brake construction, the friction pads are also usable in a clutch friction construction. Further, the flexible carrier structures used in brakes can also be used in clutches and vice versa.

The following examples illustrate how various support structure configurations and support structure modifications influence the deflection characteristics of the& friction pad support. These configurations and modifications can be combined in any desired manner to achieve the specific deflection characteristics needed to obtain optimum temperature distribution (heat build-up) across the surface of the friction pad under normal operating conditions so as to reduce wear. One important factor in optimizing the friction support is pressure distribution. In general, pressure distribution is best achieved by support structures having two characteristics. First, the support structure should enable the pad to pivot about a point or line close to the pad surface. In those cases where a thick friction wear surface is used, the support should be at a point or line located slightly below the surface in anticipation of wear so that the performance characteristics do not consistently deteriorate as the pad wears. In this way, the friction force does not cause an unbalanced torque. Second, the support structure should have a spring characteristic toward and away from the surface to be engaged. Conceptually, these general requirements may be thought of as a spring mounted ball and socket as shown schematically in FIG. 2.

In FIG. 2, the conceptualized system for supporting a friction surface 21 for contact with a portion to be engaged 3 includes a support structure 27 comprised of a ball and socket and a spring. The ball and socket supports the frictional surface for pivoting in any direction about a point, at the center of the ball, located on the plane of the friction surface. The spring gives the support structure flexibility toward and away from the surface to be engaged. By virtue of this support, the frictional surface is biased into plane contact with the portion to be engaged regardless of any misalignment or forces acting on the surface 21. This results in even pressure distribution. Generally, even pressure distribution results in good—but not necessarily optimum—wear characteristics.

The preferred embodiments of the present invention are based on the conceptual system illustrated in FIG. 2. These preferred embodiments are shown in FIGS. 2A and 2B.

In the preferred embodiment shown in FIG. 2A, the friction lining or pad 21 is supported on a support surface 23. The support surface is supported on a support structure 27, which has the characteristics of the support structure of FIG. 2 in an easily manufactured inexpensive one-piece structure. In particular, the support structure includes a primary support portion 271, in the form of ligaments or a conical element angled toward a point proximate the pad surface. This type of support allows the friction lining or pad 21 and its support 23 to pivot about the point toward which the primary support portion converges. The secondary support portion 272 is a flexible member supported on a rigid tertiary support portion 273 in a cantilever or spring-like manner to provide the desired biasing effect.

It should be noted that the primary support portion is shown converging toward a point slightly below the surface of the friction lining or pad 21. This is because it is expected that the friction lining or pad 21 will wear over time. For instance, the pad could probably wear to about the level indicated by the limit of acceptable wear line (LAW) in FIG. 2A before being replaced. If the support is designed to converge so as to allow pivoting about a point exactly on the surface of the friction pad 21 when originally installed, the performance of the pad will deteriorate steadily from initial use. In order to lessen the effect of wear on the support, the support should be designed to allow pivoting about a point on the surface 21 when the pad is worn about halfway to its limit of acceptable wear (LAW). Again, this assumes that pivoting about a point on the surface results in optimum wear characteristics because it eliminates any tipping force. This is not always true.

The preferred embodiment of FIG. 2B is similar to that of FIG. 2A. The only difference is the shape and orientation of the primary and secondary support portions 271 and 272. The angular shape and orientation illustrated in FIG. 2B are designed to enhance flexibility toward the surface to be engaged and enhance rigidity away from the surface to be engaged.

These general guidelines are useful in obtaining even pressure distribution. However, temperature distribution, not pressure distribution, is the primary determinant of brake wear. Thus, each application is different. In some cases, it is necessary to modify or add to these general support structure requirements in order to optimize temperature distribution. For instance, the present inventor has found that when perfect pressure distribution is achieved, regions of excess heat build-up, i.e., "hot spots", can occur. These regions, or "hot spots", experience excessive wear resulting in early failure of the friction lining. The occurrence of hot spots can be predicted using finite element analysis. In accordance with the present invention, once it is known that such hot spots occur, or are likely to occur, the support structure can be modified to eliminate the hot spot so as to ensure even heat build-up. One example of a modification of the idealized support to optimize temperature distribution is supporting the pad or lining, such that a slight hydrodynamic wedge is formed under load. This can be done in various ways, as discussed below. As used herein, "hydrodynamic wedge" refers to a support in which one edge (the trailing edge) is pressed harder against the surface to be engaged than the other edge (the leading edge or edge approached first by any point on the surface to be engaged). It is not necessary that any portion of the pad be entirely out of engagement to achieve such a wedge. This is because the surface of the friction lining will invariably have numerous asperities. Because of these asperities, fluid (usually air) pressurized by the hydrodynamic wedge can flow between the engaged surfaces to cool the engaged surfaces so as to prevent heat build-up. Thus, the following discussion of various support structure configurations and modifications is intended to be instructive as to steps which can be taken to achieve any desired performance characteristic, such as eliminating hot spots, squeal or brake shoe tipping.

Figure 3:
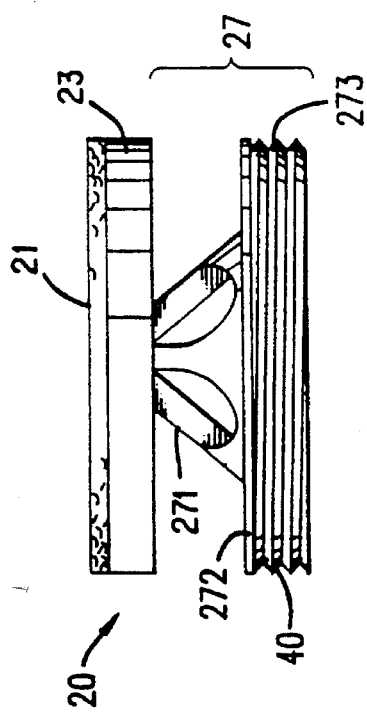
FIG. 3 is a side view of a first modular friction pad according to the present invention.

FIG. 3 illustrates a modified brake or clutch pad construction in accordance with one aspect of the present invention. The pad generally includes a friction lining or pad 21 lining support portion 23 and a support structure 27. The support structure 27 of the brake or clutch pad 20 includes at least a primary support portion 271, a secondary support portion 272 and a tertiary support portion 273. The primary support portion includes a plurality of angled legs 271 converging toward a point on the pad surface and having a complex shape formed from a hollow frusto-conical or frustum section, an outwardly extending secondary support portion 272 and a dog legged tertiary support portion 273. This pad 20 is generally similar to the bearing pad disclosed in U.S. Pat. No. 4,676,668; however, the support structure is necessarily different to achieve even pressure distribution rather than hydrodynamic wedge formation. For instance, in a bearing pad, the ligaments converge toward a point located above the pad surface, whereas in a friction pad, the ligaments converge toward a point on the pad surface (or slightly below in anticipation of wear). The pad 20 in FIG. 3 is formed with a thread 40 at its lower end. As detailed below, the provision of such a thread allows the pad to be releasably secured within the carrier, which is advantageous in some cases.

FIGS. 3A–3F illustrate other forms of frusto-conical or frustum shaped brake or clutch pad constructions.

Figure 3B:
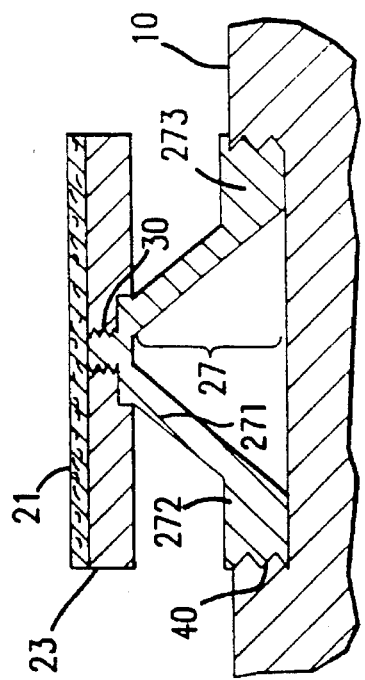
FIG. 3B is a cross-section of another modular friction pad according to the present invention.
Figure 3A:
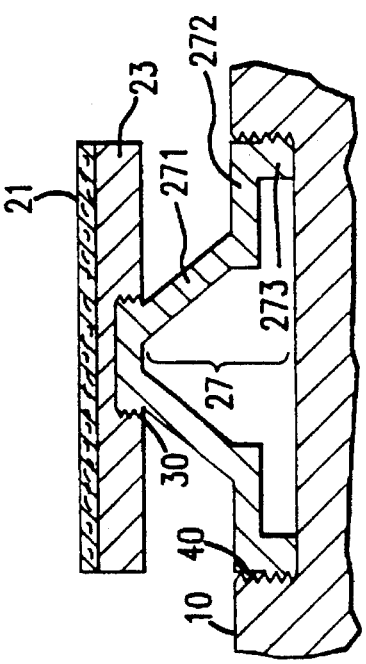
FIG. 3A is a cross-section of a modular friction pad assembled in a carrier.

FIG. 3A shows, in cross-section, a pad of the type shown in FIG. 3 mounted in a carrier 10. The pad includes a friction pad support portion 23 and a beam like support structure 27 supporting the pad portion for deflection under load. In the illustrated example, the support portion includes a primary support portion 271 comprising a plurality of angled beams or ligaments formed from a frusto-conical body. The legs or beams are angled toward a point located on or slightly below the pad surface in anticipation of some wear. The support portion 27 further comprises an annular membrane 272 secondary support portion, and a dog leg 273 tertiary support portion. The pad 20 is releasably secured in the carrier 10 by threads 40 formed at the lower end of the pad. In a similar manner, the friction pad support surface 23 of the pad is releasably secured to the support structure 27, by threads 30 formed at the upper portion of the support structure 27.

The pad of FIG. 3B is similar to that of FIG. 3A with several exceptions. First, a connecting post 30 having threads is used to provide the releasable connection between the friction pad support surface 23 and the support structure 27. Second, the secondary and tertiary support portions 272 and 273 of the support structure have no flexibility relative to one another, i.e., they are formed as part of the unitary dog leg.

FIGS. 3C and 3D illustrate another form of frusto-conical pad 20. This pad differs from the pads of FIGS. 2, 3A and 3B in that primary support portion 271 is a continuous hollow frusto-conically shaped member 271, rather than a plurality of beams or ligaments formed from such a member. The continuous frusto-conical shape which forms the primary support portion 271 tapers toward a point located on (or slightly below) the surface of the pad portion 23. Also, the frusto-conical primary support portion 271 is supported on a single dog leg portion 273. The continuous construction of the primary support portion 271, as well as the rigid dog leg portion 273, make this pad significantly more rigid than the pads of FIGS. 2, 3A and 3B. Such a rigid pad would generally be used in high load applications. Although not specifically shown, it should be appreciated that the pad portion 23 could be formed either integrally or separately from the support portion 27. Also, the dog leg or tertiary support portion 273 could have a connecting means, such as a screw thread, formed thereon.

FIGS. 3E and 3F show another frusto-conically shaped pad according to the present invention. This pad is similar to that of FIGS. 3C and 3D, except that it includes a secondary support portion 272 in the form of a continuous membrane. As detailed below, the membrane can be divided into a plurality of beams by providing openings in it. The provision of the membrane or other secondary support portion 272 gives the support structure 27 enhanced flexibility (particularly in the vertical direction), such that the pad of FIGS. 3E and 3F is more flexible than that of FIGS. 3C and 3D. In this way the pad is given a spring characteristic.

It should be noted that any of the pad configurations disclosed herein can, if desired, be used as part of a modular system. This is done, for example, by forming the pad portion and the support structure as separate connectable pieces and/or providing a means for releasably securing the support structure to the carrier. Hence, for any of the pads described herein, the friction pad support surface 23 may be formed separately from the support structure 27 and provided with a connector which cooperates with a complementary connector in the support structure to releasably or non-releasably secure the pad support surface to the support structure during assembly. In the embodiment illustrated in FIG. 3A, the connector is in the form of a thread 30 formed on the upper end of the pad support portion. A complementary threaded bore or screw receiving portion is formed in the pad support 23. Thus, the pad support with the friction pad 21 bonded or otherwise secured thereto can be releasably screwed onto the support structure 27 to form a complete beam mounted brake or clutch pad.

Figure 8:
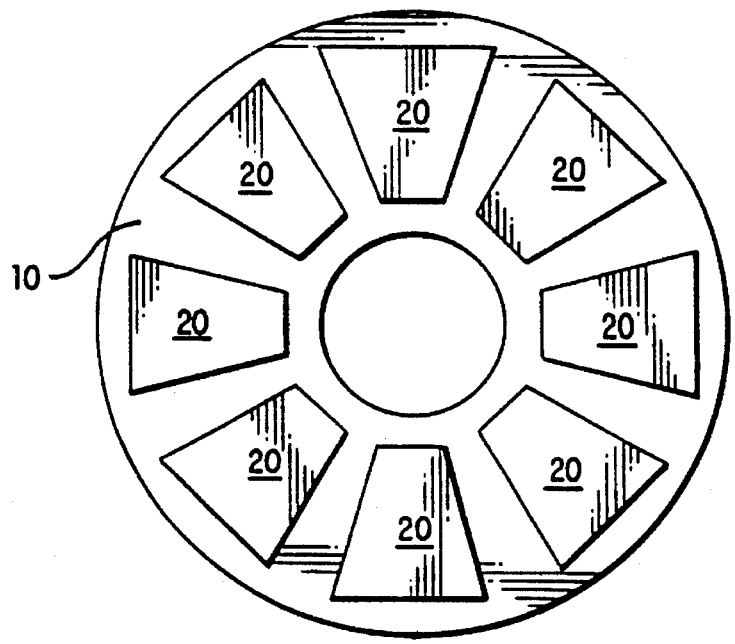
FIG. 8 is a top view of another friction pad arrangement according to the present invention.

Naturally, any known complementary connectors can be employed to connect the pad portion to the support portion. In fact, some dovetail pads such as those shown in, for example, FIGS. 20A–E and FIGS. 31 and 32, could only use non-rotating connectors such as snap on connectors; screw type connectors would be unacceptable. Non-rotating connectors are also preferred when non-cylindrical friction pads such as, for example, those shown in FIG. 8 are used. Moreover, the pad may be either releasably secured, i.e., secured in a manner which enables repeated release and re-securing in a normal manner, or non-releasably secured to the pad portion. For instance, the pad portion may be press fit onto the support portion; cam-locked onto the support portion (non-releasable); keyed onto the support portion (releasable); or snap fit onto the pad portion (generally non-releasable). Preferably, the friction lining 21 is molded or otherwise formed directly on the support structure. Examples of connectors are shown in FIGS. 12A–12F and discussed below.

Forming the pad support and the support structure separately offers considerable advantages over previously known unitary constructions. For example, different friction linings and pad supports may be associated with any particular support structure so that standard pad supports and standard support structures may be combined to provide a wide variety of pads suitable for use in numerous clutch and brake applications. Thus, through the provision of a predetermined number X of standard friction pad and pad support portions and a predetermined number Y of standard support structures, X times Y variations of pads can be constructed. In this way, virtually any desired performance characteristic can be obtained. The versatility of the modular system can be further increased through the use of spring-like beam mounted carriers 10 as discussed below.

The standard pad supports and support structures can be varied according to shape, material and size to yield desired performance characteristics. For example, the pads can be formed of polymeric materials, metal, ceramic or composites. As discussed in detail below, any or all of the pads, support structures and carriers may have a "smart" structure, such that the pad adjusts itself in response to actual conditions and these components may also have dynamically or actively controllable structures.

The shape of the friction pads will normally be dictated by manufacturing and performance considerations. Typically, the shapes shown in FIGS. 7–9 would be used. However, manufacture of any desired shape is made easier when the friction pad supports are formed separately. For example, the pad supports can be stamped or molded even when the entire pad can not be molded.

It is well known that the size of the brake or clutch pad affects its performance. In clutch applications, it is preferable to have a nearly continuous frictional surface. Hence, it is usually desirable to size the friction pads such that when the clutch is assembled, the friction pads or linings are nearly in contact.

In accordance with another aspect of the present invention, the support structure 27 can also include a connector 40 at its lower end to allow the pad 20 to be releasably secured to the carrier 10 via a complementary connector formed in the carrier. In the embodiment illustrated in FIG. 3A, a thread is formed on the outer periphery of the tertiary support portion 273 and complementary thread receiving bores are formed in the carrier. By virtue of this construction, the friction pads can be easily threaded into the carrier 10 to facilitate assembly and replacement. Moreover, when the friction pad 21 becomes worn, the carrier 10, which is significantly more massive and expensive in terms of material cost than the friction pads, can be salvaged.

Figure 12A:
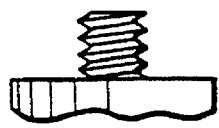
FIG. 12A is a detail side view of a screw type modular connector.
Figure 12B:
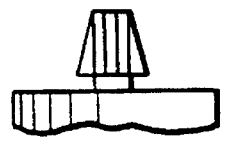
FIG. 12B is a detail side view of a locking spline type modular connector.
Figure 12D:
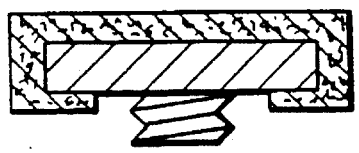
FIG. 12D is a side cross section of a modular friction pad with a screw type connector in which the friction pad has a different material molded onto a base made of a different material.
Figure 12C:
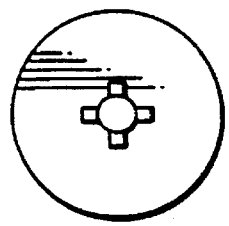
FIG. 12C is a top view of the locking spline type modular connector of FIG. 12B.

Again, any known form of complementary connectors can be used to secure the pads 20 to the carrier 10. Examples of alternative connectors are shown in FIGS. 12A–12C and the dovetail construction of FIG. 20A et. seq., and are discussed below. However, as noted above, complementary connectors which are selectively releasable, such as the illustrated threads, offer advantages by, among other things, enabling standardization.

Figure 4A:
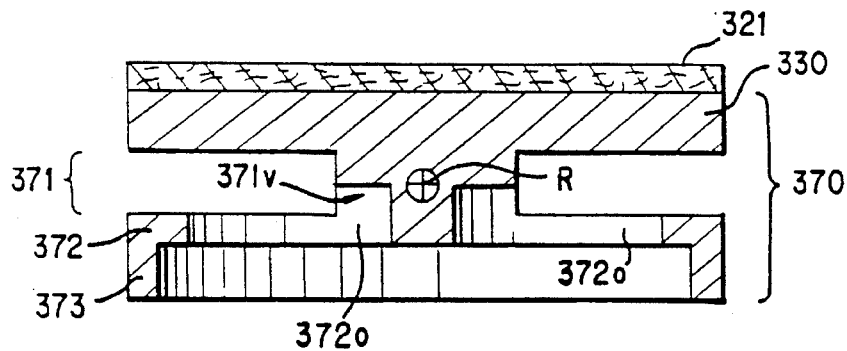
FIG. 4A is a cross-section of a cylindrical friction pad according to the present invention.
Figure 4B:
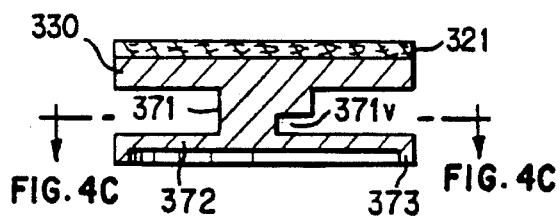
FIG. 4B is a cross-section of another cylindrical friction pad according to the present invention.
Figure 4E:
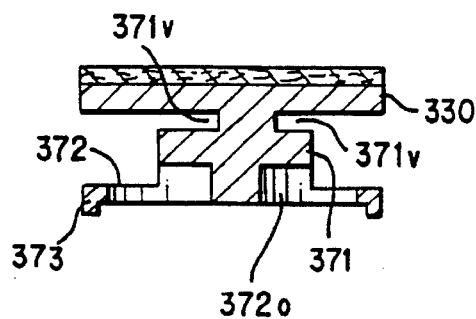
FIG. 4E is a cross-section of the cylindrical friction pad of FIG. 4D.
Figure 4C:
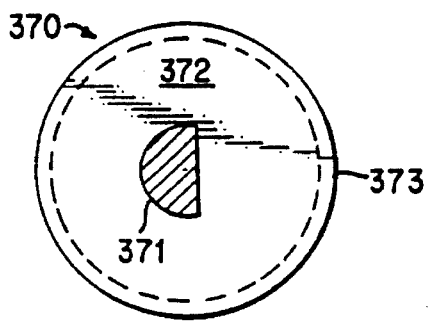
FIG. 4C is a cross-section of the friction pad of FIG. 4B along the lines indicated in FIG. 4B, with hidden lines indicated in phantom.

FIGS. 4A–4C illustrate pivoting type pad constructions in which the primary support portion 371 is essentially a substantially rigid single cylindrical or pedestal type member supported to pivot about an axis. To simplify their depiction, the pads are shown as unitary members. Naturally, the pads can have separate pad portions and support portions and include threads or other means to facilitate their attachment to the carrier 10.

In the example shown in FIG. 4A, the secondary support portion 372 is a membrane divided by openings 372o into beams and the tertiary support portion 373 is a continuous annular flange. The pad also includes a friction pad 321 and a friction pad support 330 which may be formed integrally (as shown) or separately in the modular style described above. This construction is simpler than the aforementioned construction because of the relative simplicity of the primary support portion. The primary support member 371 functions as a pivot type support. To enhance the pivot effect, the pedestal and membrane are undercut by extending (such as by milling) holes 372 through the membrane and partially through the pedestal. In addition to the pivotability provided by the first support portion 371, the second support portion 372 is flexible so as to allow the pad to move in any direction to adjust for uneven loading.

Alternatively, or in addition, the pedestal can be undercut by forming a groove in the pedestal, as shown in FIG. 4C. As noted above, the provision of holes through the membrane 372 divides the membrane into beam portions. The nonsymmetrical nature of the undercut 371v causes the pedestal 371 (and hence the pad portion 330) to rock about an axis R which is transverse to the major axis of the friction pads. The major axis is defined as the longitudinal axis of the pad which, in the case of a pad mounted in a bore in a carrier, typically corresponds to an axis. This axis is transverse to the plane of the friction pad surface (unloaded), which axis passes through the center of the bore and the geometric center of the friction pad surface. The division of the continuous membrane 372 makes it possible to bias the pad in a predetermined direction. Specifically, the pad can be biased in a predetermined direction by providing nonsymmetrical openings 372o in the membrane or secondary support portion 372. Whenever, by the provision of nonsymmetrical openings or other structural features, a support structure is made to be more flexible in one direction than in the other direction, it is biased in the direction of greater flexibility. By virtue of the illustrated construction, the pad 20 tends to deflect more easily about the axis R than about any other axis which is transverse to R. Both the undercut and the nonsymmetrical openings thus bias the pad in a predetermined direction. A locating means of the type discussed below can be used to ensure proper positioning of biased pads in the carrier.

Biasing a pad in one direction presents problems in certain applications requiring bidirectional operation. Notable among these is automotive applications which require operation in reverse as well as forward. However, since the demands in reverse are normally not as great as in forward, it might still be desirable to bias the pad for optimum performance in one direction, notwithstanding the consequent drop off in performance in the opposite direction. The primary benefit of biasing the pad in one direction is that this allows deflection while maintaining high load capability in one direction. Of course, the desirability of this depends on the requirements of each particular application.

FIGS. 4B and 4C show a cross-sectional side view of a pad having a construction similar to that of the pad of FIG. 4A, except that the secondary support portion 372 is a continuous membrane and the undercut 371v is provided by forming a groove in the pedestal 371. As noted previously, because of the undercut 371v, the pad tends to rock about a predetermined axis R. The resulting nonsymmetrical loading of the membrane causes the pad support 330 to deflect downward under loading.

Naturally, many modifications of this pad support construction are possible. For example, the membrane support portion 372 can be provided with openings to provide additional flexibility in the membrane. Such openings may be provided nonsymmetrically to bias the friction pad. Also, the continuous peripheral tertiary support portion 373 can be divided into a number of circumferential beam portions to provide additional flexibility to the support structure, bias the support structure in a predetermined direction and/or make it possible to position the pad precisely, as discussed below.

Figure 4D:
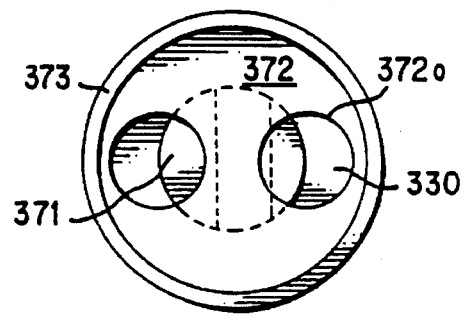
FIG. 4D is a bottom view of another friction pad according to the present invention with hidden lines indicated in phantom.

FIGS. 4D and 4E illustrate another form of friction pad. This friction pad incorporates the features of both the friction pad of FIG. 4A and the friction pad of FIGS. 4B and 4C. Specifically, the friction pad includes both openings 372o and cuts 371v. This demonstrates the ability to combine structural modifications as necessary to achieve a desired result.

As can be appreciated from this discussion, the design of any of the friction pads of the present invention is based upon the addition and/or removal of material from selected portions of the support structure to alter the deflection characteristics of the support structure. In this way, the pads may be viewed as a piece of putty from which material is taken or added to in selected areas to increase or decrease the rigidity of the support structure to achieve desired deflection under design conditions. As discussed in detail below, the carrier may also be designed in this way.

As mentioned above, the support structure typically includes two structural characteristics. The first such characteristic is a pivot support for the friction pad about a single axis or multiple axes on or just below the pad surface. The second characteristic is a spring-like characteristic toward and away from the surface to be engaged. This combination of features will normally permit the pad to deflect so as to equalize loading in an optimal fashion. The support can then be fine-tuned to optimize temperature distribution, prevent tipping, eliminate squeal or any other desirable characteristic.

Naturally, the design of any friction pad according to the present invention must be preceded by an analysis to determine the nature of the support most suited to expected loads. In this way, the support structure can be tailored to the expected operating demands.

Figure 5A:
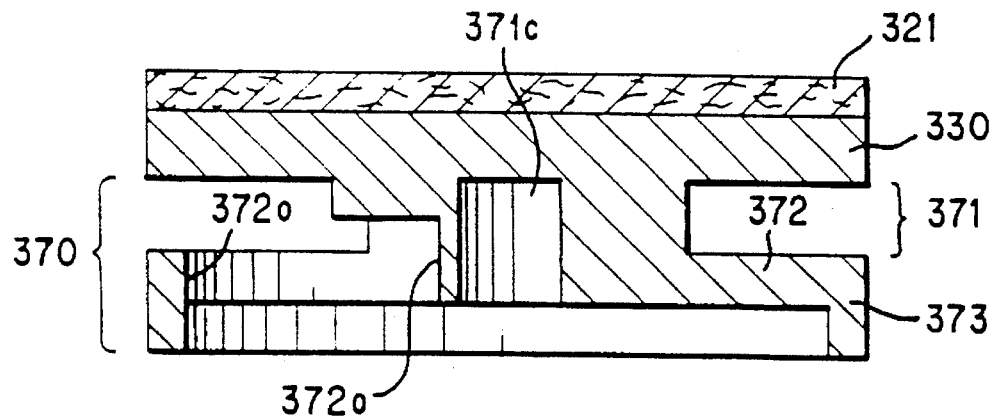
FIG. 5A is a cross-section of a hollow tubular friction pad according to the present invention.
Figure 5B:
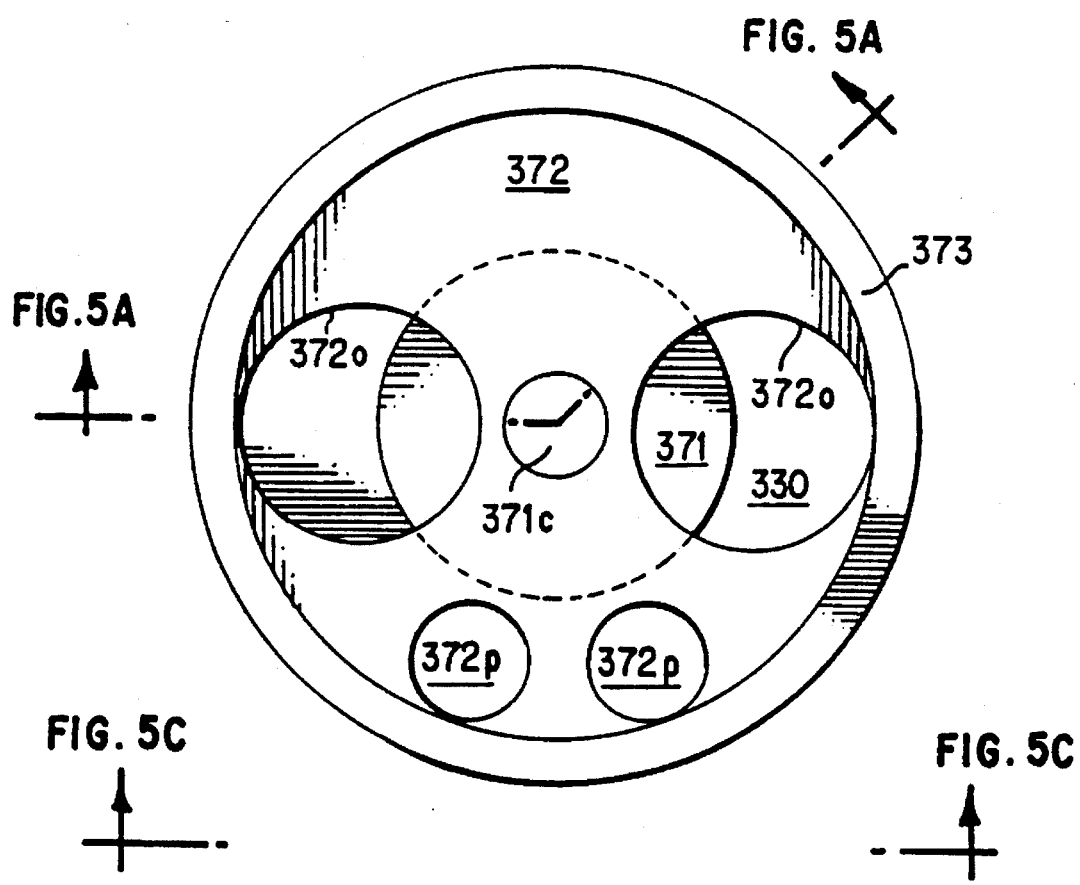
FIG. 5B is a bottom view of the friction pad of FIG. 5A, with hidden lines indicated in phantom.

FIGS. 5A–5E illustrate a pad construction having a tubular support structure 370. A first such construction is illustrated in FIGS. 5A–5C. This construction is generally similar to that shown in FIG. 4A, in that the pad includes a pad support 330, supporting a layer friction material 321; the secondary support portion 372 comprises a membrane-like member (which may or may not be provided with openings) and the tertiary support portion 373 comprises a continuous annular flange. The support structure 370 of FIGS. 5A–5C differs from that of FIG. 4A in that the primary support portion 371 has a central bore 371c formed therein such that the primary support portion is formed as a cylindrical tube-like hollow pedestal. In the embodiment illustrated in FIG. 5A, the annular wall of the hollow pedestal is relatively thick and quite rigid. In order to provide flexibility to this primary support portion, openings, undercuts or overcuts are formed in the annular wall. In the illustrated embodiment, this is achieved by extending the openings 372o formed in the membrane 372 through a portion of the wall, so as to undercut a portion of the wall as best shown in FIG. 5A. Because of this undercut, the primary support portion tends to deflect in the direction of the undercut. Of course, the primary support portion 371 could be biased in other ways, such as, for example, by undercutting the wall in a manner similar to that illustrated in FIG. 4E.

FIG. 5C shows a side view of the pad of FIG. 5A. The view is along the line of the axis R about which the primary support portion tends to deflect.

As shown in FIG. 5B, the membrane of the second support portion 372 can be provided with additional openings 372p which are nonsymmetrically disposed with respect to the major axis of the pad. Because of the non-symmetrical disposition of these openings, the membrane, and hence the second support portion 372, is more flexible in this direction. Accordingly, the entire support structure is pre-biased in the direction of greater flexibility of the membrane, i.e., the direction in which the additional openings 372p are disposed. The provision of additional openings such as those shown at 372p may have the additional function of receiving locating pins formed in the carrier member so as to precisely position a pre-biased pad within the carrier member as discussed below.

Figure 5D:
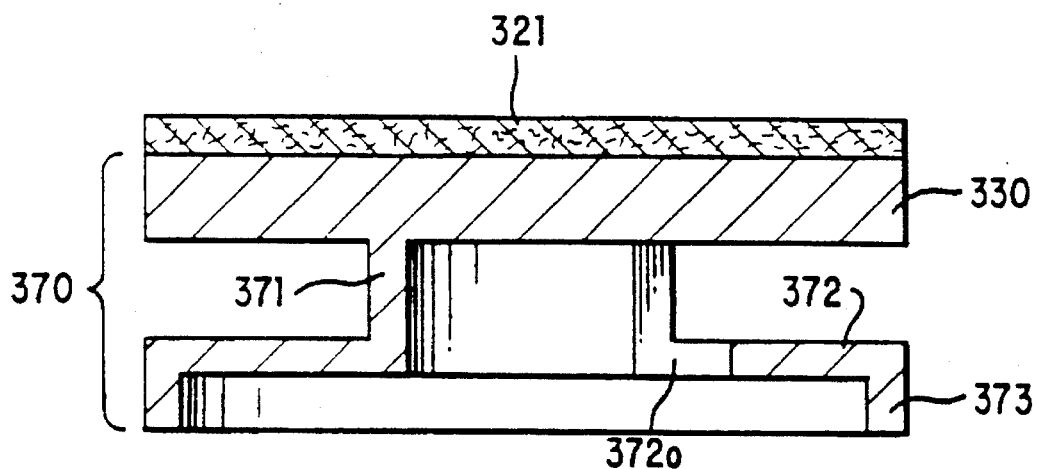
FIG. 5D is a cross-section of another hollow tubular friction pad according to the present invention.
Figure 5E:
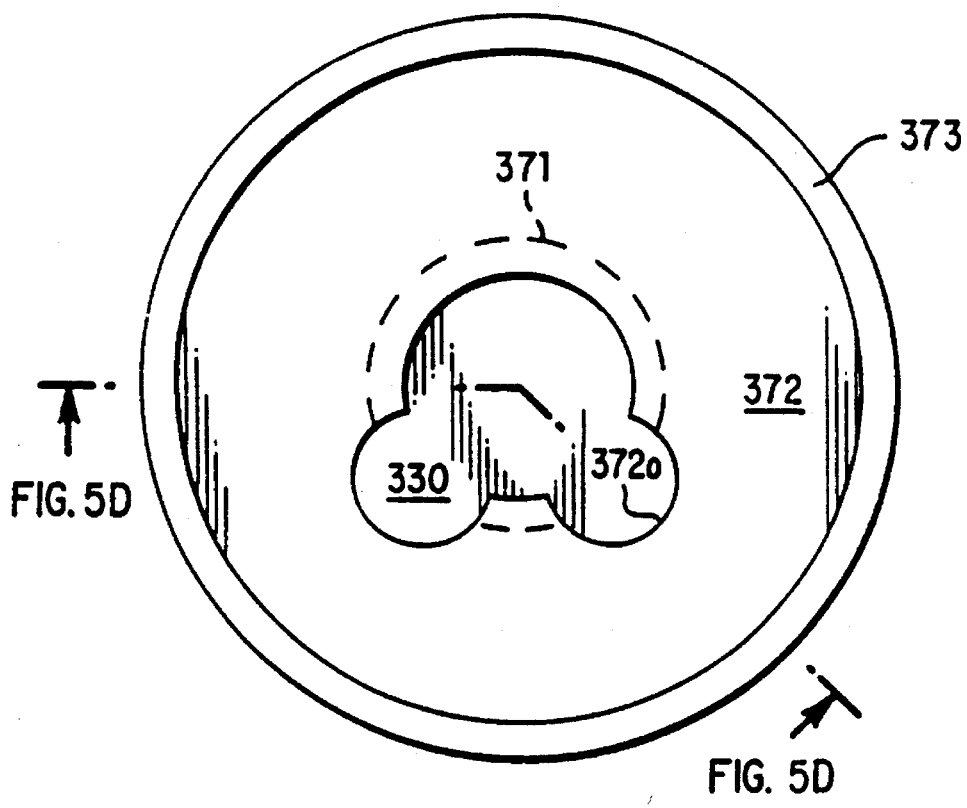
FIG. 5E is a bottom view of the friction pad of FIG. 5D with hidden lines indicated in phantom.

FIGS. 5D and 5E illustrate a modified hollow tubular pad according to the present invention. Like the pad shown in FIGS. 5A–5C, this pad includes a hollow tubular primary support portion 371, a membrane-like secondary support portion 372 and a circumferential tertiary support portion 373. However, the pad shown in FIGS. 5D–5E has a much thinner primary support portion 371. Hence, this portion is much more flexible. Additionally, the openings 372o formed in the membrane 372 extend completely through the membrane 371 and extend up to the pad support 330. Consequently, the openings 372 divide the primary support portion 371 into a plurality of beams formed from a tubular shape. Additionally, in the illustrated embodiment, the openings 372o are nonsymmetrically provided so as to bias the primary support portion toward the direction in which the openings 372o are provided. It should be noted that the openings 372o could be omitted or have a different shape, and that additional structural features such as openings and slots could be provided to alter the deflection characteristics of the pad.

The modified pad construction illustrated in FIGS. 4A–4E and 5A–5E can be formed of modular components in the manner illustrated with respect to FIGS. 2 and 3, namely, by providing a separate pad support and support structure and complementary connectors for releasably securing the pad support to the support structure and/or the support portion in the carrier. However, this is not necessary, particularly for those pads which are easy to form integrally.

In accordance with another aspect of the present invention, the carrier portion 10 of the brake or clutch assembly may be formed so as to provide a deflectable or deflecting support for the pads 20. Essentially, this involves providing structural features (beams, membranes and the like) in the carrier structure such that the carrier operates as a flexible support.

FIG. 13A illustrates a relatively simple flexible carrier structure 10 intended for use in a presser plate clutch assembly similar to that shown in FIGS. 1C, 1D and 1E. Radially extending inner and outer grooves are formed in the carrier 10 to divide the carrier into a pad support section 105, a continuous, relatively narrow primary support portion 106 and a secondary support portion 107. The secondary support portion 107 in this embodiment is simply a flattened base. The carrier is relatively rigid and does not provide any flexibility in the vertical direction. Nevertheless, provision of the radially extending grooves allows some pivoting flexibility of the pad support portion 105. FIG. 13A also illustrates the use of a locating post 102, as discussed below, to accurately position a pad 20.

FIG. 13B shows a bottom view of the pad 20 supported in the carrier 10 of FIG. 13A. As shown therein, the tertiary support portion 373 of the pad includes a sleeve portion 373s which can be fit over the locating post 102 to accurately position the pad 20 in the carrier 10. The pad 20 is otherwise similar to those shown in FIGS. 5A–5E. Naturally, other types of pads 20 could be used with the type of carrier 10 shown in FIG. 13A.

FIGS. 14A and 14B illustrate a relatively flexible carrier 10 for use in a clutch assembly. Specifically, the carrier 10 includes a cantilevered pad support portion 105, which includes a pad support surface 105a; a continuous outer peripheral beam 105b providing a cantilevered support for the support surface 105a; and a radially inward extending circumferential surface 105c, which is cantilevered from the primary support portion 106. The primary support portion 106 is in turn supported on a membrane-like secondary support portion 107, which is supported on two circumferential legs 108. This construction provides a spring-like support for the pads 20 owing to the flexibility of the secondary support portion 107 and the cantilever support and construction of the pad support surface 105.

The pad and carrier assembly shown in FIGS. 14A and 14B includes frusto-conical clutch pads 20 generally similar to those described above in connection with FIGS. 3C and 3D. However, FIG. 14A shows the possibility of using a pad portion which is composed of a structural base member 23 having a portion of a friction material 21 molded or otherwise formed thereon. Of course, any of the pads disclosed herein could be used with this type of carrier.

FIGS. 15A and 15B illustrate another flexible carrier construction according to the present invention. In this case, the primary and secondary support portions 106 and 107 are similar to those shown in FIG. 13A. However, the pad support portion 105 has a double cantilevered construction which includes a pad support surface 105a mounted on a radially inner circumferential beam 105b, which is cantilevered on a circumferential surface 105c, which in turn is supported on a circumferential beam 105d, which is cantilevered on a circumferential surface 105e. This construction gives the pad support portion a good deal of flexibility in the vertical direction. To provide additional flexibility, a secondary support portion 107 could be mounted on circumferential beams as with the friction pad of FIGS. 14A and 14B.

The clutch pads 20 mounted on the flexible carrier of FIGS. 15A and 15B are simply coin-like flattened pads of a material having a high coefficient of friction. These pads can be formed of any suitable high performance friction material such as asbestos or the like. Additionally, according to another aspect of the present invention, detailed below, the pads 20 can be formed of or include a so-called "smart" or "intelligent" material capable of responding to sensed operating conditions or remotely controlled signals. Of course, any of the other pads of the present invention could be used with this type of carrier, if desired.

Figure 16A:
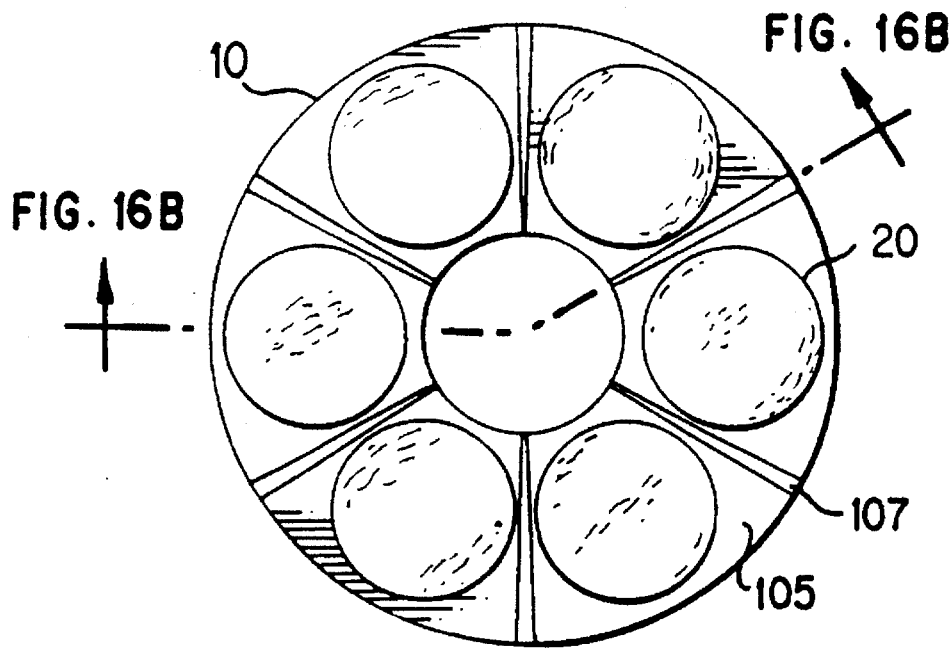
FIG. 16A is a top view of the friction pad portion of a presser plate clutch construction which includes a beam mounted carrier supporting a plurality of friction pads.
Figure 16B:
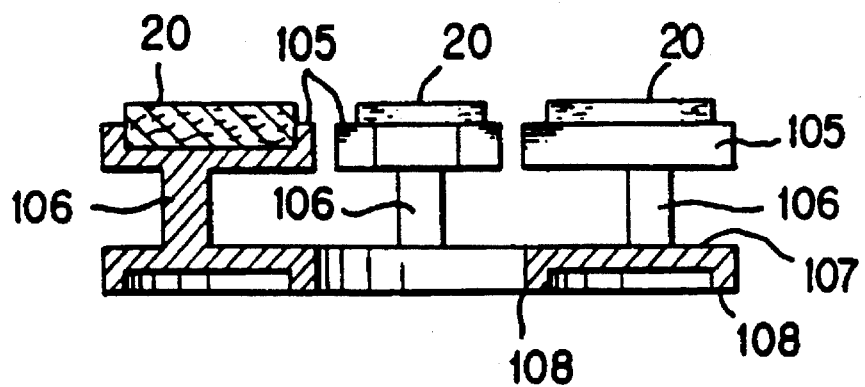
FIG. 16B is a cross-section of the support of FIG. 16A.

FIGS. 16A and 16B illustrate a beam mounted carrier construction according to the present invention. This construction differs from the previously described flexible carrier constructions in that the pads 20 are supported on individual discrete pad support surfaces 105. Each of the pad support surfaces 105 is supported on a support structure which includes a primary support portion 106, a secondary support portion 107 and a tertiary support portion 108. In the illustrated embodiment, the primary support portion 106 is a single vertically extending beam, the secondary support portion 107 is a membrane-like member and the tertiary support portions 108 is formed as two continuous circumferential beams. Again, coin-like pads are illustrated. Naturally, other types of pads can be used.

There are numerous possible arrangements for the support structure, particularly when the pads are to be mounted on discrete pad support surfaces. Examples of other carrier shapes for use in clutches are shown in FIGS. 21–30. The difference between these carriers and the carrier construction shown in FIGS. 16A and 16B primarily resides in different constructions of the primary support portion, the secondary support portion and the tertiary support portion.

In discussing beam mounted carriers for use in clutches, it is useful to visualize the carrier as being formed from a cylindrical blank machined with cuts, grooves and bores to define a support structure. Of course, the carriers can be made by machining but it is not necessary to do so; the carriers can be molded, cast or formed by other means.

Figure 21:
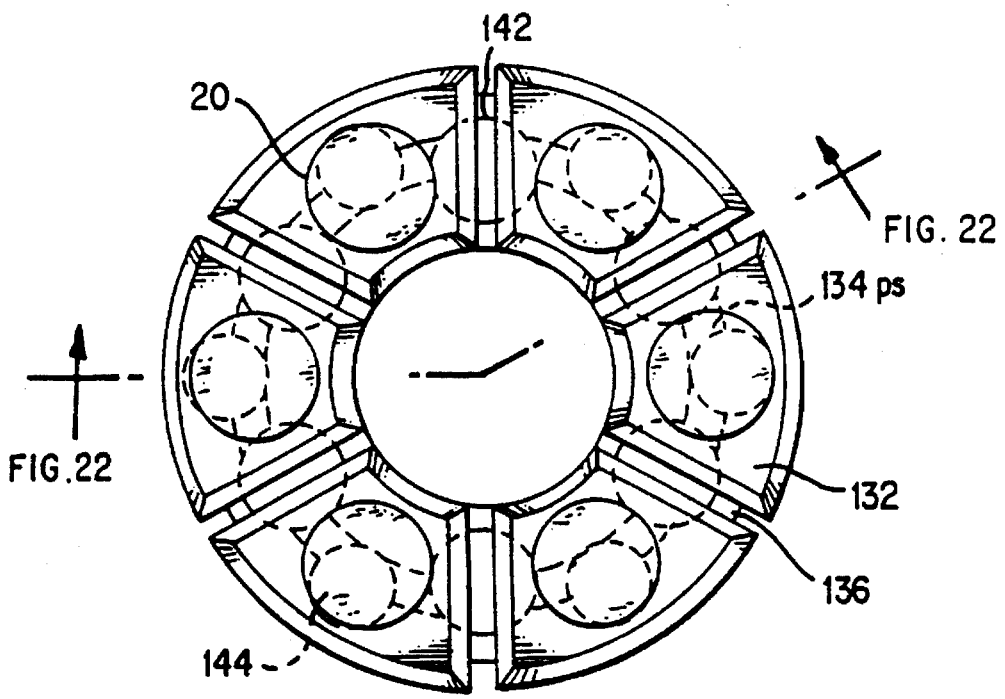
FIG. 21 is a top view of a friction pad support for use in a presser plate clutch construction, according to the present invention, having a two legged beam mounted carrier.
Figure 22:
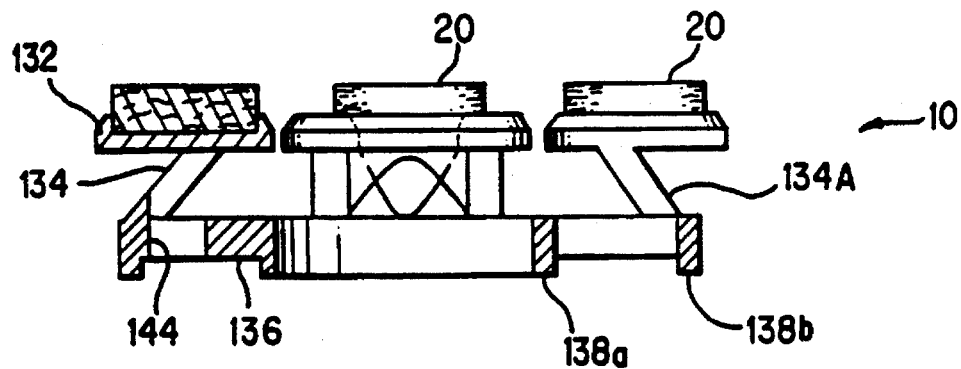
FIG. 22 is a side cross-section of the support of FIG. 21.
Figure 23:
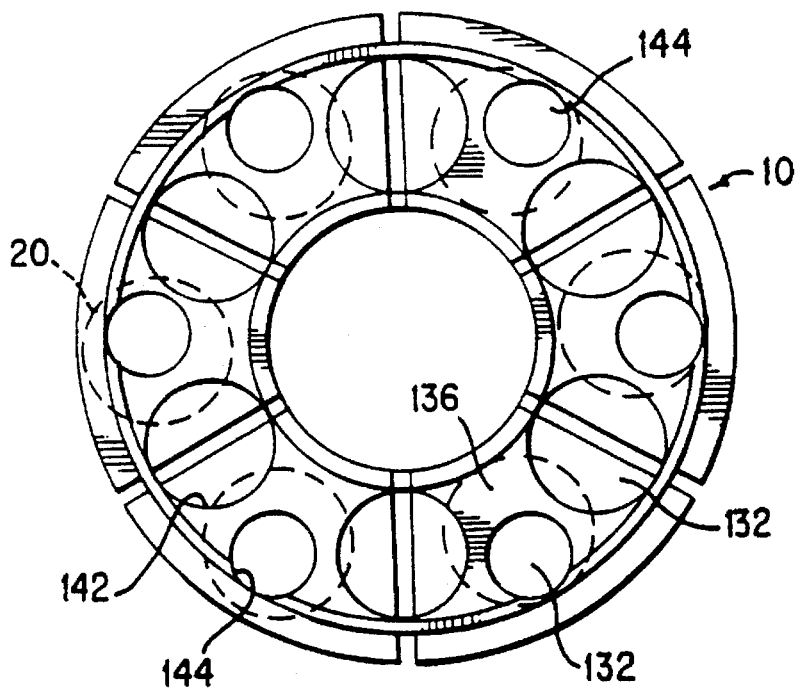
FIG. 23 is a bottom view of the support of FIG. 21.
Figure 24:
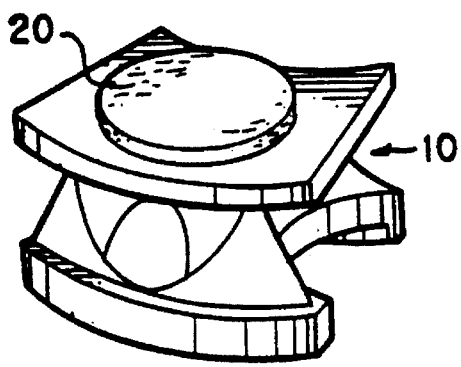
FIG. 24 is a perspective view of a segment of the clutch of FIG. 21.

One such other carrier shape is illustrated in FIGS. 21–24. A top view of the carrier and pad assembly is shown in FIG. 21; a cross-section of the carrier is shown in FIG. 22; a bottom view of the carrier is shown in FIG. 23; and a perspective view of a portion of the carrier is shown in FIG. 24. The carrier 10 shown in FIGS. 21–24 is similar to the carrier of FIGS. 16A and 16B with two exceptions. First, the carrier of FIGS. 21–24 includes an angled or slanted support beam 134A rather than a vertical support beam as in FIG. 16A. Second, the carrier 10 includes additional holes 144 which extend through the support beam 136 to form a cylindrical opening through the slanted or angled beam 134 so as to form elliptical openings in the support beam. The elliptical openings divide the beam into a pair of complex ligaments, the shape of which can be appreciated with reference to the perspective view of FIG. 24. The provision of the openings 144 and consequent division of the slanted or angled beams 134A into complex ligaments significantly increases the flexibility of the carrier support structure of the clutch pads 20 shown in FIGS. 21–24, as compared to the carrier shown in FIGS. 16A and 16B. Thus, the pad support surfaces 132 of the carrier of FIGS. 21–24 deflect in response to a lighter load than do the pad support surfaces 132 of the carrier shown in FIGS. 16A and 16B. It follows that the carrier shown in FIGS. 21–24 is more flexible and thus suitable for light loads, and the carrier shown in FIGS. 16A and 16B is more well suited for carrying pads for heavier loads. Further, the provision of angled or slanted support beams such as beam 134A, with or without openings to divide the beam into complex ligaments, increases the flexibility of the pad support surface in the vertical direction since a vertically applied load creates a moment which tends to cause the beam to deflect toward the center or inner diameter of the carrier which might be desirable.

The pad 20 shown is a simple coin-like pad. The pad 20 can be formed of any high quality friction material. Of course, any other form of clutch pad disclosed herein could be used.

Figure 23A:
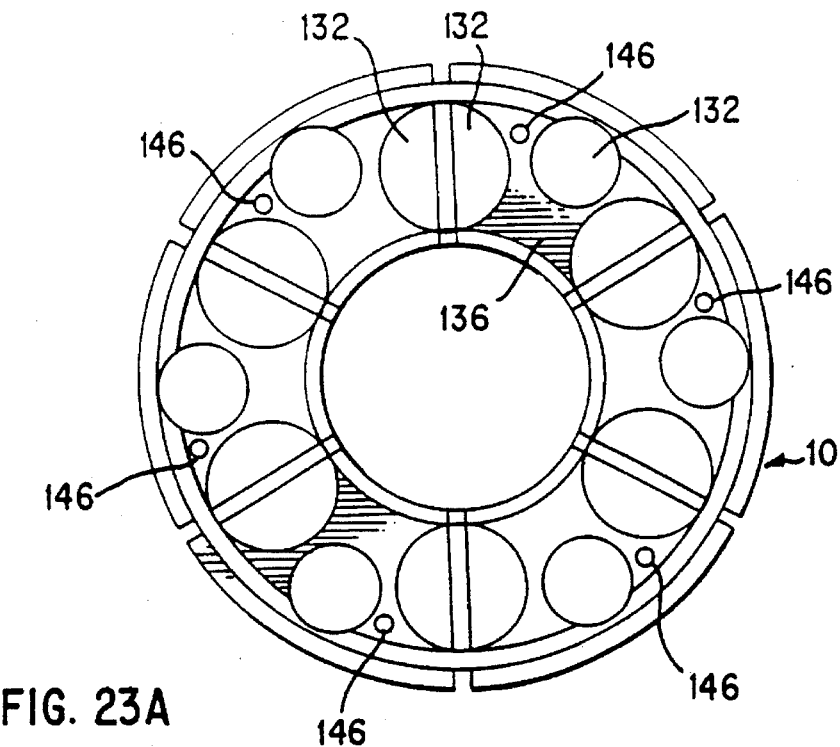
FIG. 23A is a bottom view of a modified version of the support of FIG. 21.

FIG. 23A shows a bottom view of a carrier of the type shown in FIGS. 21–24 in which additional holes 146 are formed the membrane or support beam 136 to enhance the flexibility of the beam or membrane 136 even further. As illustrated in FIG. 23A, the holes 146 are formed nonsymmetrically with respect to each pad support segment. The provision of these holes in such a nonsymmetrical fashion results in a clutch in which the pad supports, and hence the pads, tend to deflect more easily in one direction than in the other direction. In other words, the pads are biased in one direction by the provision of nonsymmetrical openings in the carrier support structure. Naturally, such nonsymmetrically disposed openings can be provided in any of the constructions of the present invention in which it is desired to bias the pads in one direction. It may even be desirable to provide the nonsymmetrically disposed openings or holes such that only selected ones of the pads 20 are biased. As discussed above, nonsymmetrical constructions present problems in automotive and other applications requiring bidirectional operation.

Figure 25:
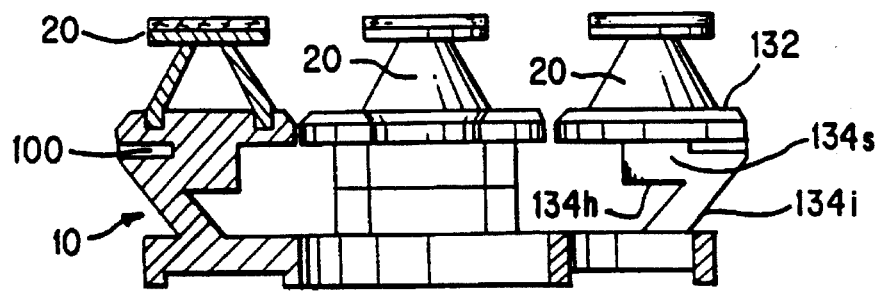
FIG. 25 is a cross-section of another friction pad support for use in a presser plate clutch construction according to the present invention.

FIG. 25 is a cross-sectional view of another clutch construction according to the present invention. In accordance with this construction, each pad 20 is supported on a pad support surface 132, supported on a stub 134s, which is in turn supported on a horizontally oriented beam portion 134h, which is in turn supported on an inversely angled beam portion 134i. In other respects, the carrier construction is similar to that of the previously described carriers. By virtue of this construction, the carrier 10 has a great deal of flexibility in one direction, but it is extremely rigid in the opposite direction. A piezoelectric element 100 may be located between the horizontal beam portion and the pad, as shown, to allow active control of pad tilting. A hollow frusto-conical pad 20 is shown. However, the carrier 10 is able to support other forms of pads of the type described herein.

Figure 26:
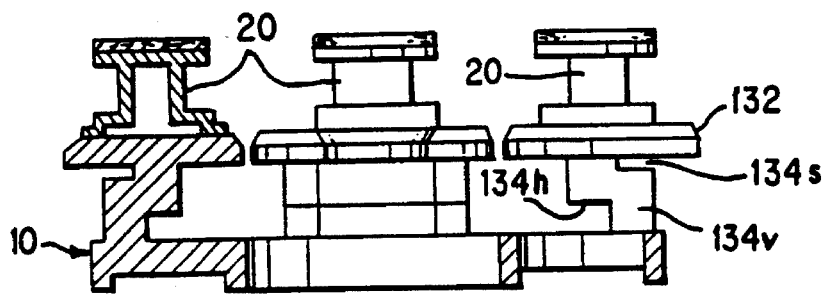
FIG. 26. is a cross-section of another friction pad support according to the present invention.

A similar construction is illustrated in FIG. 26. The difference between the carrier 10 illustrated in FIG. 26 and the carrier 10 illustrated in FIG. 25 is that the carrier 10 illustrated in FIG. 26 uses a vertical beam portion 134v rather than an inversely angled beam portion 134i. The carriers 10 are similar in all other respects. The absence of an angled beam in the carrier of FIG. 26 tends to give the carrier and pad assembly more rigidity in the vertical direction. On the other hand, the membrane type pad 20 shown in FIG. 26 is more flexible than the hollow cone pad 20 of FIG. 25. Naturally, like all other carrier constructions described herein, other forms of pads may be used.

Figure 27:
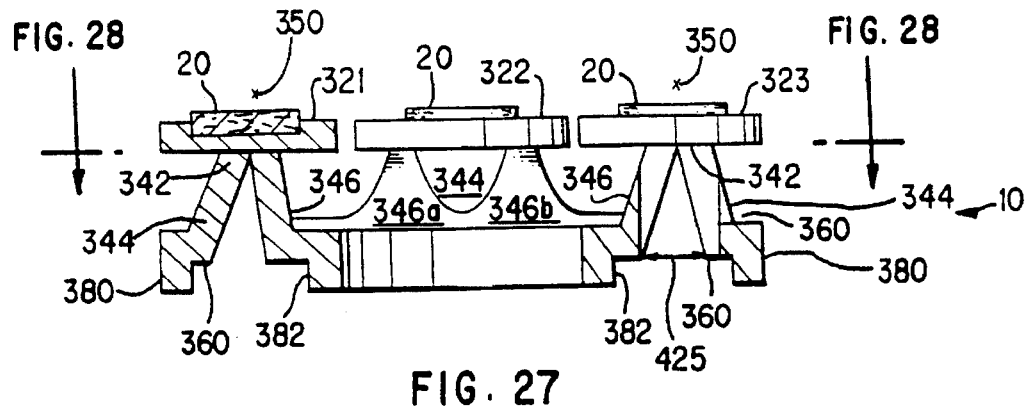
FIG. 27 is a side cross-section of another friction pad support having a beam mounted carrier construction according to the present invention.
Figure 28:
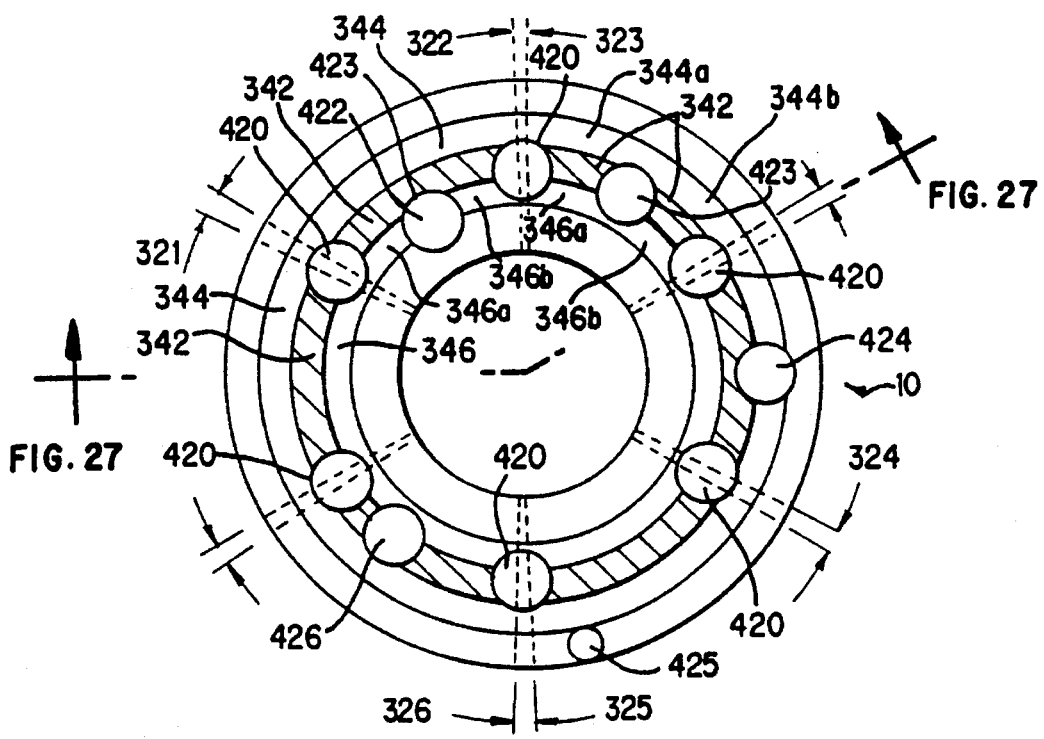
FIG. 28 is a top cross-section of the friction pad support construction of FIG. 27.

FIGS. 27–28 illustrate other clutch constructions according to the present invention. As shown in the drawings, the carrier 10 has a plurality of pad supports 321–326 (shown in phantom in FIG. 28). Each of the pad supports 321–326 are supported on a support surface 342 of a carrier support structure. The carrier support structure includes a primary support portion composed of a pair of nested frustums supported on a secondary support portion, which includes a split peripheral membrane 360, which is supported on a tertiary support portion, which includes a pair of peripheral beams 382. The peripheral beams 380 and 382 are similar to those of the previously described constructions. The membrane 360 differs from the membrane in previously described constructions, since the membrane 360 is radially split by the groove formed in the bottom of the support structure which forms the nested frustums. The inner frustum is inverted with respect to the outer frustum such that the mean center lines of the frustums merge at a point 350 on or near the pad support surface 342 and have a cross-section which appears similar to an inverted V. Since the center lines of the frustums intersect at point 350 above the support surface, the primary support structure supports the friction pad for pivoting about a point on or near the pad surface. This ensures proper deflection.

The beams 346 and 344 which support the pad can be angled toward one another at the same angle, angled toward one another at different angles, one beam angled and one beam not angled, and angled in the same direction. Of course, variations in the degree of angling of the beams in the primary support structure impacts the deflection characteristics of the carrier and pad assembly.

A plurality of holes or openings 420 disposed symmetrically about the support structure divide the nested frustum or inverted V structure into a plurality of support beams 344, 346 and divide the apex of the nested frustums so as to define the pad support surfaces 342. Thus, for example, the pad support 321 is supported on a pad support surface 342 by a pair of complex support beams 344 and 346 which are tapered toward one another and have a complex geometrical configuration defined by the cylindrical extending openings passing through the nested frustum section. As best shown in FIG. 27, the center lines of the beams 344 and 346 intersect at a point 350 on or near the pad surface to ensure proper pivoting support. In this case, the point 350 is slightly above the pad surface such that a small wedge forming moment is created by the frictional force. For certain applications, the formation of a slight wedge might be called for to balance temperature distribution. The individual beams 344 and 346 are supported on a peripheral membrane 360 which is split by the groove which defines the frustums. The membrane is supported by peripheral beams 380, 382. As discussed above, the peripheral beams 380, 382 and the peripheral membrane 360 can be circumferentially split to define individual beam supports.

Numerous modifications to the carrier support structure are possible. For example, deflection of the support structure can be modified by changing the angle of the beams, changing the location of the holes or openings which define the legs, varying the length of any of the beams or membranes, and changing the width or thickness of any of the beams or membranes. In order to illustrate a number of these possibilities, FIGS. 27 and 28 depict a different support structure for each of the pad support surfaces, 321–326. It should be understood that these various support structures are shown in a single carrier for purposes of illustrating the present invention. In normal use, each of the pad supports 321–326 would have a similar, though not necessarily identical, support structure to assure uniform performance.

The support structure for pad support 322 differs from that of pad support 321 because a hole or opening 422 extends through the beam 346 so as to divide the beam 346 into a plurality of beams or sub-beams 346a and 346b. If the diameter and positioning of the opening is like the opening 422, such that the beam is completely separated, the beam is divided into separate beams. On the other hand, if the opening only partially separates the beam (e.g. opening 423), the beam is divided into sub-beams. As shown in FIG. 27, the opening 422 forms an elliptical opening in the side of the beam 346 such that the radially outer beam 344 is visible. By virtue of this construction, the pad support 322 is supported by three angled ligaments or beams, 344, 346a and 346b.

Pad support 323 is supported by four angled beams or ligaments 344a, 344b, 346a and 346b. This structure is achieved by providing a hole or opening 423 which extends through both beam 344 and beam 346 and divides the pad support surface 342 into two sections.

It should be noted that, with respect to all of the modifications discussed herein, the size of the openings should be selected based upon the degree to which the beams 344 and 346 are to be divided into separate beams. In some instances, it may be desirable to completely separate the beam sections, in which case a larger opening would be used. In other instances, such as that illustrated with respect to the support of pad support 323, it is desirable to subdivide the beam at some point along the sidewall of the beam. It should also be noted that although the drawings only show the provision of one opening for pad support structure to divide the beams 344 and 346, it is possible that two or more openings, similar to that of the openings 422–426 shown in FIG. 28, could be provided so as to divide the beams 344, 346 into three or more beams or sub-beams. As always, a determination of the type of support to be employed depends on the desired performance characteristics. Generally, dividing the beams into separate beams or sub-beams makes the support structure more flexible. By making the support structure more flexible in one direction, as with the support structure for pad supports 322, 324 and 326, the pad supports are biased in a predetermined direction.

The support structure for pad support 324 is similar to that for pad support 322, except that the opening 424 extends through the outer support beam 344 rather than the inner support beam 346. Thus, like the pad support 322, the pad support 324 is supported by three angled legs.

The support structure for pad support 325 is similar to that for pad support 321, except that an opening 425 is provided through the outer peripheral beam 380 and peripheral membrane 360 in a nonsymmetrical position. Thus, the pad 325 is biased in a predetermined direction, i.e., the direction of greatest flexibility caused by the provision of the opening 425.

The support structure for the pad support 326 is similar to that of pad support 322, except that the opening 426 which divides the beam 346 is provided in a nonsymetrical fashion so as to bias pad support 326 in the direction of greater flexibility, i.e., the direction of the smaller, more flexible beam.

Each of the pad supports 321–326 is formed with a bore or other opening to allow it to support a pad 20. While a coin-like pad is shown, it is understood that any of the pads disclosed herein could be used. Further, the pads 20 could be releasably secured to the pad supports as discussed herein.

Naturally, any combination of the structural support features illustrated in FIGS. 27, 28 could be employed to achieve desired performance characteristics.

Figure 29:
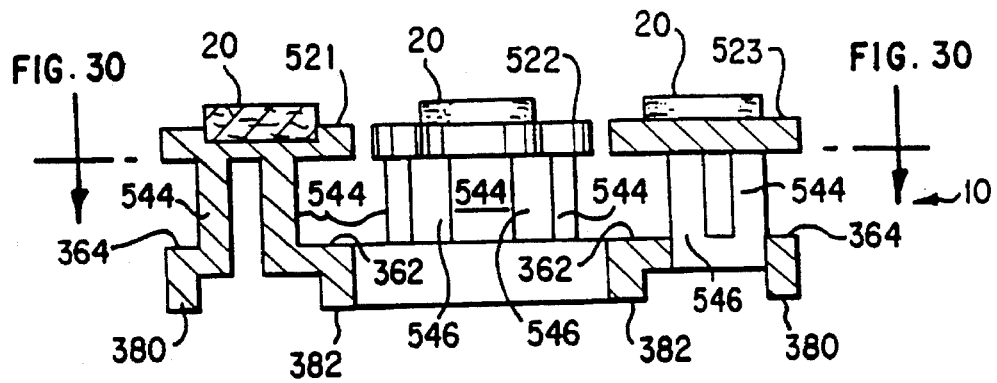
FIG. 29 is a side cross-section of another friction pad support construction having a beam mounted carrier construction according to the present invention.
Figure 30:
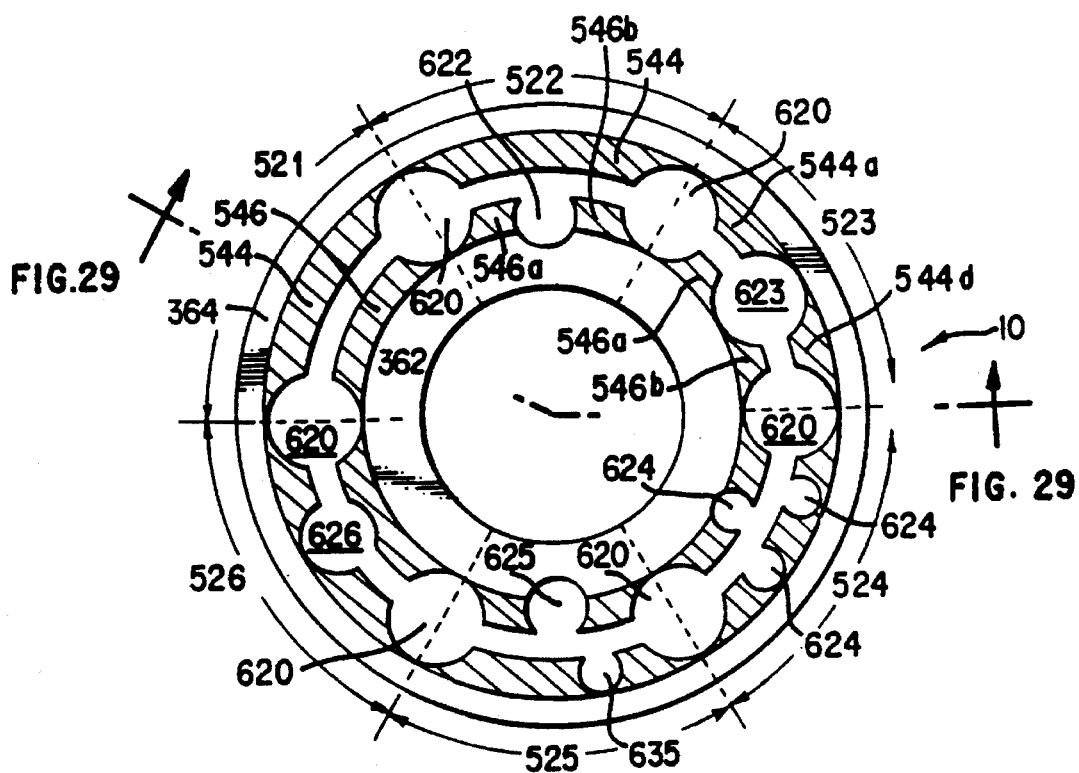
FIG. 30 is a top cross-section of the friction pad support construction of FIG. 29.

FIGS. 29–30 illustrate another carrier and pad assembly according to the present invention. As shown in the drawings, this assembly includes a carrier 10 having a plurality of pad supports 521–526 (location shown in phantom in FIG. 30). Each of the pad supports 521–526 are unitary with, and supported on, a carrier support structure. Generally, the carrier support structure includes at least a primary support structure, including an inner circumferential support beam 546 and an outer circumferential support beam 544; a secondary support portion, including an inner peripheral membrane 362 and an outer peripheral membrane 364; and a tertiary support portion, including an inner peripheral support beam 382 and an outer peripheral support beam 380. As best shown in FIG. 29, the circumferential support beams 544, 546 are defined in part by a deep circumferential channel extending from the bottom of the carrier to the pad support surface. The support beams are further defined by a plurality of holes or openings 620 disposed symmetrically about the pad support structure which separate the beams 544, 546 from adjacent beams. Thus, for example, the support pad 521 is supported on a pair of beams 544 and 546, which have generally accurate side walls. As mentioned earlier, the beam support structure also includes membranes 364, 362 and peripheral beams 380, 382.

Numerous modifications to the carrier support structure are possible. In order to illustrate a number of these possibilities, FIGS. 29 and 30 depict a different support structure for each of the pad supports 521–526. As with the previously described embodiment of FIGS. 27–28, these various support structures are shown in a single carrier 10 for the purpose of illustrating the present invention. In normal use, each of the pad supports 521–526 would have a similar, though not necessarily identical, support structure to assure uniform performance.

The support structure for pad support 522 differs from that of pad support 521 by virtue of the provision of a hole or opening 622 which extends through the inner circumferential beam 546, so as to divide the beam 546 into a plurality of beams 546a and 546b. By virtue of this construction, the pad support 522 is supported by three vertically extending beams or ligaments 544, 546a and 546b.

The pad support 523 is supported by four vertically extending beams or ligaments 544a, 544b, 546a and 546b. This structure is achieved by providing a hole or opening 623 which extends through both beam 544 and beam 546. The thinner beams which result from this modification would naturally have greater flexibility than the support structure for pad supports 522 and 521.

The pad support 524 is supported by five relatively thin, vertically extending beams or ligaments. This structure is achieved by providing a hole or opening 624 to divide the inner beam 546 into two beams and providing two holes 624 to divide the outer beam 544 into three beams.

The carrier support structure for pad support 525 is similar to that for pad support 522 except that an additional opening 635 nonsymmetrically divides the outer beam 544 into two beams. By virtue of the nonsymmetrical division of the outer beam 544, the friction pad is biased in the direction of greater flexibility.

The carrier support structure for pad support 526 is similar to that for pad support 522 except that the outer beam 544 is split rather than the inner beam 546. Further, the opening 626 is somewhat larger than the opening 622, such that a groove is formed on the outer periphery of the inner beam 546 so as to make the inner beam 546 somewhat more flexible.

Naturally, any combination of the support structures illustrated in FIGS. 29, 30 could be employed to achieve desired performance characteristics.

Each pad support surface is formed with a bore or similar opening in which the friction pad 20 is mounted. The pads 20 may be of any of the forms disclosed herein, not just the coin-like pads shown. Further, if desired, the pads can be releasably secured to the pad supports as discussed herein.

FIGS. 29A, 29B, 30A and 30B illustrate in detail a clutch construction which includes a carrier 10, in which each of the pad supports 531A of the carrier support structure are very similar to that used to support pad support 521 in FIGS. 29 and 30. The carrier construction is different, however, insofar as the beams 544A and 546A are circumferentially narrower and vertically shorter than their counterparts in the carrier 10 illustrated in FIGS. 29 and 30. Naturally, shorter beams are more rigid than the comparatively longer beams and narrow beams are less rigid than comparatively wider beams. Moreover, the beam 544A is radially narrower than the beam 546A; whereas in the carrier illustrated in FIGS. 29 and 30, the beams 544 and 546 have equal widths. The difference in radial thickness is compensated for since the large opening 620, which defines the circumferential extent of the beams 544A and 546A, is arranged such that beam 544A is significantly wider in the circumferential direction than is beam 546A. Finally, it should be noted that the openings 620 are significantly larger than the corresponding openings 620 in the carrier construction of FIGS. 29 and 30. Naturally, the larger openings increase the flexibility of the support structure defined thereby.

By virtue of the beam mounted pad support constructions described above, the pads 20 are supported on a carrier which is capable of deflection to alter the orientation of the pads 20. Such a construction is particularly suitable for coin-like pads 20, since the required flexibility can be designed into the carrier rather than the pad 20. However, any of the pads disclosed herein could be used if necessary to achieve the desired deflections. Nevertheless, it is presently contemplated that, under normal circumstances, coin-like pads of high friction material (as illustrated in FIGS. 16A and 16B) would be used, since the provision of individually controllable pad support surfaces 105 and their support on the support structure 106, 107, and 108 enables optimal deflection. Again, the pads may be constructed of high performance friction materials and/or smart or intelligent materials to allow dynamic or active control of wedge formation as discussed below.

While the foregoing description of the possibility of providing a beam mounted carrier generally refers to a particular form of clutch assembly, it should be appreciated that deflection pad technology can be applied to carriers used in virtually any form of brake and clutch device. Thus, the foregoing discussion is applicable to carriers generally, not just these specific forms of carriers depicted. In particular, the techniques for providing structural features, such as beams, membranes and the like, to provide flexibility to the otherwise rigid carrier, are the same.

Thus, in applying the notion of a beam mounted carrier to a piston type carrier used in a disc brake construction, the same general approach for providing a primary, secondary and tertiary support structure along the lines discussed above applies. The pad of FIG. 4B is an example of a pad which could be used as a piston-type carrier for use in a disc brake construction, wherein the carrier has a beam mounted construction. FIG. 35 illustrates a cone clutch construction which includes a carrier having a beam mounted construction. Finally, FIG. 1F illustrates a drum brake construction in which the carrier 10 has a beam mounted construction.

Figure 20A:
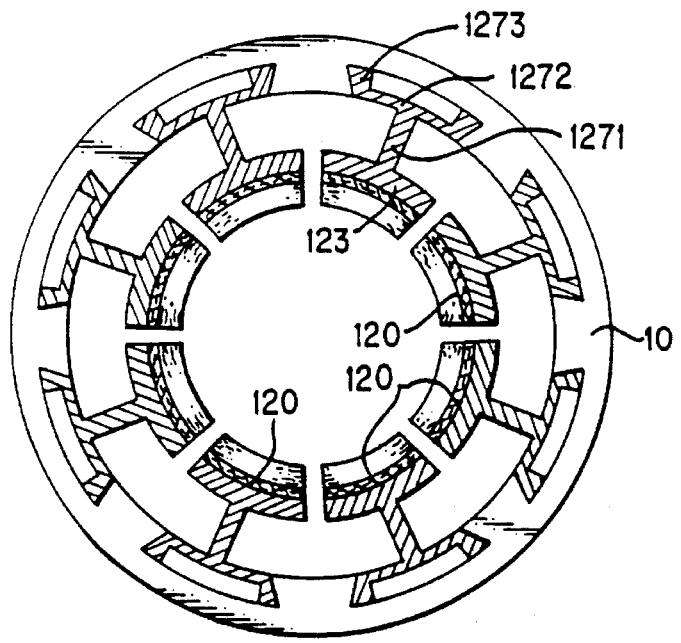
FIG. 20A is a side view of a dovetail form of a modular cone clutch construction according to the present invention.

Another form of modular carrier construction is illustrated in FIGS. 20A–20E. The specific type of modular construction shown is most suitable for drum brakes. However, the underlying concepts apply to any carrier. Specifically, as best shown in FIG. 20A, the carrier 10 has a plurality of longitudinal dovetail grooves formed therein. The dovetail grooves are circumferentially spaced about the inner periphery of the carrier 10. A plurality of dovetail brake pads 120 are secured in the dovetail grooves formed in the carrier 10. The dovetail brake pads 120 include a friction pad 121, a pad support 123 and a support structure 127. In the illustrated embodiment, the support structure 127 includes a primary support portion 1271, a membrane-like secondary support portion 1272 and a tertiary support portion 1273. In accordance with one aspect of the present invention, the tertiary support portion has a dovetail outer configuration which is complementary to the dovetail grooves formed in the carrier 10. By virtue of the dovetail configuration of the lower end of the pads 120, the pads can be slid into the longitudinal grooves from an axial end of the carrier 10, such that the pads 120 are locked in the radial direction with respect to the carrier 10. In this way, the dovetail pads 120 are quickly and releasably securable to the carrier 10. Further, their position within the carrier 10 is not affected by rotation of the shaft which the friction pads 121 contact. However, without more, the pads 120 would be axially slidable within the carrier 10. If desired, the friction pads 120 can be easily locked with respect to the carrier, through the provision of an end plate, a locking bolt or some similar mechanism.

In accordance with another aspect of the present invention, the dovetail construction shown in FIG. 20A can be part of a modular system. Specifically, the modular system can include a wide variety of dovetail pads 120, each having a lower portion which is formed complementary to the longitudinal grooves formed in a standard dovetail-type carrier. In this way, a standard carrier can serve as the support for a wide variety of pad constructions.

FIGS. 20B–20E illustrate various dovetail pad constructions according to the present invention. Each of the dovetail pad constructions has a lower end with a shape which is complementary to the shape of the dovetail grooves formed in the carrier 10 of FIG. 20A. Consequently, any of the pads shown therein could be mounted in the carrier 10 of FIG. 20A to suit a particular need. Additionally, the modular system can be further varied by providing modular pads having different radial (or vertical as viewed in the drawings) dimensions. In this way, a single carrier 10 can be adapted to use with drums of different diameters.

Figure 20B:
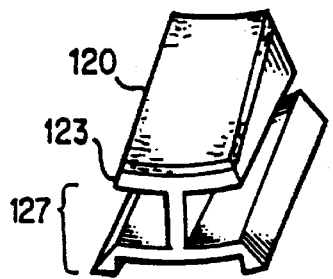
FIG. 20B is a partial perspective view of a friction pad for use in the brake of FIG. 20 or the clutch of FIG. 20A.

FIG. 20B shows a modular dovetail pad of the same general type shown in FIG. 20A. The pad 120 includes a pad portion 123 and a support portion 127. In this case, the support portion 127 includes a vertical or radially extending single beam serving as a primary support portion, a circumferential or horizontally extending membrane as a secondary support portion, and a pair of dovetailed support legs as a tertiary support portion.

Figure 20C:
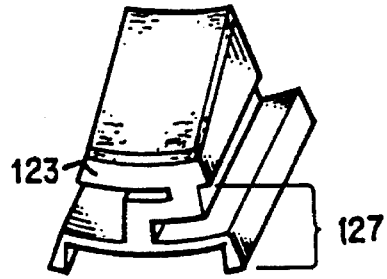
FIG. 20C is a side view of a modified friction pad.

FIG. 20C shows a similar modular dovetail pad, except that the primary support portion includes a nonsymmetrical beam network consisting of a pad support beam, circumferential cantilever beam and a vertical beam supporting the beam network on the membrane of the second support portion. Because of the nonsymmetrical nature of this pad, a brake constructed with such a pad would be unidirectional rather than bidirectional.

Figure 20D:
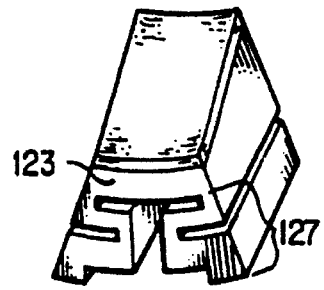
FIG. 20D is a side view of another friction pad.

FIG. 20D shows a modular dovetail pad in which the pad support portion 123 is undercut and supported at its ends by radially extending beams. These radially extending beams are supported in a cantilever fashion by circumferential beams, which are supported on radial beams, which in turn are supported on circumferential beams and finally supported on radial beams. This beam-on-beam construction gives the dovetail construction of FIG. 20D significant flexibility.

Figure 20E:
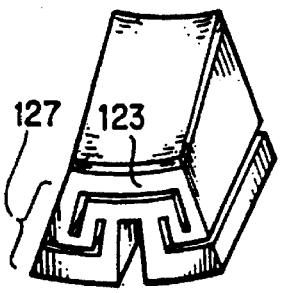
FIG. 20E is a side view of another form of friction pad.

FIG. 20E shows a dovetail pad with a different form of beam-on-beam construction. In this case, the pad portion 123 is undercut and supported by radially extending beams, which are supported by a circumferentially extending beam, which is supported in a hanging fashion by another radial beam, which in turn is supported on a fixed base. In the case of FIG. 20E, the openings formed to define the pad portion and support network are relatively thin compared to the openings formed in the previously described dovetail friction pad construction.

In addition to the forms of dovetail pads shown in FIGS. 20B–20E, it is possible to use solid dovetail pads such as those shown in, for example, FIGS. 31–34. Such solid pads, which can only deform and cannot deflect, are generally used in cases where the carrier includes a beam support network for flexibly supporting the pads.

FIGS. 31 and 31A illustrate another dovetail of a journal friction pad in accordance with the present invention. The friction pad construction illustrated in FIGS. 31 and 31A is bidirectional, i.e., the friction pad is capable of supporting a shaft for either clockwise or counterclockwise rotation as viewed in FIG. 31. The friction pad is bidirectional because the pad supports are symmetrical about their center line, which are defined as the radial extending line passing through the friction pad major axis and the geometric center of the pad. The friction of FIGS. 31 and 31A includes a carrier 10 which is formed with a plurality of thin radial and circumferential slits to define a plurality of circumferentially spaced friction pad support surfaces which support a plurality of friction pads 20.

In particular, each friction pad support surface 632 is supported by a beam support structure at two pad support surfaces 632ps. The beam network connected to the friction pads at each pad support surface 632ps is identical, yielding the symmetrical construction of the friction pad which makes the friction pad bidirectional. For purposes of simplifying this description, only the network of beams which supports the friction pad at one pad support surface will be described since the other pad support surface is supported in an identical fashion. Thus, as shown in FIG. 31, a first, generally radially extending beam 640 is connected to the friction pad support surface 632. A second, generally circumferential beam 642 is connected to the radially outermost end of beam 640. A third, generally radial beam 644 extends radially inward from the beam 642. A fourth, generally circumferential beam 646 extends from the radially innermost portion of the beam 644. A fifth, generally radial beam 648 extends radially outwardly from a beam 644 to the housing portion of the support structure. In summary, each friction pad support surface 632 in the friction pad illustrated in FIG. 31 is supported by ten beams and the carrier housing. It should also be noted that the cut or slit formed below the pad support surface introduces additional flexibility such that the pad support surface acts like a spring-like membrane.

In the illustrated embodiment, simple dovetail friction pads 120 are used. However, because of the modular nature of this friction pad construction, other forms of friction pads could be used. For instance, dovetail friction pads such as those shown in FIGS. 20A–20E could be used or other non-dovetail friction pads such as those disclosed herein could be used.

FIG. 31A is a radial cross-section of FIG. 31 showing the third beam 644, the friction pad support surface 632, the friction pad 120 and the housing or outer periphery.

As detailed below, piezoelectric elements 100 could be provided within the support structure to allow selective adjustment of the deflection characteristics.

FIGS. 32 and 32A illustrate another dovetail journal friction pad construction in accordance with the present invention. This friction pad construction differs from the previously described friction pad constructions in that the carrier 10 is defined by relatively large grooves and openings formed in a "cylindrical blank." Normally, this type of construction would be formed by milling the blank rather than electrical discharge machining or some other similar technique for forming small grooves as with the previously described embodiments. An advantage of the carrier construction illustrated in FIG. 32 is that, in applications requiring extremely small friction pads, it is easier to form precisely the proportionately larger cuts and openings required to form a carrier of the type illustrated in FIGS. 32 and 32A as compared to the proportionately smaller cuts and openings required by the construction of, for example, FIGS. 31 and 31A. Moreover, the large grooves or openings are generally easier to mold or extrude. Carriers formed by larger cuts also find use in applications requiring extremely large friction pads with stiff friction pad support structures.

The friction pads 20 shown in FIG. 32 are supported symmetrically about the major axis 706. Hence, the friction pad,is bidirectional. Moreover, the carrier has a continuous cross-section with no hidden openings, making it is easily extrudable and easily moldable. Naturally, the carrier can be altered by providing discontinuities in the cross-section, e.g., by providing radially extending circumferential grooves or nonsymmetrically disposed radially extending openings to alter the support structure and thereby alter the performance characteristics.

As shown in FIG. 32, the friction pad includes a plurality of circumferentially spaced friction pad support surfaces 732. Each friction pad support surface 732 is supported by a support structure which includes a pair of generally radial beams 740 connected to the friction pad support surface 732. A second, generally circumferentially extending beam 742 supports each of the beams 740. Beams 742 are connected to the housing or tertiary support stubs 744 in a cantilever type fashion. Like the friction pad of FIGS. 31 and 31A, a plain dovetail friction pad 120 is shown. Of course, any type of friction pad can be used. However, to maintain the bidirectionality of the friction pad, the pad 120 should be bidirectional.

FIG. 32A is a radial cross-section of a portion of the friction pad illustrated in FIG. 32. In this cross-section, the friction pad 120, friction pad support surface 732 and first beam 740 are visible.

Figure 33:
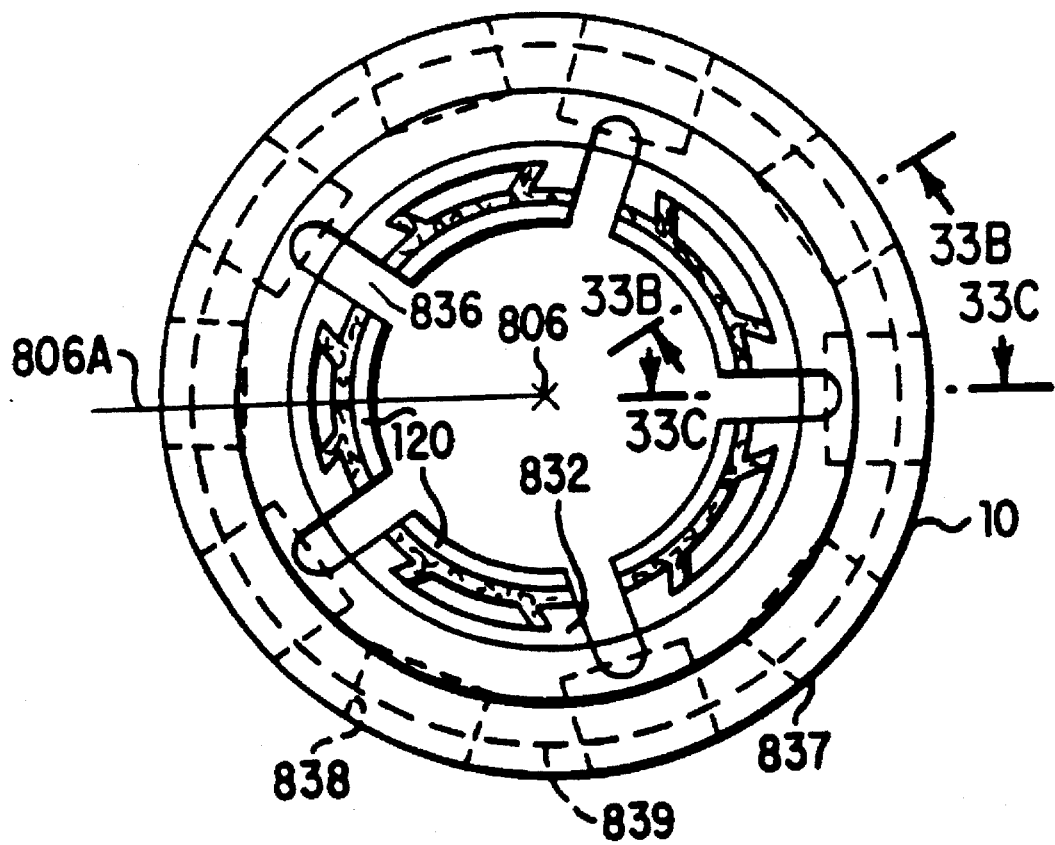
FIG. 33 is a side view of another dovetail friction pad support for use in a cone clutch construction in accordance with the present invention.

FIG. 33 illustrates a dovetail journal friction pad construction according to the present invention. Like the friction pad of FIG. 32, the carrier 10 of the friction pad of FIG. 33 is formed by proportionately large grooves and bores. In particular, a plurality of equally spaced radially extending circumferential grooves define a plurality of circumferentially spaced friction pad support surfaces 832. The friction pad support surfaces 832 are further defined by a pair of axially extending circumferential grooves which extend symmetrically from the planar faces of the cylindrical blank, and are best seen in FIGS. 33B and 33C, in which the grooves are indicated by the reference numerals 834 and 835. The carrier support structure is defined by the aforementioned structural features and by a plurality of circumferentially spaced symmetrically disposed, shallow bores 838 and a plurality of circumferentially spaced, symmetrically disposed deep bores 837. Because of the presence of the "hidden" bores 837, 838, the carrier construction of FIG. 33 is not extrudable and not moldable in a simple two-piece mold, i.e., not easily moldable.

As best shown in FIG. 33A, the deep bores 837 intersect the axial grooves 836 so as to define support structures for each friction pad. The support structure is further defined by a circumferential groove 839 extending from the outer periphery of the cylindrical blank.

With reference to FIGS. 33, 33A, 33B and 33C, it will be understood that the provision of the structural members as discussed above provides a support structure for the friction pad support surface 832. The support structure includes a beam 840 directly supporting the pad, i.e., a primary support structure; two continuous beams 882, i.e., a tertiary support structure; and a plurality of beams defined in part by bores 837 and 838 connecting the beam 840 to the continuous beams 882, i.e. a secondary support structure.

Because the support structure of the carrier illustrated in FIGS. 33–33C is nonsymmetrical about the pad center line 806A extending from the major axis 806, it is unidirectional. Further, like the carrier 10 of FIG. 32, this carrier is particularly well suited to applications requiring extremely small friction pads since the proportionately larger grooves and bores which define this carrier are more easily manufactured.

The dovetail friction pads 120 have a support portion defined by two angled legs spaced from one another. Consequently, the central region of the pad 120 is flexibly supported. Of course, other types of dovetail pads can be used.

FIG. 10 illustrates a beam mounted support for friction pads or shoes 21 used in an otherwise conventional Girling design shoe type brake of the type illustrated in FIG. 1F. The support includes a curved pad support 23 and a beam like support structure 27. The support structure includes a primary support portion 271, a secondary support portion 272 and a tertiary support portion 273. The tertiary support portion 273 has a dovetail shape so that it can be securely retained in a corresponding groove in the actuating structure as shown.

The support portions together define a beam like support structure which supports the pad support 23, and hence the pad or shoe 21, for pivoting about a point located on or near the pad surface and spring-like movement toward and away from the brake drum.

Naturally, the support structure can be modified in accordance with the principles discussed throughout this application to achieve any other deflection characteristics desired.

FIGS. 34, 34A, 34B, 34C and 34D illustrate a pad support for use in a cone clutch assembly according to the present invention. The cone clutch assembly is similar to that shown in FIG. 1B and includes a female cone surface ground inside the rim of a flywheel 3 secured to a first shaft and a male member including a plurality of dovetail clutch pads 120 and a carrier 10.

As shown in the drawings, the carrier 10 includes a primary support structure comprising a pair of beam like members 940, which are connected to the pad support surfaces 932, and defined in part by symmetrically disposed openings 942. A shallow circumferential groove formed on the outer periphery of the carrier 10 defines a tertiary support structure comprising a pair of continuous beam-like elements 982. A secondary support structure, comprising a beam and membrane network 960 for connecting the beams 940 to the continuous beams 982, is defined by the provision of a plurality of large symmetrically disposed bores 944, the provision of smaller symmetrically disposed bores 946 and the provision of small nonsymmetrically disposed bores 948. By virtue of the provision of the nonsymmetrically disposed bores 948, the support structure is more flexible, and thus biased, in the direction of those bores.

A similar friction pad usable in a cone clutch assembly is illustrated in FIGS. 35, 35A and 35B. In this friction pad support, the pad surface 1032ps is again angled with respect to the major axis 1006. By virtue of its angled pad support surface, the carrier of FIG. 35 supports the pads 20 at an angle complementary to the angle of the female surface. In this embodiment, however, the clutch pads 20 are simple coin-like pads of high friction material. To increase the clutch contact area, it would probably be preferable to use clutch pads extending across the entire pad support surface and to extend the pad support surfaces so as to provide a virtually continuous surface. Moreover, if desired, the clutch pads 20 of high friction material could be molded into the carrier member 10 to provide a unitary carrier and pad construction.

The foregoing examples illustrate how various support structure configurations and support structure modifications influence the deflection characteristics of the friction pad support. It should be understood that these configurations and modifications can be combined in any desired manner to achieve the specific deflection characteristics needed to obtain optimum distribution of temperature across the surface of the friction pad or any other desired characteristic under normal operating conditions.

In the clutch construction shown in FIG. 35, as with all beam mounted clutch constructions, the primary object is to ensure proper distribution of heat build-up. Thus, although it is possible, as explained herein, to cause the pad support surfaces or the pads themselves to deflect as desired under load, in the case of clutches it is expected that the support structure would be designed simply to provide a spring characteristic transverse to the "plane" of contact of the friction surface and the surface which it engages, and to allow the friction surface to pivot about a point located on that surface.

FIGS. 17A–17C and FIGS. 18A–18B illustrate various forms of a multimode clutch construction according to the present invention. Although the specific example shown and described is a clutch, deflection pad technology can be used to obtain multimode operation of brakes as well, as discussed below. Multimode clutch and brake constructions are useful in applications where it is desirable to achieve the clutching or braking effect gradually, in discrete steps.

For instance, in some cases it is desirable to have a slow braking effect, such as when slowing down or reducing speed slightly. In other instances, however, it is desirable to have a rapid braking effect, as in emergency situations. With conventional brakes, it is difficult to fully satisfy each of these concerns. Thus, in many power brake applications, it is difficult to brake slowly, purely by the operator's control of the foot pedal. The multimode brake pad construction provides the operator assistance in this regard by supporting the brake pads, such that there is sequential engagement with the brake drum or disc, such that as the operator engages the foot pedal, the braking surface contact area is increased in discrete steps. Likewise, in some clutch applications, particularly, high speed applications, it is desirable to cause gradual, i.e., progressive, engagement of the clutch members. The use of deflection pad technology makes it possible to achieve friction pad engagement in discrete steps when desired.

The multimode brake and clutch constructions provide sequential engagement for separate sets of friction pads so that the frictional engagement surface area is increased in discrete steps. In the simplest example, a plate clutch, each set of pads is circumferentially spaced about the carrier. As the carrier is pushed toward the plate to be engaged, the pads engage the clutch in discrete groups depending on the pressing force. In theory, each pad could come into contact at a different time. In practice, however, it is better to group the pads into no more than about four sets of pads.

Generally, the multimode constructions are the same as single mode constructions described elsewhere in this application, except that the multimode friction pad includes two or more distinct types of pads and a sequential support construction for causing each set of pads to contact the opposed surface at a different time. Generally, this is accomplished by positioning the brake or clutch pads at slightly different distances from the surface to be engaged. One way of doing this is through the design of the support structure and carrier design alone. Alternatively, actively controllable "smart" materials, such as piezoelectric quartz or polymers, can be used to cause sequential engagement.

The multimode clutch of the present invention is designed such that the set of pads designed to initially contact the surface to be engaged is slightly closer to the surface than the set(s) of pads designed to engage the surface later. Thus, initially only, the first set of pads engages the opposed surface. However, the first set of pads is designed or mounted on a support which is designed to deflect away from the opposed surface as increased load is applied. Thus, as increased pressure is applied to the carrier, the first set of pads is pushed away from the surface to be engaged and the next set of pads comes into engagement as well. This process may be termed "sequential engagement."

There are at least two ways to obtain sequential engagement through the structural design of the pads and carrier. First, the support structure of the pads themselves may be designed such that the pads deflect away from the surface as necessary to allow other pads to engage the surface. Alternatively, or in addition, the carrier portions which support the first set of pads may be designed to deflect away from the surface to allow other pads to engage.

FIGS. 17A–17C show a multimode clutch construction which includes two sets of clutch pads 20L and 20H. The first type of friction pad support 20L is relatively flexible and is thus designed to provide relatively light clutching engagement. It is the first set of pads to contact the surface to be engaged. The second type of friction pad support 20H is relatively rigid and is designed to, in combination with the first set of pads 20L, provide a heavy clutching force.

In the specific illustrated example, the first set of pads 20L are similar to those shown in FIGS. 3E and 3F and discussed above, and the second set of pads is similar to that shown in FIGS. 3C and 3D, also discussed above. Of course, other types of pads could be used. In the clutch of 17A–17C, load differentiation primarily occurs through the design of the carrier 10. More specifically, the carrier is designed such that each set of pads are supported on a pad support portion 105, which is supported on a continuous circumferential ring portion 106. For the second set of pads 20H, the continuous circumferential portion 106 is supported on a solid base 108. However, for the first set of pads 20L, the solid base 108 is provided with an opening 108o, such that the continuous beam 106 rests on a very thin membrane 107. By virtue of this construction, the first set of pads 20L are supported on a portion of the carrier 10, which has much greater flexibility in the vertical direction as viewed in FIG. 17A than the second set of pads 20H. Thus, in response to high loads applied to the first set of pads 20L, the support for these pads deflects vertically downward such that the pad surface of the first set of pads 20L deflects away from the surface to be supported. On the other hand, the carrier support for the second set of pads 20H is relatively rigid and does not deflect in this manner. Hence, in response to high loads, both sets of pads engage the opposed surface, thus significantly increasing the net frictional contact surface area.

As indicated above, in order to ensure that the first set of pads 20L contact the surface to be engaged first, the pads are arranged such that the first set of pads 20L have a pad surface which is mounted slightly higher than the pad surface of the second set of pads 20H. This height difference is indicated as HD in FIG. 17A. The height difference may be provided by either providing a deeper mounting bore in the carrier 10 for the second set of pads 20H or making the first set of pads 20L somewhat taller. As a consequence of this height difference (HD), the surface of the first set of pads contacts the surface to be supported before the surface of the second set of pads 20H. Depending on design conditions, the friction pads and carrier support structure are designed such that the first set of pads 20L is capable of providing low torque engagement by itself.

FIG. 17B illustrates the circumferential arrangement of the first and second sets of pads 20L, 20H around the carrier 10. As illustrated therein, each set of pads are circumferentially spaced about the major axis of the clutch. This is necessary to ensure uniform clutching effect. Additional sets of pads can be provided for additional discrete clutching steps. The primary limitation on the number of such additional sets of pads which can be provided is the desire to provide an adequate number of pads in each set to independently engage the opposed surface under an anticipated load and the practical necessity of keeping the pad and overall clutch size reasonable.

FIG. 17C shows the location of the bores 108 formed in the bottom of the carrier to form the thin membrane supports 107 under the locations of the first set of pads 20L.

Figure 18A:
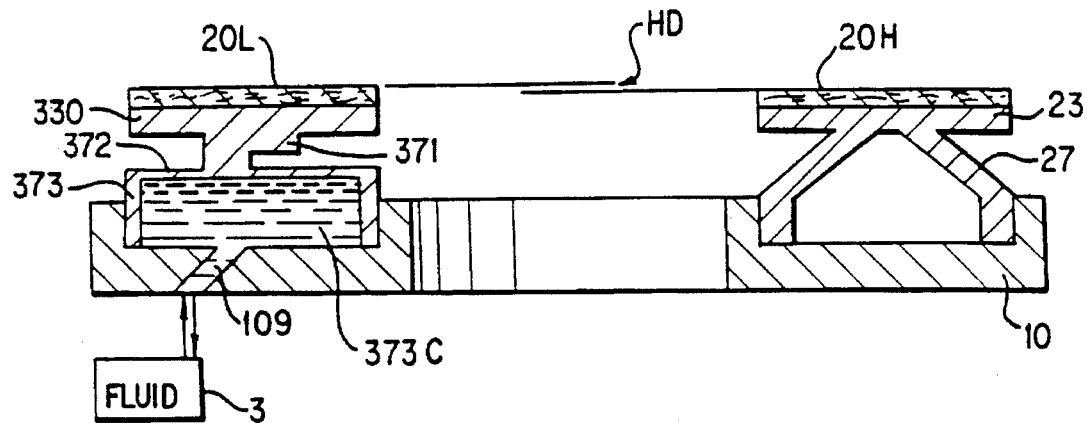
FIG. 18A is a cross-section of another multi-mode clutch according to the present invention.
Figure 18B:
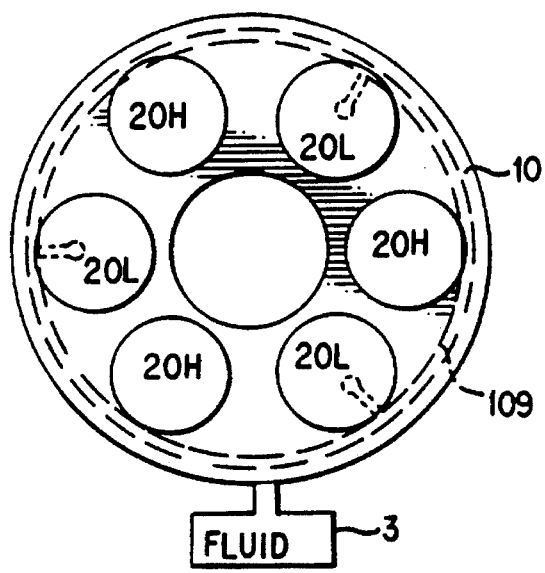
FIG. 18B is a top view of the support of FIG. 18A, with hidden fluid passages shown in phantom.

FIGS. 18A and 18B illustrate an alternative construction in which sequential engagement occurs as a result of the pad construction. Specifically, the clutch construction includes two types of pads 20L and 20H. The first type of pad 20L is relatively flexible and is thus designed for relatively light clutching engagement. The second type of friction pad 20H is relatively rigid and is thus designed for heavy clutching engagement in combination with the first set of pads. In the illustrated embodiment, the second pad set 20H is of the type illustrated in FIGS. 3C and 3D, discussed above, and the first pad set 20L is generally similar to that illustrated in FIGS. 4B and 4C, also discussed above. Naturally, other forms of the pads can be used as desired.

The carrier 10 can be a conventional carrier which provides essentially the same support for each set of pads 20L, 20H. The passage 109 formed in the carrier 10 is for a particular purpose, described below, and is not for load differentiation. The first type of pad 20L is somewhat taller than the second type of pad 20H so as to provide a height difference (HD) in the assembled state as shown in FIG. 18A. In order to achieve sequential engagement, the first pad set 20L is designed so that when a predetermined pressure is applied, the pads deflect away from the shaft surface and the second set of pads 20H comes into engagement. To this end, the first pad set 20L has an extremely flexible support structure, which includes a cylindrical primary support portion 371, a thin membrane secondary support portion 372 and cylindrical leg-like tertiary support portion 373. Naturally, this is just one example of an extremely flexible pad construction. Any pad such as the flexible pad constructions disclosed herein could be employed.

By virtue of the construction illustrated in FIGS. 18A and 18B, under low load conditions, the surface of the first pads 20L first contact the shaft portion to be supported. The support structure of these pads 20L are designed to permit adequate clutching engagement under low load operating conditions. Under higher loads, the first pad set 20L deflects away so that both pad sets are in engagement with the shaft.

FIGS. 18A–18B also illustrate the possibility of providing variable stiffness to a pad, in this example, the first type of pad 20L. Specifically, when the pad 20L is mounted in the carrier 10, an enclosed chamber 373C is formed between the inside walls of support portions 372 and 373 and the bottom of the mounting bore. This chamber may be selectively provided with fluid from a fluid source 3 through a series of passages 109 such that the stiffness of the pad can be varied. Specifically, when the chamber 373C is completely filled with pressurized fluid, the thin membrane 372 is rigidly supported such that the pad 20L is much more rigidly supported. On the other hand, when fluid is evacuated from the chamber 373, the membrane 372 iS free to deflect so that the pad 20L is lightly supported.

In accordance with yet another aspect of the present invention, the fluid enclosed within the chamber may be an electrotheological (ER) fluid. ER fluids change viscosity in the presence of electric fields, such that they can change rapidly from free flowing liquids into a highly viscous, virtually solid form depending on the strength of the electrical field. When the chamber 373 is filled with an ER fluid, it is possible to provide almost continuous variation in the rigidity of the support for the thin membrane 372. In this way, the rigidity of the pad 20L can be varied, from anywhere between the flexible dampened support provided when the ER fluid is free flowing, to the extremely rigid support when the ER fluid is highly charged and functions as a solid.

As noted above, a second type of sequential engagement construction is based on the principle of constructing the pad and or clutch as a smart structure. Smart structures are structures which are capable of sensing environmental conditions and changing their characteristics in response thereto. Generally, smart structures combine three types of components: a skeletal support component, a sensor component and an actuator component. The functions of each of these components are comparable to biological functions. The structural or skeletal support component functions as the framework or skeleton of the pad or carrier, and is generally formed of structural materials such as aluminum, steel, bronze, ceramics, plastics or light weight composites. The sensor component functions like the sensory nervous system and is formed of materials tailor-made to sense and monitor changes in temperature, pressure or other physical conditions indicative of proper clutch or brake operation. Finally, the actuator component functions like the muscle system, expanding, contracting or undergoing some other physical change to physically alter the skeletal support system.

The smart clutch and brake constructions of the present invention have structural components which are essentially similar to the pads described heretofore. The sensor component can be a conventional electronic sensor or a smart material which is physically altered by changed conditions. Similarly, the actuator component can be a conventional mechanical or electric actuator or smart material whose physical properties can be selectively altered. Piezoelectric materials are suitable as both actuators and sensor materials. In particular, piezoelectric materials, such as quartz and certain polymers, generate an electric voltage when pressure is applied to them; conversely, they expand or contract when exposed to an electric field. Thus, pressure applied to piezoelectric sensors in a pad will produce a voltage which can be used to signal actuators to pass a current through other piezoelectric materials in the actuator component to stiffen up or soften the structure.

Another suitable material for both the sensor and actuator component of "smart" structures is TERFENOL. TER- FENOL is a new group of magnetostrictive rare earth alloys, of iron, terbium and dysprosium, that produce giant dimensional changes when exposed to a magnetic field. TERFENOL has the largest magnetostriction of any material and requires only modest magnetic fields of 500–1000, depending on the amount of pre-stressing used. In microseconds, the length of a 100 mm rod grows by 0.2 mm. Such changes are 100 times greater than earlier magnetostrictives and up to 20 times greater than piezoelectric materials. TERFENOL is current driven and operates at low voltages as contrasted to electrostrictive materials that are subject to undesirable arcing.

TERFENOL changes its shape due to atomic forces and it can work into mechanical impedances of 200 MPa (29,000 psi) with strains of 2000 ppm. TERFENOL is superior to all other materials in generating mechanical energy at low frequencies of 0–% kHz. For higher frequencies of up to 20 kHz, eddy current losses have to be considered and lamination is required. It transmits extraordinary amounts of energy per unit volume (30,000 J/m3). The conversion of electrical to mechanical energy occurs efficiently with magnetoelastic coupling factors greater than 0.7.

The permeability of the material is low (5–10). The relative permeability changes with mechanical stress, which means that TERFENOL can also be used as a sensor with exceedingly fast response time, since it produces electrical energy when a mechanical force is applied. Other amorphous magnetoelastic materials (iron, silicon, boron) are now available for sensing applications with gauge factors up to 500,000 and magnetoelastic coupling coefficients as high as 0.98.

TERFENOL has a high bandwidth of 0–15 kHz for a 100 mm rod. It operates well at low frequencies and is ideal for sonic frequencies below 1 kHz. This means that the signal goes further and Venerates higher resolution on the return. The Young's modulus, the resonant frequency and the sound speed of the material can be controlled over a wide range, using a magnetic bias field. The Young's modulus reaches twice its original value when the material is saturated.

Figure 19B:
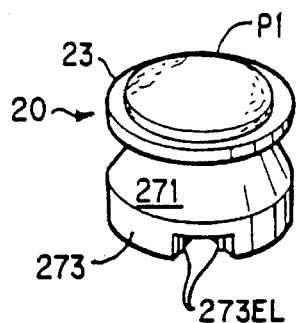
FIG. 19B is a perspective view of a friction pad with built-in electrical leads, which is adapted to be mounted in the carrier of FIG. 19A.
Figure 19A:
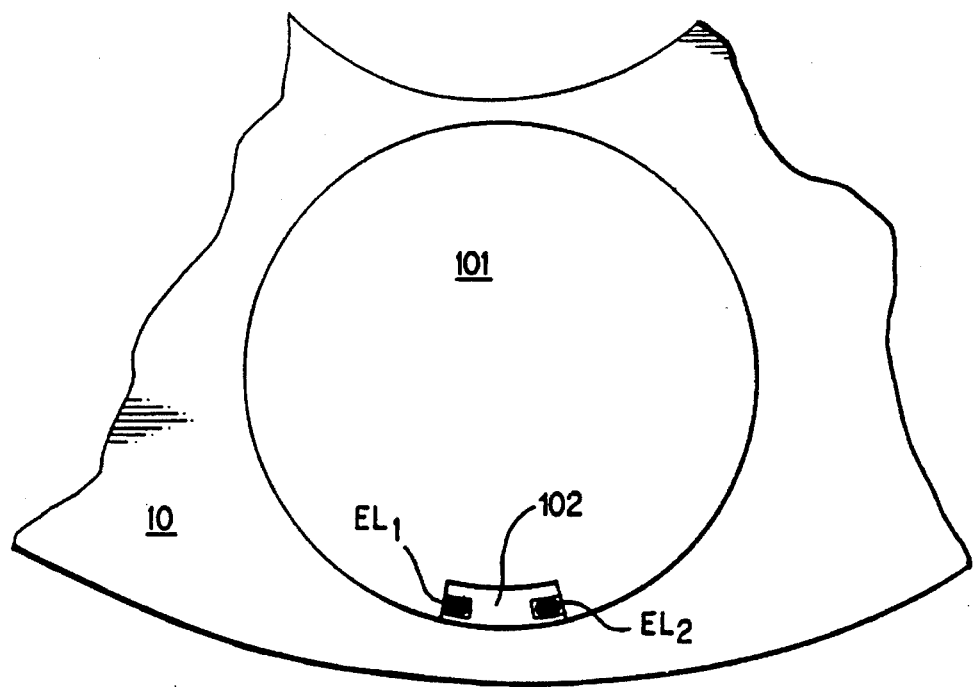
FIG. 19A is a top, detail view of a portion of a carrier, which includes a locating protrusion with built-in electrical leads.
Figure 19C:
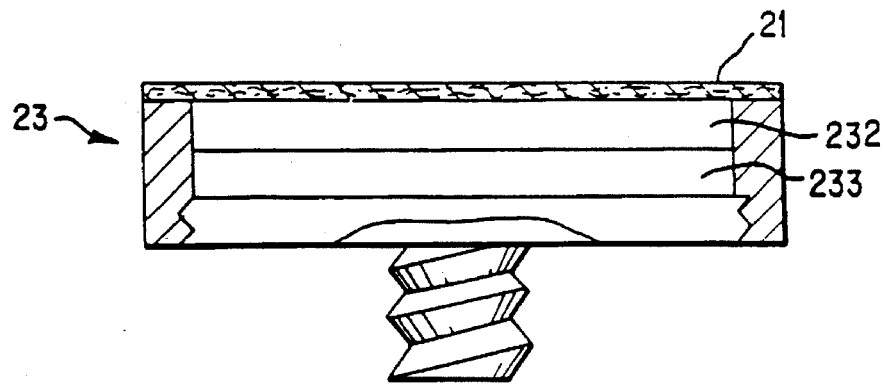
FIG. 19C is a side cross-section of a smart friction pad intended for Use in a modular friction pad construction.

A simple construction illustrated somewhat schematically in FIG. 19C is a "smart" clutch or brake pad. The smart pad includes a sensor 232 and actuator 233, both made of piezoelectric material, such that as pressure is applied to the friction lining 221 of the pad 23, a voltage is fed into a feedback amplifier (not shown). The feedback amplifier processes the pulse and sends a voltage to the actuator, causing it to expand or contract as necessary to obtain a pressure distribution which leads to optimum performance. Eventually, a desired equilibrium state, which according to design, corresponds to optimum braking or clutching effect, is achieved.

Other types of smart structures are contemplated. For instance, the sensor component can be a discrete physical sensor which senses temperature, pressure, friction or any other conditions which are indicative of optimum performance. These sensed conditions could be fed into a central processing unit (CPU) which would then provide a signal to the actuator which could include a piezoelectric material, TERFENOL, an ER fluid, a shape-memory metal such as nitinol (a nickel-titanium alloy), or some other smart material or mechanical actuator for altering the characteristics of the pads.

Smart materials such as piezoelectric material and TERFENOL, which undergo dimensional changes, can also be used to actuate the brakes or clutches by selectively moving the pad between an engaged position and a disengaged position. Such a construction offers numerous advantages over manually controlled constructions in many brake and clutch applications. Among other things, each of the individual pads can be controlled independently of one another so as to achieve precise braking or clutching effects. Of course, such a system can be easily controlled by a CPU in virtually any desired manner to achieve any desired result, including sequential engagement.

Naturally, smart friction pad constructions can be used in a wide variety of applications requiring precise control. When, as suggested above, a smart pad is to be used to provide a selective support construction for a multimode clutch or brake, the actively controllable elements are arranged such that distinct sets of pads can be selectively activated and deactivated. For example, the pads can be mounted on a piezoelectric element or some mechanical actuator so that they can be "raised" to an engagement position and "lowered" to a non-engagement position. Alternatively, the pads can be designed to stiffen to achieve engagement and soften to provide little or no engagement.

There are, of course, other uses for actively controllable brake and pad constructions. For instance, the pads and/or carriers of the present invention can be adjusted in response to sensed operating conditions to correct any operating deficiencies. More specifically, the pads and/or carriers of the present invention can include separate elements for physically altering the pad surface and/or deflection characteristics of the support structure. The separate elements can be controlled by a central processing unit (CPU), which in turn receives signals indicative of braking or clutching performance. For example, the sensors can sense physical characteristics such as pressure distribution, speed, torque, deceleration, etc. The signals from the sensors are transmitted to the CPU and compared with conditions indicative of optimum performance. When there is a substantial deviation between the actual sensed conditions and the conditions indicative of optimum performance, the CPU transmits a signal to the means for physically adjusting the pad surface and/or deflection characteristics of the pad or carrier support structure to forcibly alter the sensed conditions. Alternatively, or in addition, the CPU can be responsive to direct, manually input commands such as "INCREASE BRAKING FORCE" or "DISENGAGE CLUTCH". When such a command is received, the CPU undergoes a routine predetermined to achieve the desired result.

Various means can be used to physically alter pad or carrier characteristics. For example, hydraulic fluid can be forced into dampening chambers (discussed below) to alter the dampening characteristics of the support structure. Alternatively, a mechanical rod or jack screw can be brought into contact with the support structure to physically alter the deflection characteristics of the support structure. Either of these means could be electrically controlled.

Although many means could be used to physically adjust the pad and carrier performance in response to sensed operating conditions, it is presently believed that the best such means is to provide one or more piezoelectric elements in the interstices within the support structure or between the support structure and the pad. The provision of piezoelectric elements in this matter makes it possible to actively control or adjust pad shape and orientation and to affect the deflection characteristics of the support structure. Of course, similar results can be obtained through the use of elements formed of magnetostrictive rare earth alloys such as TERFENOL or pockets of ER fluid. Thus, while the following discussion specifically refers to piezoelectric elements, it is to be understood that other smart materials can be used in essentially the same manner. As noted above, it is known that the application of an electric current to certain crystals and ceramic materials can produce mechanical expansion forces. When an altering voltage is applied, the crystal or ceramic material undergoes thickness oscillations. However, when a direct current is constantly applied, the change in thickness does not vary. Thus, it is known that certain materials can change dimensions when subjected to voltage. Notable among these piezoelectric materials are quartz, various polymers, rochelle salt (potassium, sodium tartarade), properly polarized barium titanade, ammonium dihydrogen phosphate, ordinary sugar and certain ceramics. Of all the materials that exhibit the piezoelectric effect, none possesses all the desirable properties such as stability, high output, insensitivity to temperature extremes and humidity, and the ability to be formed into any desired shape. Rochelle salt provides the highest output, but requires protection from moisture and air and cannot be used above 45° C. (115° F.). Quartz is undoubtedly the most stable, yet its output is low. For use in brakes and clutches, polymeric and ceramic piezoelectric materials appear to be most suitable.

The piezoelectric elements could be located in the interstices of any of the pads and/or carriers of the present, invention. However, the convenience of placing a piezoelectric element within the support structure or within a spring mounted carrier or between the support structure and the pad naturally depends on the spacing between the support structure and the pad, or within the support structure. Since the pads and carriers described herein have a wide variety of interstitial spacing and because the actual size of the spacing depends on the size of the carrier and pad, the selection of a pad or carrier from the varieties described hereinafter for use in a piezoelectrically controlled construction depends on, among other things, the size (diameter) of the brake or clutch to be used.

For a relatively large brake or clutch construction in which the openings in the carrier or pad support structure are proportionately larger, relatively small openings would be appropriate. On the other hand, for very small carriers or friction pads in which the interstices or spaces are proportionately much smaller, a pad with relatively large openings would be more appropriate. It should be kept in mind that when the size of the piezoelectric element becomes close to the size of the support structure elements themselves, the effect of the piezoelectric element on the overall friction pad construction becomes proportionately greater. Under normal circumstances, the piezoelectric elements are intended only to provide small modifications to the deflection characteristics of the friction pads, since the friction pads even without the piezoelectric element are designed to function perfectly. Thus, the provision of a piezoelectric element filling the space within the support structure of the carrier of FIG. 32 would alter the essential character of the support from a deflecting type support to a piezoelectrically controlled support. In some cases this may be desired, for instance, when it is desired to use the piezoelectric element to engage or disengage the brake or clutch.

FIGS. 25 and 31 show friction pad supports which can include piezoelectric elements 100 disposed within the carrier support structure and between the support structure and the friction pads 20. Electrical leads (not shown) are connected to each of the piezoelectrical erements. The supply of current to the electrical leads is controlled by a control system. Preferably, the control system includes a central processing unit (CPU) which controls all of the piezoelectric elements in response to signals obtained from sensors monitoring the distribution of pressure or temperature across the pad surface or in response to manually input signals.

One example of a control system controlling the piezoelectric elements 100 in the friction pads of the present invention includes a CPU which receives input signals from various sensors which monitor conditions indicative of the distribution of temperature or pressure across the pad surface. For example, the CPU could receive signals from load cells at various locations around the friction surface, speed sensors and the like. The signals received from each of these sensors can then be sequentially compared to values stored in a read-only memory (ROM) which are indicative of proper temperature or pressure distribution. Alternatively, the distribution of pressure could be directly calculated from these signals. When it is determined that the sensed conditions fall outside of the appropriate range, a diagnostic analysis could be performed to determine the appropriate corrective measure. As a result of this diagnostic analysis, a determination of which, if any, of the piezoelectric elements are to be charged, and the extent to which they are to be charged can be made.

As noted above, the friction pad of FIG. 25 can include piezoelectric elements 100 located within the carrier structure to allow selective, precise control of the amount of downward deflection of the friction pad support surface 132. In this particular instance, the piezoelectric elements 100 are provided in a common location for each of the friction pads so that the piezoelectric elements have a single function, i.e., controlling the downward deflection of the friction pad support surface. When using such a construction, it might be desired to arrange the innermost edge of the pads 20 slightly higher than the outer edge such that the piezoelectric elements compensate for this to achieve uniform pressure or temperature distribution. Naturally, additional piezoelectric elements 100 could be provided in other locations for other purposes if desired. Again, the piezoelectric elements 100 have leads (not shown) connected thereto and the flow of current to the leads is controlled by a central processing unit of the type described above.

The cone clutch friction pad support of FIG. 31 can include piezoelectric elements 100 located in selected areas to allow selective adjustment of the pressure or temperature distribution according to sensed operating conditions. Once again, the leads are connected to the piezoelectric elements 100 and the flow of current to the piezoelectric elements through the electrical leads is controlled by a control system which may be of the type described above. It should also be noted that the flow of current to the piezoelectric elements can be controlled by a manually operated electrical control system. It is believed, however, that better results are obtained through the use of a central processing unit.

For purposes of a multimode clutch construction, smart friction pad support constructions can be used in two ways. First, the clutches can be designed to include only one set of friction pads which have "smart" constructions, the deflection characteristics of which can be varied to accommodate the requirements of different operating modes. Alternatively, the actively controllable materials can be used to activate or deactivate selected friction pad sets by pushing them toward or away from the shaft or rotor portion to be engaged; this could allow smooth engagement.

FIG. 19A shows a partial top view of a carrier 10 which has a mounting bore 101, which includes a locating protrusion 102. The locating protrusion 102 includes two electrical leads $EL_1$ and $EL_2$. Such a carrier member could be used in a smart system requiring electrical leads fed into the friction pad or support structure for the purpose of carrying charge to or from a piezoelectric material, an ER fluid, a shape-memory metal or some other smart material.

FIG. 19B shows an example of a friction pad 20 which can be used in such a carrier. Specifically, the friction pad 20 is similar to the friction pad shown in FIGS. 3C and 3D and discussed above. However, the pad portion 23 includes a pad insert PI of high friction material which provides the actual pad operating surface. Additionally, a notch is formed in the dog leg or tertiary support portion 373 to allow mounting of the friction pad 20 in the carrier 10. Electrical leads 273EL are formed adjacent to the notch so as to provide electrical contact with the leads $EL_1$ and $EL_2$ when the friction pad 20 is mounted in the carrier 10 of FIG. 19A. If, the smart material is used in the friction pad portion 23 proximate the friction material insert PI, the electrical leads 273 EL would extend to the pad insert PI. Of course, smart materials could be provided in the support structure rather than in the pad surface. If so, the electrical leads would provide current to such locations.

The pad insert PI shown in FIG. 19B could include a layer of piezoelectric material or it could be a composite of a high friction material and some type of piezoelectric material such that when current is supplied to the pad insert, the shape of the pad insert would change to adjust pressure or temperature distribution.

As discussed above, FIG. 19C illustrates a "smart" bearing pad construction.

Figure 19E:
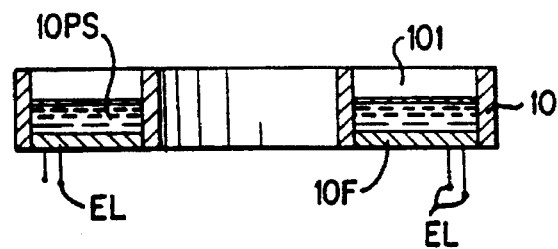
FIG. 19E is a cross-section of a carrier having adjustable rigidity according to the present invention.
Figure 19D:
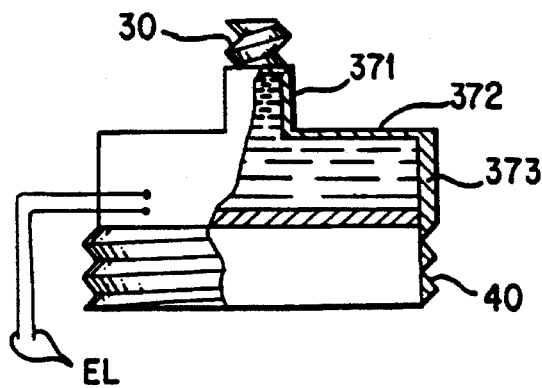
FIG. 19D is a side view, partially cut away, of a support structure having adjustable rigidity according to the present invention.

FIG. 19D illustrates a modular support structure component having an adjustable rigidity. Specifically, the skeletal portion of the support structure includes a thin tubular primary support portion 371, a thin membrane secondary support portion 372 and a circumferential beam like tertiary support portion 373. Connector portions 30 and 40 are formed at either end of the support structure to allow it to be received in a carrier via threads 40 and to receive a friction pad portion via threads 30.

The skeletal portion 371, 372 is normally flexible because it is relatively thin. However, the interior of the support structure is fluid tight and sealed to include an ER fluid. In its fluid state, the ER fluid is incompressible so that it dampens but does not prevent deflection of the support structure. Electrical leads EL are provided to selectively provide variable amounts of current into the ER fluid such that the dampening effect of the ER fluid, and hence the rigidity of the support structure, can be selectively varied from a very flexible support structure to an extremely rigid support structure. The control of the supply of current could be in response to sensors which sense selected conditions which are indicative of wedge quality. Sensors, such as those shown in FIG. 19C or any other suitable sensor, could be used for this purpose.

FIG. 19E shows a smart carrier construction 10. The carrier 10 includes a plurality of pad mounting bores 101. The support for each pad mounting bore 101 is a thin pad support surface 10PS. Immediately below each pad support surface 10PS is a fluid tight chamber filled with ER fluid 10F. Electrical leads EL are provided to allow the provision of current to the fluid filled chambers. The pads are arranged on the support surface 10PS in a manner which allows fluid dampening movement of the pads 20. In the manner described above, current can be provided to selectively vary the rigidity of the pad support surface 10PS from a very flexible surface to an extremely rigid surface. Again, the supply of current can be controlled in response to sensors which sense physical conditions indicative of wedge quality.

Figure 19F:
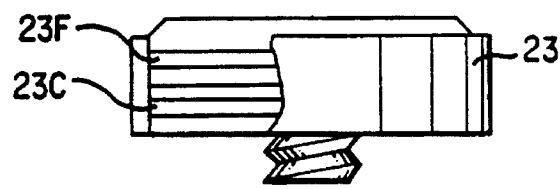
FIG. 19F is a side view, partially in section, of a friction pad having adjustable rigidity according to the present invention.

FIG. 19F illustrates a smart friction pad according to the present invention. The friction pad includes a skeletal portion which includes a screw-like projection to enable mounting in a support structure in accordance with the modular construction of the present invention. Additionally, as shown in the cut away portion of FIG. 19F, the friction pad includes alternating layers of ER fluid 23F and a composite material. When subjected to electrical voltages, the particles in the ER fluid are realigned, making the fluid nearly as stiff as a solid. When the layers are controlled by a feed-back system, it is possible to fine-tune the stiffness of the friction pad in response to sensed conditions indicative of wedge quality. If desired, the supply of current to discrete sections of the friction pad may be individually controlled such that the support of every section of the bearing pad may be precisely controlled.

Whenever a friction pad support employs pre-biased friction pads, it is critical that the bearing pad be precisely positioned within the carrier to ensure that the friction pads are properly aligned so that the pads deflect properly under loading. Precise pad positioning is also important in actively controllable friction pad constructions because there must be a fixed point of reference from which changes are made.

Figure 6A:
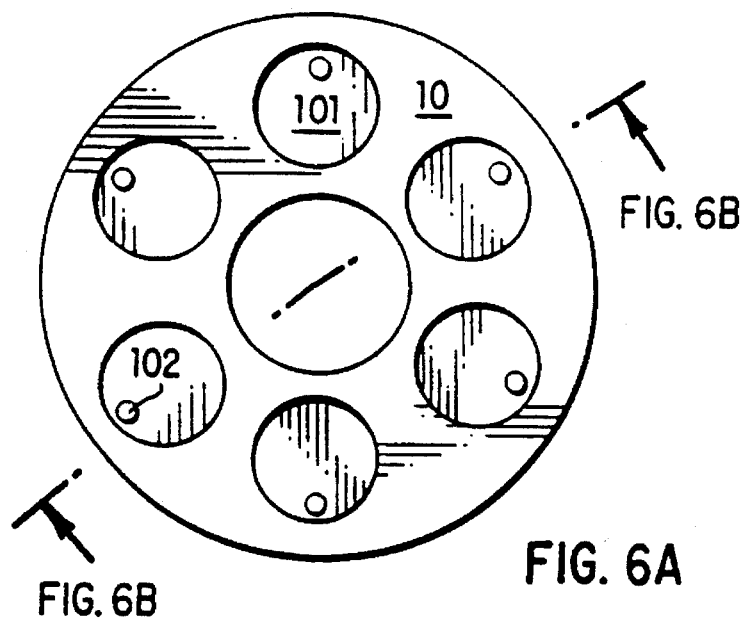
FIG. 6A is a top view of a carrier member having locator posts for positioning the friction pads in a presser plate clutch construction.
Figure 6B:
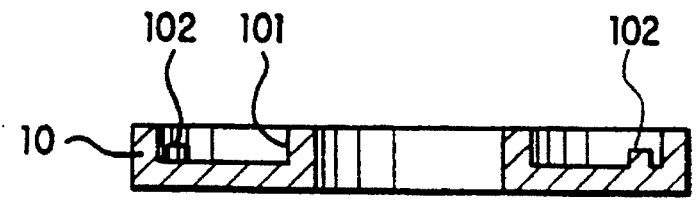
FIG. 6B is a cross-section of the carrier member of FIG. 6B along the lines indicated in FIG. 6A.
Figure 6C:
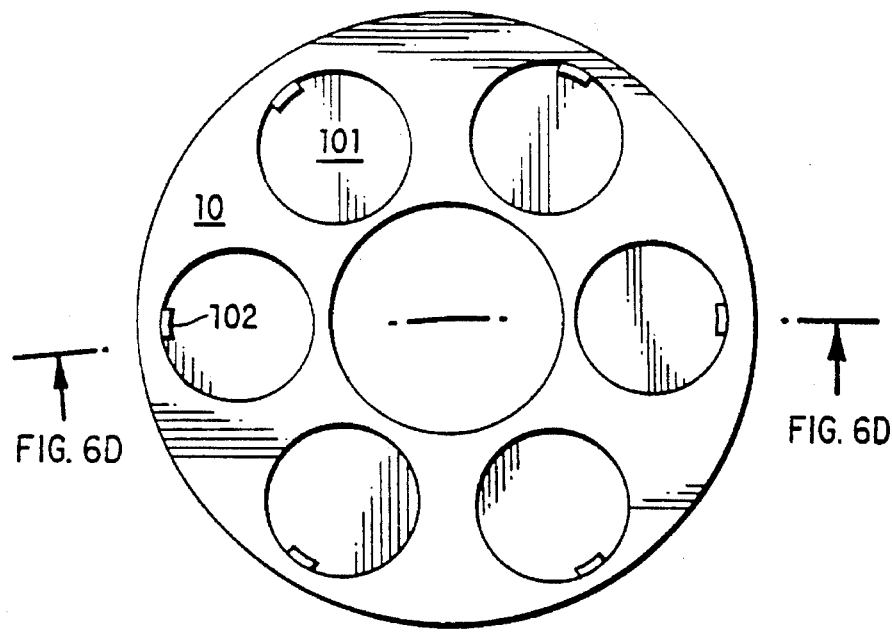
FIG. 6C is a top view of the carrier member of FIG. 6D.
Figure 6D:
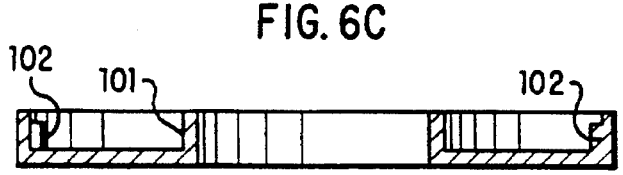
FIG. 6D is a cross-section of a carrier member having a locating protrusion for positioning the friction pads in a brake construction.

FIGS. 6A, 6B, 6C and 6D illustrate another aspect of the present invention, whereby the friction pads 20 can be precisely located within the carrier 10. In FIGS. 6A and 6B, the carrier 10 is provided with locating pins 102 nonsymmetrically disposed within the bores 101 provided for receiving the friction pads 20. The locator pin 102 can be received in one of the nonsymmetrically disposed openings in a friction pad support structure (or a similar opening provided somewhere else in the friction pad), to precisely position the friction pad within the bore in the carrier 10. An alternative construction is illustrated in FIGS. 6C and 6D. In this construction, locating protrusions 102 extend from the wall of the bore 101 and are used instead of separate locating pins. The locating protrusion can be received in a complementary notch formed in the dog leg or tertiary support portion of any of the friction pads of the present invention. By virtue of this locking pin or protrusion arrangement, the pre-biased friction pads are forced into proper alignment when mounted in the bore. It should be understood that when locator posts or protrusions are used, only those connectors which do not require rotation of the friction pad into the carrier may be used. Thus, while press fitting or the connectors shown in FIGS. 12B and 12C are acceptable, threads are not.

Figure 7:
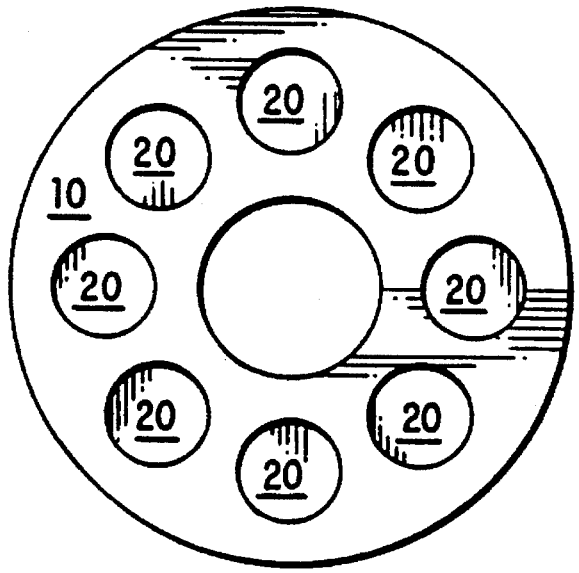
FIG. 7 is a top view showing an arrangement of friction pads on a carrier according to the present invention.

FIGS. 7–9 illustrate the modularity which is obtainable with the friction construction of the present invention. More specifically, these drawings illustrate a number of the possible friction pad configurations which can be achieved by simply using different standard parts. As discussed previously, any standard friction pad support portion can be combined with any standard friction pad portion.

In FIG. 7, a number of round friction pads 20 are circumferentially spaced in a carrier 10. Such round portions might be employed because it is easier to form a round pad support surface when the pad portion is machined integrally with the support portion. However, in some cases it might be desirable to use non-circular friction pads if this can be done without increasing cost. This can be done in accordance with another aspect of the present invention.

When the friction pad portions are formed separately from their support portions, manufacturing complexity is not an important concern in choosing a pad shape since any pad shape can be easily manufactured. For instance, by using wedge shaped friction pads 20 such as those shown in FIG. 8, greater pad surface is provided, thereby increasing the frictional contact area. Thus, it may be desirable to provide a standard wedge shaped friction pad in addition to the round shaped friction pad. In addition, it is usually desirable to provide friction pad portions of a size which, when assembled, provides a nearly continuous frictional surface. For instance, the pads can be sized such that the edges of adjacent friction pads are almost in contact.

Figure 9A:
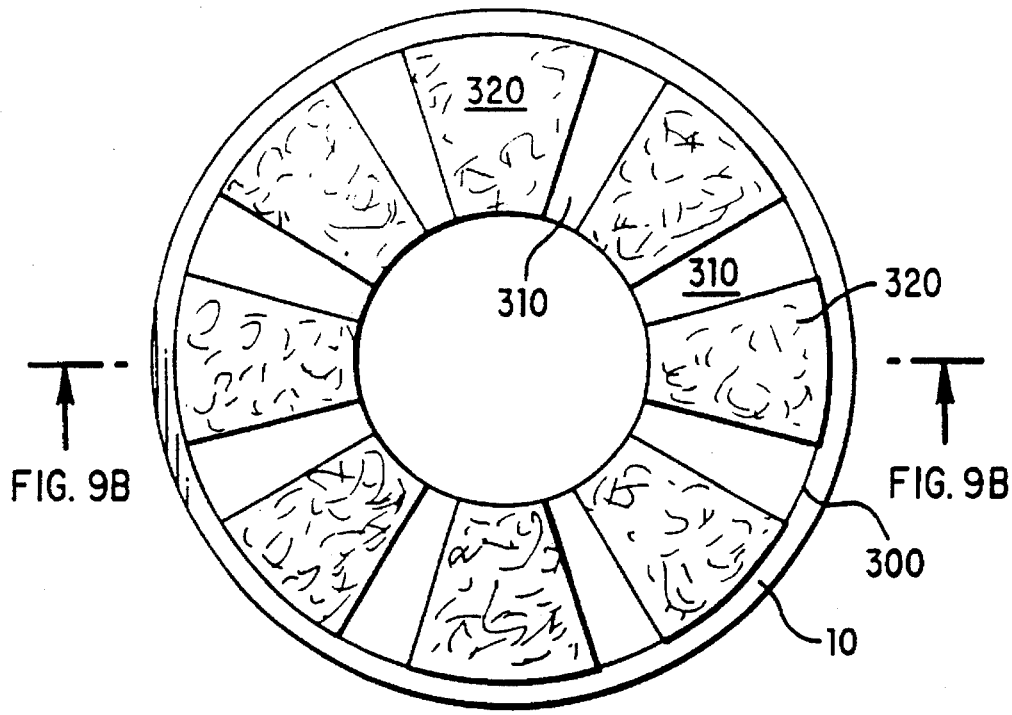
FIG. 9A is a top view of a friction pad construction which includes a unitary friction pad construction mounted in a carrier.
Figure 9B:
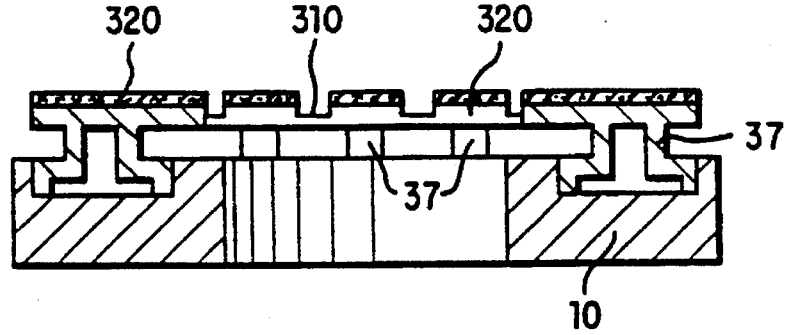
FIG. 9B is a side cross-section of the friction pad of FIG. 9A.

In some instances, it may be desirable to provide a single continuous friction ring rather than a plurality of discrete pads. FIGS. 9A and 9B illustrate one such friction ring which is continuous, but includes a plurality of recessed portions 310 and a plurality of pad portions 320. By virtue of the symmetrical disposition of the recessed portions 310 and the pad portions 320, this frictional ring functions in many ways like a friction member having discrete friction pads. Naturally, the continuity of the member 300 affects performance, for example, by giving the support structure increased rigidity and inhibiting deflection of the individual pads. These effects can be minimized by making the recessed portions very thin. Used with a standard carrier and plurality of pad support portions, the continuous member 300 would have a number of pad support receiving members corresponding to the number of friction pad support portions and would be secured to these pad support portions by press or snap fitting or some other means for releasably securing, which can accommodate the continuous member. The use of a continuous member is helpful in precisely positioning the friction pad surfaces and in assuring uniform pressure or temperature distribution as desired.

Figure 11A:
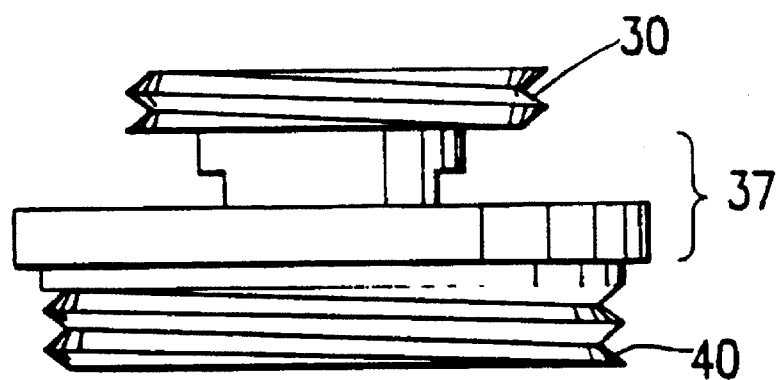
FIG. 11A is a side view of a modular friction pad support structure.

FIG. 11A illustrates one form of modular friction pad support portion for use in the modular friction pad construction contemplated by the present invention. In particular, FIG. 11A illustrates the friction pad support portion which would be used to construct a modular friction pad based upon the integral friction pad illustrated in FIGS. 4A–4E and 5A–5E. As illustrated in FIG. 11A, the support portion includes a threaded section 30 above the primary support portion, and threaded extension 40 of the tertiary support portion. These two threaded sections 30, 40 can be received in complementary threaded bores in the pad portion and carrier member, respectively. Thus, the modular construction shown in FIG. 11A is adapted to be releasably secured to the carrier and pad. Of course, any known complementary connectors can be used.

Figure 11B:
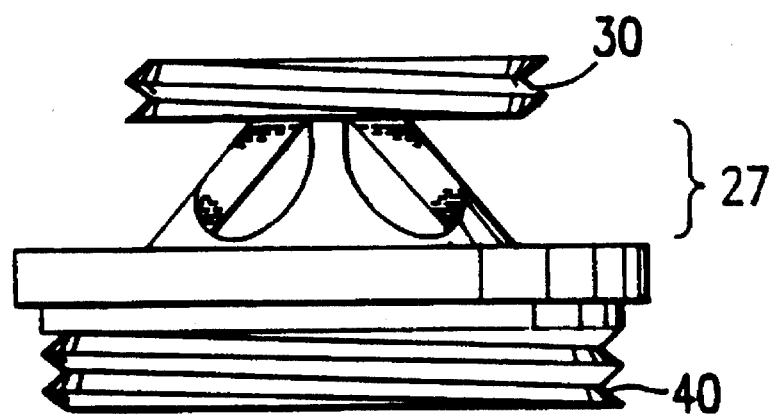
FIG. 11B is a side view of another modular friction pad support structure.

FIG. 11B shows another form of modular friction pad support portion having a threaded upper section 30 and a threaded extension 40 of the tertiary support member. The actual support portion 27 of this friction pad is of the type which could be used to construct a friction pad such as that illustrated in FIGS. 2, 3A and 3B in a modular fashion. Again, any known complementary connectors can be used.

Figure 12F:
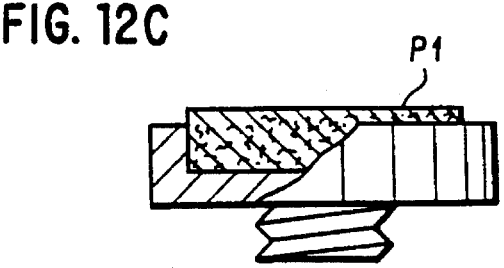
FIG. 12F is a partially cut away side view of a modular friction pad component in which a pad insert is supported in the bearing pad.
Figure 12E:
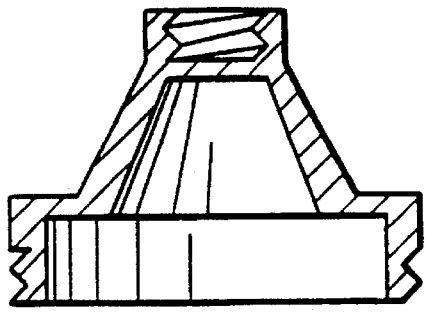
FIG. 12E is a side cross-section of a modular frusto-conical friction pad support structure component.

Although the modular constructions illustrated in FIGS. 11A and 11B include a relatively wide based threaded connecting construction, other types of modular components and connections are possible. FIGS. 12A–12F illustrate several such components and connections. Specifically, FIG. 12A illustrates the upper portion of a modular support portion of the type shown in FIG. 11A, in which a threaded securing post is provided rather than the wide based threaded member shown in FIG. 11A. Naturally, such a post could be provided as an alternative to the wide based threaded members illustrated in FIGS. 11A and 11B. FIGS. 12B and 12C illustrate a splined snap lock which can be used as an alternative to the threaded member illustrated in FIG. 12A. Of course, the male portion of the connector could be formed on the pad rather than the support structure. An example of such a construction is illustrated in FIGS. 12D and 12F; FIG. 12E shows a support structure with a female connecting portion formed therein. FIG. 12D further illustrates a composite pad having a structural base formed of one material (generally metal) and a cap of another type of material (generally rubber or polymer) molded thereon. FIG. 12F shows a friction pad which includes a separate pad insert PI made of a different material than the remainder of the friction pad. The outer surface of the pad insert PI is, of course, made of a high friction material. Indeed, the entire pad insert could be made of high friction material. In this way, the friction material is in an easily replaceable pad form. The pad insert could also include a layer of high performance friction material and a layer or section of some actively controllable "smart material", such as a piezoelectric quartz or polymeric material.

In addition to the illustrated constructions, other possible constructions include a leur lock, a cam lock, a twist lock or any known releasable securing means. Moreover, although not specifically illustrated, it is contemplated that in certain instances, the modular components can be non-releasably secured to one another, by, for example, press fitting, gluing, welding or any other known construction.

I claim:

1. A beam mounted friction pad for use in a friction engagement device, the friction pad comprising:

a layer of high friction material having a friction surface;

a curved friction material support surface having a first side and a second side, the first side being convexly curved about an axis of curvature and the second side being concavely curved about an axis of curvature, the support surface supporting the friction material on the first side thereof and the support surface extending circumferentially between first and second circumferentially spaced edges, wherein the support surface extends continuously from the first circumferentially spaced edge to the second circumferentially spaced edge;

and a support structure extending from the second side of the support surface at a location between the first and second circumferentially spaced edges for supporting the high friction material and the friction material support surface for pivoting about a predetermined pivot point located circumferentially between the first and second circumferentially spaced edges so as to orient the pad under load, the pivot being selected to cause uniform wear and uniform temperature distribution across the surface so as to minimize wear.

2. The friction pad of claim 1, wherein the support surface is constructed so as to provide a spring-like support in a direction transverse to the axis of curvature of the friction material support surface.

3. The friction pad of claim 2, wherein the friction material support surface is releasably secured to the support structure.

4. The friction pad of claim 1, wherein the support structure supports the friction material support surface for movement with six degrees of freedom.

5. The friction pad of claim 1, wherein the friction material support surface is integral with the support structure.

6. The friction pad of claim 1, wherein the support structure includes a primary support portion connected to and supporting the friction material support surface; a secondary support portion supporting the primary support portion; and a tertiary support portion supporting the secondary support portion.

7. The friction pad of claim 1, wherein the friction pad is used as a brake shoe.

8. The friction pad of claim 1, wherein the support structure extends from the second side of the support surface at a location that is about midway between the first and second circumferentially spaced edges.

9. The friction pad of claim 1, wherein the support structure includes a radially outer portion connected to the support surface and a radially inner portion that is spaced from the support surface, the radially inner portion being adapted for mounting on a component of the friction engagement device so as to separate the support surface from the component and support the support surface for movement relative to said component.

10. A beam mounted brake shoe for use in a shoe type brake mechanism of the type that includes a plurality of brake shoes that are hydraulically activated and restricted by a spring, the brake shoe comprising:

a base;

a layer of high friction material having a friction surface;

a curved friction material support surface spaced from the base having a first and second sides, the first side being convexly curved about an axis of curvature and the second side being concavely curved about an axis of curvature, the support surface supporting the friction material on the first side thereof;

and a flexible support structure extending from the second side of the support surface to the base for supporting the high friction material and the friction material support surface away from the base so as to permit the high friction material and the friction material support surface to pivot about a predetermined pivot point so as to orient the pad under load.

11. The new shoe of claim 10, wherein the support surface is constructed so as to provide a spring-like support in a direction transverse to the axis of curvature of the friction material support surface.

12. The brake shoe of claim 6, wherein the support surface extends continuously between first and second circumferentially spaced edges and the support structure extends from the second side of the support surface at a location between the first and second circumferentially spaced edges.

13. The brake shoe of claim 12, wherein the support structure extends from the second side of the support surface at a location that is about midway between the first and second circumferentially spaced edges.

14. The brake shoes of claim 6, wherein the support structure includes a radially outer portion connected to the support surface and a radially inner portion that is spaced from the support surface, the radially inner portion being adapted for mounting on a base of the friction engagement device so as to separate the support surface from the base and support the support surface for movement relative to said base.

15. A beam mounted brake shoe for use in a shoe type brake mechanism of the type that includes a plurality of brake shoes that are hydraulically activated and restricted by a spring, the brake shoe comprising:

a base;

a support structure extending from the base, the support structure comprising at least two legs that extend away from the base toward one another;

a curved friction material support surface having a first and second sides, the first side being convexly curved about an axis of curvature and the second side being concavely curved about an axis of curvature and extending between first and second spaced circumferential edges, wherein the second side of the support surface is supported away from the base by the support structure; and a layer of high friction material having a friction surface supported on the first side of the curved friction material support surface.

* * * * *